(12) United States Patent
Oppenlander et al.

(10) Patent No.: US 7,941,744 B2
(45) Date of Patent: May 10, 2011

(54) SYSTEM AND METHOD FOR ELECTRONIC DOCUMENT GENERATION AND DELIVERY

(75) Inventors: Timothy J. Oppenlander, Beaverton, OR (US); James Underhill, Portland, OR (US); Elizabeth Jackson, Lake In The Hills, IL (US); Rebecca Ann Cook, Camas, WA (US); Gary R. Dimel, Crystal Lake, IL (US); Carlos Ortize, Chicago, IL (US)

(73) Assignee: ADP, Inc., Roseland, NJ (US)

( * ) Notice: Subject to any disclaimer, the term of this patent is extended or adjusted under 35 U.S.C. 154(b) by 1381 days.

(21) Appl. No.: 11/412,195

(22) Filed: Apr. 25, 2006

(65) Prior Publication Data

US 2006/0288269 A1 Dec. 21, 2006

Related U.S. Application Data

(60) Provisional application No. 60/674,604, filed on Apr. 25, 2005.

(51) Int. Cl.
*G06F 17/00* (2006.01)
(52) U.S. Cl. .......................... 715/222; 715/243
(58) Field of Classification Search .................. 715/221, 715/222, 223, 224, 225, 226, 243
See application file for complete search history.

(56) References Cited

U.S. PATENT DOCUMENTS

| | | | | |
|---|---|---|---|---|
| 7,216,292 B1 * | 5/2007 | Snapper et al. | ............... | 715/236 |
| 7,461,336 B1 * | 12/2008 | Abramson et al. | ............. | 715/237 |
| 7,606,741 B2 * | 10/2009 | King et al. | ........................ | 705/27 |
| 7,774,504 B2 * | 8/2010 | Chene et al. | ................... | 709/246 |
| 2004/0205612 A1 * | 10/2004 | King et al. | .................... | 715/522 |
| 2005/0060644 A1 * | 3/2005 | Patterson | ....................... | 715/505 |
| 2005/0091037 A1 * | 4/2005 | Haluptzok et al. | ................ | 704/9 |
| 2006/0212696 A1 * | 9/2006 | Bustelo et al. | ................ | 713/150 |
| 2009/0138393 A1 * | 5/2009 | Lemons et al. | ................. | 705/35 |

* cited by examiner

*Primary Examiner* — Laurie Ries
(74) *Attorney, Agent, or Firm* — Ice Miller LLP

(57) ABSTRACT

A system and method for generating and delivering an electronic form to a user. One embodiment of the disclosed system comprises a file management sub-system for receipt and management of at least one standard form in electronic format. The system also includes a user sub-system for selection of a desired form. In addition, the system includes a mapper sub-system for mapping each of the at least one standard forms into a form file identifying the graphical and/or textual elements of the standard form, at least one data field to placed on the form and an indication of where the at least one data field is to be placed based on the identified graphical and/or textual elements. Also, the system includes a delivery sub-system operably connected to the file management sub-system, the user sub-system and the mapping sub-system and capable delivering an electronic form comprising the desired form into which data retrieved from the user sub-system is inserted.

40 Claims, 26 Drawing Sheets

Subscriptions:

Fig. 13D

SYSTEM AND METHOD FOR ELECTRONIC DOCUMENT GENERATION AND DELIVERY

CROSS REFERENCE TO RELATED APPLICATIONS

This application claims the benefit of prior provisional application Ser. No. 60/674,604, filed Apr. 25, 2005.

BACKGROUND AND SUMMARY

This application relates to electronic documents, and, in particular, to generation and delivery of electronic documents.

Form documents are required in a myriad of circumstances for communicating information in a standard format. Consider, for example, employment applications that usually comprise a check boxes, blanks, and boxes for entering information about the applicant. Various federal, state, and local governments often use forms to convey information. As an example, an application for recordation of an assignment before the U.S. Patent and Trademark Office is such a form, as are the various documents used by applicants and the International Bureau for Patent Cooperation Treaty patent applications. As another example, financial institutions and insurance companies usually use forms for their applications and contracts.

With the introduction of the typewriter in the workplace, form documents were formatted to allow one to type in the information. In that manner, the information would be more legible. As computers and the Internet found their way into homes and businesses, forms have been made available in electronic format. Perhaps, the most prevalent of the electronic formats is known as the portable document format ("PDF") which is supported by software provided by Adobe Systems Incorporated. Other formats include, but are not limited to tagged image file format ("TIFF"), bit-mapped graphics format ("BMP"), PC Paintbrush bitmapped file ("PCX") format, and formats for word processors such as WORD provided by Microsoft Corporation, Redmond, Wash.

While forms can be provided in a variety of electronic formats, it is generally true that a format-specific program is required to complete the information in the form. For example, to complete information in a WORD document, one must have the WORD word processing program, and to complete information in a PDF file, one must have what is known as Adobe Writer™ provided by Adobe Systems Incorporated. Such "writing" programs may be in addition to programs used by the user for the main purpose(s) for which the user uses the computer, and are certainly in addition to an application using forms that is accessed over the Internet with such application executing in a location remote from the user's computer. Thus, it is desired to provide a system and method for electronic form document editing that does not require such an additional format-specific program to complete the information on the form.

There sometimes exist limitations with regard to distribution of electronic forms. Government forms are generally made available to the public at no cost. However, many private entities only provide their forms to those who have a legitimate business interest in having such forms, and may even charge for the provision of such forms. Consider, for example, forms provided to dealers, such as automobile dealers, from financial institutions and insurance companies. Financial institutions and insurance companies often qualify entities with which those institutions or companies will do business. That qualification may come in the form of a contract with a dealer or other form user. Often, pursuant to the contract, the dealer receives a commission or other fee for selling services of the institution or company to customers of the dealer. For various reasons, not every possible dealer will be permitted to sell the services of any specific institution or company. The institution or company may also charge the dealer for the forms it uses in reselling the services of the institution or company or for completion and submission of the forms.

One system used to support automobile, truck, and other dealers is provided by ADP, Inc. of Roseland, N.J. One version of the system includes software that operates on the dealer's computer system (referred to herein as the Dealer Management System or DMS), and another version is web-based wherein the dealer accesses the system over the Internet. Both versions of the system provide the dealer with a variety of functions, including the ability to complete forms provided by financial institutions and insurance companies. These forms include, but are not limited to, a bill of sale, a work order authorization, and lease, financing, and insurance documents. At present, the dealer obtains paper copies of the forms for the financial institutions or insurance companies for whom the dealer is qualified to resell services. The dealer enters information on a system used by the dealer for completion of a form, places a paper copy of the form into the dealer's printer, usually an impact printer, a laser printer, or an inkjet printer, instructs the system to print the form, and then the system prints the completed information onto the printed form fed into the printer by the dealer.

The use of printed forms in a printer has several shortcomings. First, the dealer must obtain paper forms. Second, the dealer must be certain to have the most current version of the form, and may find it difficult to ascertain what constitutes "current". There is also a risk that the paper form inserted by the dealer is the incorrect form or is an outdated form. The use of pre-printed forms also makes it difficult for the institution or company to control the use of its forms. The problems related to use of the appropriate forms are so significant that some lenders even send people out to dealers to pull out-of-date forms out of the dealer's stock of forms. Therefore, it is desired to provide a system and method for handling forms that allow the owner of the form to control which forms are used without significant effort, insure that the "current" form is used, do not require that the forms be provided separate from their generation and printing, and eliminate the possibility of printing information on the incorrect form.

While standard formats, such as the PDF format, are useful in many applications wherein forms are provided to different users, such standard formats may not have applicability where there are differences in the users' applications that access such forms. Differences in the user applications may arise from users having different versions of the same application or where the application provides user defined fields that are used to complete the information required for a form. Often applications that access forms for completing forms with the appropriate data acquire that data from a database managed by the user. Such user databases may not store data in the same manner.

Most database fields within a given application are rigidly defined in terms of expected content. That is, a field will generally have an associated field name and only data format or structure appropriate to that name is stored in the field. For instance, a field may be called "Price," and the software will only store, and allow to be stored, data formatted similar to "10.00", i.e. numeric data that could reasonably be interpreted as a price.

When software applications are new, it is generally true that developers are aware that, due to time or other constraints, they are not be able to build all of the database fields that will be required by the end user. In addition, development teams may sometimes want to give users flexibility beyond the software design, by giving the users places to put data that was not defined as part of the standard database structure.

While not as common with newer databases, older legacy databases often have fields that are indeterminate in nature. A few fields in a database often have been left "undefined" as to the expected contents, with generic labels on them such as "Miscellaneous 1" or "Auxiliary Field 2". Developers provided the database user with software tools for the user to apply custom labels to such fields and to assist the user in remembering what type of data is stored in each field so that the custom field can be used consistently. In some implementations, the user is also able to associate a data type with the field.

Such practices and designs have allowed users over the years to essentially define their own database. Typically two users will make different decisions as to how custom fields are used. However, users often have the same problems to solve. This leads to differences in database structure between users, even between users that are using the same software, in the same version, from the same vendor. For instance, if "Odometer Reading" data does not have a defined place in the database, one user may choose to put "Odometer Reading" data in the "Miscellaneous 1" field, while another chooses to put "Odometer Reading" data in "Auxiliary Field 2". These two users now have incompatible databases. Data from one system cannot be moved to the other system without serious side effects.

For instance, suppose that a certain software package containing several customizable fields has been developed and shipped to clients and has been installed at several client sites for some time. Further suppose that, as is often the case, the various clients have each chosen to put different data in the various customizable fields, for example, no two clients are putting "Odometer Reading" data in exactly the same place. Sometime after the software is installed, the software vendor wants to sell a form to clients that can be printed from within the software. The form requires "Odometer Reading" data. The software vendor knows that most clients have "Odometer Reading" data stored in a custom field in a database. However, since the data isn't consistently located, or even consistently named, in the database, it is difficult for the software vendor to program a form solution that will work for all of their clients. The software vendor may have to program a custom form for each client, greatly increasing the cost of the forms delivery, and reducing revenue from sales of the new form product.

In an alternative scenario, sometime after the software is installed, the software vendor may realize that all or most of their clients want "Odometer Reading" data as part of the standard database. The software vendor adds the field to the database, and ships a new version of the software to clients. The clients install the software, but existing Odometer data on the system is stored in a custom field, while newly entered Odometer data is stored in the new standard field. Clients have to look in multiple places for the data, or the vendor has to develop an expensive user routine that allows the client to move existing data into the new field.

Similar issues arise when a client buys a rival business. During the process of consolidating the data from their computer systems, the client may discover that, even though the computer systems are from the same vendor, data isn't stored in the same places on both systems, and so can't be easily migrated from one system to another. The client, or the software vendor, or both, may be forced to spend time and money developing custom software that will correctly migrate data from one system to the other to support the consolidation effort.

Many other scenarios exist that create problems when forms are to be printed that required data stored in a database to be inserted in specific places on the forms.

A system and method for electronic document generation, delivery, and printing is disclosed herein.

According to one aspect of the disclosure, a system for generating and providing at least one electronic form to a user includes a file management sub-system, a first user sub-system, a first print engine, a second user sub-system, a second print engine, a mapper sub-system and a delivery sub-system. The file management sub-system is for receipt and management of at least a first and a second standard form. The first standard form includes a first location thereon in which data of a first type is to be inserted and a second location thereon in which data of a second type is to be inserted to generate a first filled form. The second standard form includes a third location thereon in which data of a third type is to be inserted and a fourth location thereon in which data of a fourth type is to be inserted to generate a second filled form. The first user sub-system is for selection of a desired form from the at least a first standard form and the second standard form. The first user sub-system comprises at least a first memory location at which data of the first type is stored, a second memory location at which data of the second type is stored, a third memory location at which data of the third type is stored and a fourth memory location at which data of the fourth type is stored and a first printer. The a first print engine is communicatively coupled to the first printer. The second user sub-system is for selection of a desired form from the at least a first standard form and the second standard form. The second user sub-system comprises at least a fifth memory location at which data of the first type is stored, a sixth memory location at which data of the second type is stored, a seventh memory location at which data of the third type is stored and an eighth memory location at which data of the fourth type is stored and a second printer. The second print engine is communicatively coupled to the second printer. The mapper sub-system is running mapper software for mapping of standard forms into digital form files. The first standard form is mapped into a first digital form file identifying graphical and/or textual elements of the first standard form, a first pre-defined data input field for receipt of data of the first type to be placed on the first standard form, and a location on the first standard form for the first pre-defined data input field, a second pre-defined data input field for receipt of data of the second type to be placed on the first standard form and a location on the first standard form for the second pre-defined data input field The second standard form is mapped into a second digital form file identifying graphical and/or textual elements of the second standard form, a third pre-defined data input field for receipt of data of the third type to be placed on the second standard form and a location on the second standard form for the second pre-defined data input field. The delivery sub-system is operably connected to the file management sub-system, the mapper sub-system, the first user sub-system and the second user sub-system. The delivery sub-system is configured to retrieve from the first user sub-system an indication of a desired form selected from the first and second standard forms and a first delivery address for electronic delivery of a digital form file mapped from the desired form. The delivery sub-system includes a mechanism for creation of a script reflective of the desired form including the digital form file mapped from the desired form and a mechanism for execution of the script to electronically deliver the digital form file mapped from the desired form to the first user sub-system at the first delivery address. The delivery sub-system is also configured to retrieve from the second user sub-system an indication of a desired form selected from the first and second standard forms and a second delivery address for electronic delivery of a digital form file mapped from the desired form. The delivery sub-system includes a mechanism for creation of a script reflective of the desired form including the digital form file mapped from the desired form and a mechanism for execution of the script to electronically deliver the digital form file mapped from the desired form to the second user sub-system at the second delivery address. When an indication is received from the first user sub-system that the first standard form is the desired form, the first print engine is configured to merge the data stored at the first and second memory locations with the electronically delivered first digital form file to generate a first output file to the first printer which is configured to print a filled form including the data stored at the first memory location in the first pre-defined data input field at the location on the first standard form for the first pre-defined data input field and the data stored at the second memory location in the second pre-defined data input field at the location on the first standard form for the second pre-defined data input field. When an indication is received from the first user sub-system that the second standard form is the desired form, the first print engine is configured to merge the data stored at the third and fourth memory locations with the electronically delivered second digital form file to generate a second output file to the first printer which is configured to print a filled form including the data stored at the third memory location in the third pre-defined data input field at the location on the second standard form for the third pre-defined data input field and the data stored at the fourth memory location in the fourth pre-defined data input field at the location on the second standard form for the fourth pre-defined data input field. When an indication is received from the second user sub-system that the first standard form is the desired form, the second print engine is configured to merge the data stored at the fifth and sixth memory locations with the electronically delivered first digital form file to generate a third output file to the second printer which is configured to print a filled form including the data stored at the fifth memory location in the first pre-defined data input field at the location on the first standard form for the first pre-defined data input field and the data stored at the sixth memory location in the second pre-defined data input field at the location on the first standard form for the second pre-defined data input field. When an indication is received from the second user sub-system that the second standard form is the desired form, the second print engine is configured to merge the data stored at the seventh and eighth memory locations with the electronically delivered second digital form file to generate a second output file to the second printer which is configured to print a filled form including the data stored at the seventh memory location in the third pre-defined data input field at the location on the second standard form for the third pre-defined data input field and the data stored at the eighth memory location in the fourth pre-defined data input field at the location on the second standard form for the fourth pre-defined data input field.

According to another aspect of the disclosure, system for generating and providing at least one electronic form to a user includes a file management sub-system, a user sub-system, a mapper sub-system and a delivery sub-system. The file management sub-system is for receipt and management of at least one standard form including a location at which data of a first type is to be inserted thereon. The user sub-system is for selection of a desired form from the at least one standard form. The user sub-system comprises a memory location at which a data of the first type is stored, a print engine and a printer. The mapper sub-system runs mapper software for mapping of each of the at least one standard forms into a digital form file identifying graphical and/or textual elements of the standard form, at least one data input field for receipt of data of the first type and a location on the standard form for the at least one data input field. The delivery sub-system is operably connected to the file management sub-system, the mapper sub-system and the user sub-system. The delivery sub-system is capable of retrieving from the user sub-system an indication of a desired form selected from the at least one standard form and a delivery address for electronic delivery of a digital form file mapped from the desired form. The delivery sub-system includes a mechanism for creation of a script reflective of the desired form including the digital form file mapped from the desired form and a mechanism for execution of the script to electronically deliver the digital form file mapped from the desired form to the user sub-system at the delivery address. The print engine on the user sub-system is configured to merge the data stored at the memory location with the electronically delivered digital form file to generate an output file to the printer which is configured to print a filled form including the data stored at the memory location in the data input field at the location on the standard form for the at least one data input field.

According to yet another aspect of the disclosure, a system for generating and providing at least one electronic form to a user comprises a file management sub-system, a first user sub-system, a first print engine, a mapper sub-system and a delivery sub-system. The file management sub-system is for receipt and management of at least a first standard form and a second standard form. The first standard form includes a first location thereon in which data of a first type is to be inserted to generate a first filled form and a second location thereon in which data of a second type is to be inserted to generate the first filled form. The second standard form includes a third location thereon in which data of a third type is to be inserted to generate a second filled form and a fourth location thereon in which data of a fourth type is to be inserted to generate the second filled form. The first user sub-system is for selection of a desired form from the at least a first standard form and the second standard form. The user sub-system comprises at least a first memory location at which data of the first type is stored, a second memory location at which data of the second type is stored, a third memory location at which data of the third type is stored, a fourth memory location at which data of the fourth type is stored and a first printer. The mapper sub-system runs mapper software for mapping of the first standard form into a first digital form file and the second standard form into a second digital form file. The first digital form file identifies graphical and/or textual elements of the first standard form, a first pre-defined data input field for receipt of data of the first type to be placed on the first standard form, a location on the first standard form for the first pre-defined data input field, a second pre-defined data input field for receipt of data of the second type to be placed on the first standard form and a location on the first standard form for the second pre-defined data input field. The second digital form file identifying graphical and/or textual elements of the second standard form, a third pre-defined data input field for receipt of data of the third type to be placed on the second standard form, a location on the second standard form for the third pre-defined data input field, a fourth pre-defined data input field for receipt of data of the fourth type to be placed on the second standard form and a location on the second standard form for the fourth pre-defined data input field. The delivery sub-system is operably connected to the file management sub-system, the mapper sub-system and the first user sub-system. The delivery sub-system is capable of retrieving from the first user sub-system an indication of a desired form selected from the first and second standard forms and a delivery address for electronic delivery of a digital form file mapped from the desired form. The delivery sub-system includes a mechanism for creation of a script reflective of the desired form including the digital form file mapped from the desired form and a mechanism for execution of the script to electronically deliver the digital form file mapped from the desired form to the first user sub-system at the first delivery address. When it is indicated that the first standard form is the desired form, the print engine is configured to merge the data stored at the first and second memory locations with the electronically delivered first digital form file to generate a first output file to the printer which is configured to print a filled form including the data stored at the first memory location in the first pre-defined data input field at the location on the first standard form for the first pre-defined data input field and the data stored at the second memory location in the second pre-defined data input field at the location on the first standard form for the second pre-defined data input field. When it is indicated that the second standard form is the desired form, the print engine is configured to merge the data stored at the third and fourth memory locations with the electronically delivered second digital form file to generate a second output file to the printer which is configured to print a filled form including the data stored at the third memory location in the third pre-defined data input field at the location on the second standard form for the third pre-defined data input field and the data stored at the fourth memory location in the fourth pre-defined data input field at the location on the second standard form for the fourth pre-defined data input field.

According to one aspect of the disclosure, a method is disclosed for generating and providing at least one electronic form including at least a first electronic form of a first standard form from which a first filled standard form can be printed including a first location wherein data of a first type is printed and a second electronic form of a second standard form from which a second filled standard form can be printed including a second location wherein data of a second type is printed to a plurality of users including a first user that stores data of the first type at a first memory location and data of the second type at a second memory location and a second user that stores data of the first type at a third memory location and data of the second type at a fourth memory location, wherein the first and third memory locations are different and the second and fourth memory locations are different. The method comprises the following steps. The first standard form is collected in electronic format. The second standard form is collected in electronic format. is mapped The first standard form is mapped into a first digital form overlay file identifying graphical and/or textual elements of the first standard form, a first pre-defined data input field of the type to be placed on the first standard form in the location at which data of the first type is to be printed and a location on the first standard form for the first pre-defined data input field. The second standard form is mapped into a second digital form overlay file identifying graphical and/or textual elements of the second standard form, a second pre-defined data input field of the type to be placed on the second standard form in the location at which data of the second type is to be printed and a location on the second standard form for the second pre-defined data input field A request is accepted from the first user for electronic delivery of a first desired form selected from the first and second electronic forms. A request is accepted from the second user for electronic delivery of a second desired form selected from the first and second electronic forms. A first premapped data stream is generated correlating the first pre-defined data input field with the data stored at the first memory location and the second pre-defined data input field with the data stored at the second memory location. A second premapped data stream is generated correlating the first pre-defined data input field with the data stored at the third memory location and the second pre-defined data input field with the data stored at the fourth memory location. The digital form overlay file mapped from the first desired form is electronically delivered to the first user. The digital form overlay file mapped from the second desired form is electronically delivered to the second user. Data is extracted to create first extracted data from the first premapped data stream wherein the first extracted data is the data stored in the first memory location when the first desired form is the first electronic form and the extracted data is the data stored at the second memory location when the first desired form is the second electronic form. The first extracted data is merged with the digital form overlay mapped from the first desired form to create a first print file. The first print file is sent to a printer accessible to the first user to produce a hardcopy of a filled standard form. Data is extracted to create second extracted data from the second premapped data stream wherein the extracted data is the data stored in the third memory location when the second desired form is the first electronic form and the extracted data is the data stored at the fourth memory location when the second desired form is the second electronic form. The second extracted data is merged with the digital form overlay file mapped from the second desired form to create a second print file. The second print file is sent to a printer accessible to the second user to produce a hardcopy of a filled standard form.

Additional features and advantages of the invention will become apparent upon consideration of the following detailed description of a preferred embodiment exemplifying the best mode of carrying out the invention as presently perceived.

BRIEF DESCRIPTION OF THE DRAWINGS

The present disclosure is illustrated by way of example and not limitation in the figures of the accompanying drawings in which like references indicate similar elements and in which:

FIG. 12A, FIG. 12B, and FIG. 12C show illustrations of screens for the process of posting a form to the forms library according to one embodiment of disclosed system;

FIG. 13A, FIG. 13B, FIG. 13C, and FIG. 13D show illustrations of screens for the process of ordering a form from the forms library according to one embodiment of the disclosed system;

DETAILED DESCRIPTION

Figure 1:
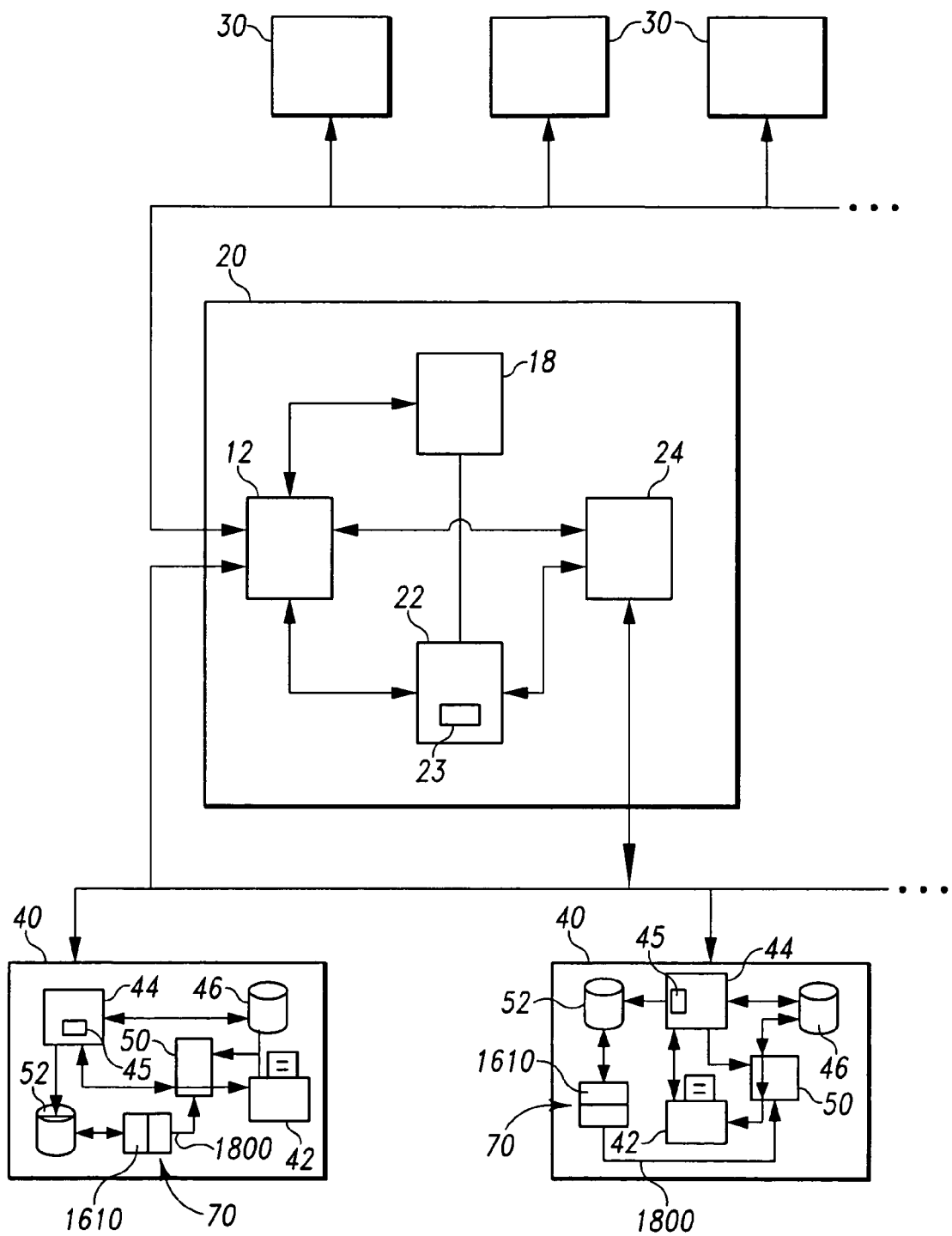
FIG. 1 shows a block diagram of one embodiment of a system for electronic generation and delivery of a document.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present invention includes any alterations and modifications to the illustrated embodiments and includes further applications of the principles of the disclosure as would normally occur to one skilled in the art to which this invention pertains.

Referring to FIG. 1, the disclosed system 10 for generating and providing electronic documents includes a base functions server or sub-system 20, a plurality of forms supplier or provider sub-systems 30 and a plurality of forms user sub-systems 40. Each of the forms provider sub-systems 30 is associated with a person or entity that provides forms for use by form users. While each of the illustrated plurality of forms supplier sub-systems 30 is shown in FIG. 1 as being communicatively coupled to the base functions server 20, as explained below, forms suppliers may deliver hard copies of their forms to the operator of the base function server 20 within the scope of the disclosure. In the illustrated embodiment of system 10, each of the plurality of forms user sub-systems 40 is communicatively coupled via a network, such as the world wide web network, to the base function server or sub-system 20. Each of the plurality of forms user sub-systems 40 is associated with an entity or person that utilizes forms. In one specific example described herein, each forms user sub-system 40 is associated with an automobile dealer that utilizes forms to facilitate the sale, purchase, lease or repair of automobiles. Such forms may include forms required by lenders willing to allow the dealer to act as an agent or intermediary in arranging financing for an automobile purchaser through a lending institution, forms required by insurance companies willing to allow the dealer to act as an intermediary or agent for the sale of insurance offered by the insurance company on automobiles purchased from the dealer, forms required to be filed with a department of state government related to the sale of automobiles within the state where the dealer is located and many other forms.

The disclosed system 10 is operable over the Internet or other network and comprises a base functions server 20 including a web server 12, a file management sub-system 18, a mapper sub-system 22, and a delivery sub-system 24. The web server 12 facilitates interaction between the forms provider sub-systems 30 and the base function server 20 and the forms user sub-systems 40 and the base function server 20. The disclosed system 10 also comprises forms user sub-systems 40 each including a laser printer 42, a print engine 50 and running a financial and insurance management process on an internet enabled electronic device 44 to generate financial and insurance ("F&I") documents on the laser printer 42 utilizing the distributed forms.

The web server 12 is communicatively coupled to the internet and runs web host software. The web server 12 is also communicatively coupled, through a bus or network, to the file management sub-system 18, form mapper sub-system 22 and delivery sub-system 24. Preferably each of the forms user sub-systems 40 and the forms provider sub-systems 30 is configured to act as a web client by being coupled to the internet and running a web browser or other web client software or web service.

In one embodiment, each forms provider utilizes its sub-system 30 to connect via the internet to the web server 12 of the base functions server 20 and upload various forms. In this embodiment, the base function server 20 is a networked computer system and operators of a forms distributor. The web server 12 communicates with the file management sub-system 18 which receives and manages forms that populate a third party image database 26 including at least one standard form. The file managements system 18 manages forms uploaded by forms providers, allows the forms provider to update modify and delete those forms and allows forms users to determine what forms are available from the base function server 20.

Each forms user sub-system 40 is configured to communicate via the internet with the web server 12 of the base functions server 20 to be communicatively coupled with the file management sub-system 18 for selection of a desired form and for entry of at least one data variable. This selection of forms is for downloading purposes only and not for printing filled forms. The data provided by the forms user sub-system 40 includes data required for installation of the desired form on the forms user sub-system 40 of the requesting forms user. Such data may include, but not be limited to, the logon on which to install the form and the print queue to be used with the form. The data used to populate the locations identified for entry of data on the digital form overlay is data which is stored on a database 52 or other memory location generated by application software 45 on the forms user sub-system 40. The data used to populate the locations identified for entry of data on the digital form overlay is entered into a premapped data stream 1800 utilizing a standard terms resolution tool on the forms user sub-system. In the premapped data stream, the data is located in prescribed fields in the data stream that correspond to identifiers placed in the locations at which data is to be inserted into the digital form overlay to designate the type of data to be inserted for properly completing the form.

The mapper sub-system 22 is provided to convert uploaded forms in the file management sub-system 18 into a format for printing a completed form including information provided by the form user on the forms user sub-system 40. The mapper sub-system 22 has mapper software 23 running thereon which is utilized by a forms builder to convert each of the at least one standard forms submitted in a standard electronic document format and stored in a third party form images database 26 into a form file or digital form overlay identifying graphical and/or textual elements of the standard form 1712, at least one data input field 1714 of the type to be placed on the standard form, and a location on the standard form for the at least one data input field.

The forms delivery sub-system 24 manages the distribution of the forms to the forms user sub-systems 40 via a transfer protocol, such as, for example, the UUCP transfer protocol. The delivery sub-system 24 is communicatively coupled to the file management sub-system 18, the mapper sub-system 22, and the forms user sub-systems 40. The delivery sub-system 24 is configured to retrieve from the forms user sub-system 40 an indicia of a desired form selected from the uploaded forms in the file management sub-system 18 and information regarding the forms user sub-system 40 to which the requested form is to be delivered. The forms delivery sub-system 24 includes a mechanism 28 for creation of a script reflective of the desired form and the at least one data variable retrieved. In one specific embodiment, this mechanism 28 is known as an Elite Integration Point ("EIP"). EIP's are APIs that allow unlike systems to execute procedures, read data or write data to a system, such as an ADP Unix/Linux system. The delivery sub-system 24 also includes a mechanism 32 for execution of the script to deliver to the user sub-system an electronic form comprising the desired form having the at least one data variable retrieved thereon according to the form file created by the mapper sub-system 22. The script is given a specific name, in one specific example End-Dmp.ksh. The forms user sub-system 40 includes an API that automatically executes this script when forms are delivered to the forms user sub-system to store the digital form overlay in a database 46.

When a forms supplier uploads a standardized electronic version of a document, that file is placed in a predetermined location on the base function server 20. In the illustrated embodiment, the third party image file database 26 is that predetermined location. Among the information regarding the uploaded form that will be utilized to create a vision case for the uploaded form are the categories to which the form belongs (e.g. loan document, lease document, financing document, insurance document) which will be delimited by a string of form category identifiers, the forms object ID, the form's name, an indication of the states in which the form is available for use, a catalog number, a URL identifying the location of the form file, an effective date of the form, a revision date of the form and additional user comments. The vision case is created by a web method, in one example using adps.vision component, to return a case number for the file after it is uploaded.

In the illustrated embodiment of the base function server 20, a support solutions server acts both as a billing system and as the file management sub-system 18. The web server 12 generates a DealerSuite web interface through which forms suppliers and form users interact with the base function server. Memory on the support solution server is reserved for the third party form image database 26. The mapper sub-system 22 includes a forms builder PC on which mapping software for mapping a standardized electronic form file into a digital form overlay with designated areas on the form for entry of data to properly complete the form are designated. In one specific example, this mapping software is DataMapper software available from Profitability of Hawaii. While Profitability of Hawaii provides a generic version of the DataMapper software, such software can be customized to meet the needs of a form or other document distributor. It is within the scope of the disclosure for other commercially available data mapping software to be utilized with or without modification or for data mapping software to be developed specifically for the application. Also, while the illustrated system designates the mapping software as being resident on a mapping sub-system that is a part of the basic function server 20, it is within the scope of the disclosure for the mapping sub-system to be present on the form user sub-system or for the mapping operation to be outsourced with the mapping sub-system being present on some third parties system. Because in the past ADP has generated overlay to be burnt onto cartridges for form printing with an impact printer or a laser printer, certain employees of ADP (form builders) are very familiar with the concept of mapping forms and thus the disclosed specific embodiment utilizes the expertise of these form builders to implement the disclosed system and method. With proper instruction and training the mapping process can be performed by outside form builders within the scope of the disclosure.

Figure 14:
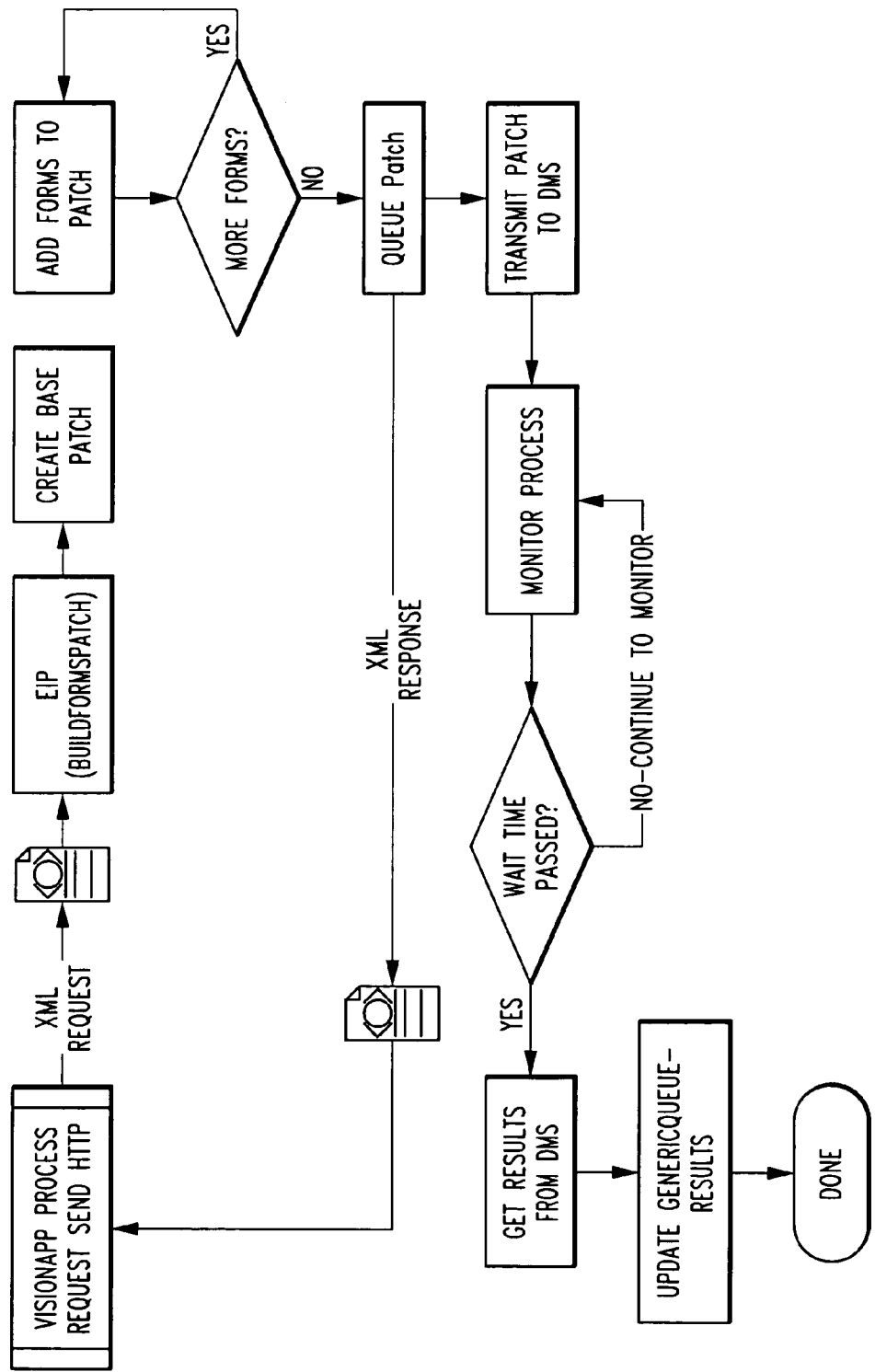
FIG. 14 shows a flow chart of one embodiment of a patch delivery sub-system according to one embodiment of the disclosed system.

Referring now to FIG. 14, one specific example of the disclosed system and method particularly well suited for providing forms to automobile dealerships utilizes the illustrated process flow. The delivery process utilizes Elite Integration Points (EIP's) to build, queue and obtain current delivery status information for forms packages (patches) requested by forms users. The EIPS send XML request documents to the patch delivery server using HTTP requests. The resulting response files are returned to the calling program. The patch delivery server then waits a pre-determined period of time before reconnecting to the dealer management system running on the form user sub-system 40 to obtain installation status. Once the installation status is obtained, the information will be made available for status queries that may be obtained by using a QueuePatch EIP, method STATUS. Two EIPs are used in the disclosed specific embodiment. One EIP utilized in the disclosed embodiment is a BuildFormsPatch by which forms requests are submitted to the Patch Delivery Server. The second EIP utilized is Queue Patch which retrieves delivery status updates from the DMS running on the forms user sub-system of the form user who requested forms.

The BuildFormsPatch EIP calls GY.BUILD.FORMS-.PATCH and utilizes several available methods or functions. Among the available methods or functions are INIT, ADD and SEND. Each of these methods is of the HTTP request Type and utilizes the following format and parameters cnumber, cmf, email, FUNCTION, formid, formtype, logons, server, directory and caseid. The INIT method also utilizes the INIT parameter for the FUNCTION parameter, the ADD method also utilizes the ADD parameter for the FUNCTION parameter and the SEND method utilizes the SEND parameter for the FUNCTION parameter in the above format. The cnumber parameter is a parameter that identifies the system serial number and in one specific embodiment is formatted to include a "C" followed by s numeric digits. The cmf parameter identifies the client (or form user) number and is utilized to identify the form user who is requesting the forms. In one embodiment, the cmf parameter consists of exactly eight numeric digits since form users are identified in the system by eight numeric digits. The email parameter is the e-mail address of the form user that has requested forms to be downloaded to their form user sub-system 40. The email parameter is formatted ins standard e-mail format, i.e. user name followed by "@" followed by user domain name. The formid parameter includes the file name of a form requested by the form user that is to be added to the patch for delivery to the DMS running on the form user sub-system 40 of the requesting form user. The formtype parameter is an identifier associated with the valid types of forms to be delivered. The formtype identifier for an eForm that incorporates form user supplied information into a form is "E". Other formtypes may include I for the old style of form that is pre-printed and then loaded into an impact printer for addition of data into the form. The logons parameter includes a list of the logons where a formid should be loaded. In one specific embodiment, the logons parameter is delimited by the string '#xfe'. The server parameter is the server name or ip address where the file representing the requested form identified by the formid parameter is currently located. The server parameter is utilized by EIP to transfer the requested form file to the patch delivery server utilizing the file transfer protocol. The directory parameter is the fully qualified path to the file representing the requested form identified by the formid parameter is currently located on the server specified by the server parameter. The caseid parameter is the vision case id number used by EIP for building the patch and retrieving the status of the patch.

Each of the INIT, ADD and SEND methods return either an ErrorCode, ErrorNumber and an ErrorMessage. The ErrorCode return can assume two values indicating that either the request was successfully created and queued ("0") or that the request failed ("1"). The ErrorNumber return contains the Request ID which references the request on the patch delivery server for use with the method STATUS to find the current status of the patch request if the request was successfully created and queued (i.e. ErrorCode="0"). If the request failed (i.e. ErrorCode="1"), the Errornumber return contains an internal application error code identifying the type of error which occurred. The ErrorMessage return contains an informational message about the queued patch if the request was successfully created and queued or text for the returned ErrorNumber if the request failed.

The INIT method creates the base patch structure used by the remaining methods and is therefore called prior to calling any of the other methods. The ADD method downloads the form specified by the formid parameter from the server specified by the server and directory parameters to the patch delivery server 24 and updates the applicable installation routine base on the formtype parameter. The SEND parameter adds terminating text to the installation routines and calls a component of the QueuePatch EIP to queue the patch on the Patch Delivery sub-system server.

The XML document below is an example of a valid Forms request to the server. In the example, the order is for two forms, one eForm and one Impact (legacy) form. In the example, the attribute names are all in lower case to help distinguish them from the response document elements returned by the Elite Open API.

```
<?xml version"1.0" encoding "UTF-8"?>
<eoapi:Request xmlns:eoapi="http://www.adp.com/eoapi" version="1.0">
  <Session>
    <Connection>
      <Host>139.126.192.29</Host>
      <Product>RAMIT</Product>
      <Password>SAM</Password>
      <Pooling>Yes</Pooling>
    </Connection>
```

```
    <Execute>
      <BuildFormsPatch cnumber="" CMF="" email=""
        function="INIT" formid="" logons="" server="" directory=""
        caseid="10111454"/>
      <BuildFormsPatch cnumber=""CMF="" email=""
        function="ADD" formid="917733" formtype="E"
        logons="MAZDA-FI#xfeGM-FI" server="139.126.192.240"
        directory="/adp/3party/formrequests/101154"
        caseid="10111454"/>
      <BuildFormsPatch cnumber="" CMF="" email=""
        function="ADD" formid="FORM_1023" formtype="I"
        logons="BMW-FI" server="localhost"
        directory="/adp/pds/formslib/"caseid="10111454"/>
      <BuildFormsPatch cnumber="C123123" CMF="05129587"
        email="jDoe@yahoo.com" function="SEND" formid=""
        formtype="" logons="" server="" directory=""
        caseid="10111454"/>
    </Execute>
  </Session>
</eoapi:Request>
```

Below is an example of the XML response document. This response document assumes that the forms request was properly built and queued.

```
<?xml version"1.0" encoding "UTF-8"?>
<eoapi:reply xmlns:eoapi="http://www.adp.com/eoapi" version="1.0">
  <Session>
    <Reply type="Connection">
      <ErrorMessage/>
      <ErrorCode>0</ErrorCode>
    </Reply>
    <Reply type="Execute">
      <BuildFormsPatch errorcode="0"
        errormessage="10111454 INIT successful"
        errornumber="RA000">
        <ErrorMessage/>
        <ErrorCode>0</ErrorCode>
      </BuildFormsPatch>
      <BuildFormsPatch errorcode="0"
        errormessage="10111454 ADD successful"
        errornumber="RA000">
        <ErrorMessage/>
        <ErrorCode>0</ErrorCode>
      </BuildFormsPatch>
      <BuildFormsPatch errorcode="0"
        errormessage="10111454 ADD successful"
        errornumber="RA000">
        <ErrorMessage/>
        <ErrorCode>0</ErrorCode>
      </BuildFormsPatch>
      <BuildFormsPatch errorcode="0"
        errormessage="Request queued @ 16:09:23 21 JUN 2005"
        errornumber="1011454">
        <ErrorMessage/>
        <ErrorCode>0</ErrorCode>
      </BuildFormsPatch>
    </Reply>
  </Session>
</eoapi:reply>
```

The QueuePatch EIP includes a method STATUS of the type HTTP request that obtains the current delivery status of a patch request. The parameters of the QueuePatch EIP are cnumber, cmf, email, STATUS, caseid. QueuePatch EIP returns errorcode, errornumber, error message. A sample valid STATUS XML request document to the base function server 20 is shown below.

```
<?xml version"1.0" encoding "UTF-8"?>
<eoapi:Request xmlns:eoapi="http://www.adp.com/eoapi" version="1.0">
```

-continued

```
<Session>
  <Connection>
    <Host>139.126.192.29</Host>
    <Product>RAMIT</Product>
    <Server>PDS</Server>
    <Password>SAM</Password>
    <Pooling>Yes</Pooling>
  </Connection>
  <Execute>
    <QueuePatch cnumber=C123123" cmf="05129587"
       email=jDoe@yahoo.com reqtype="STATUS" redata="1011454"
       caseid="10111454"/>
  </Execute>
</Session>
</eoapi:Request>
```

An example of an XML STATUS response document that indicates that the requested forms were successfully installed is shown below.

```
<?xml version"1.0" encoding "UTF-8"?>
<eoapi:reply xmlns:eoapi="http://www.adp.com/eoapi" version="1.0">
  <Session>
    <Reply type="Connection">
      <ErrorMessage/>
      <ErrorCode>0</ErrorCode>
    </Reply>
    <Reply type="Execute">
      <QueuePatch errorcode="0"
         errormessage="Forms Installation Successful"
         errornumber=RA000">
         <ErrorMessage/>
         <ErrorCode>0</ErrorCode>
      </QueuePatch>
    </Reply>
  </Session>
</eoapi:reply>
```

The plurality of form provider sub-systems 30 include the sub-systems of each individual lender, financial institution or governmental agency (e.g. Secretary of State sub-systems providing UCC forms for secured transactions) who have elected to provide forms to form users in electronic format through the forms distributor operating the base function server 20. Each form provider sub-system 30 communicates over the internet with the web server 12 to upload and alter images stored in the third party form images database 26. The form provider sub-systems 30 may also communicate with Credit services 90 over a credit gateway, as shown, for example, in FIG. 11.

Figure 12A:
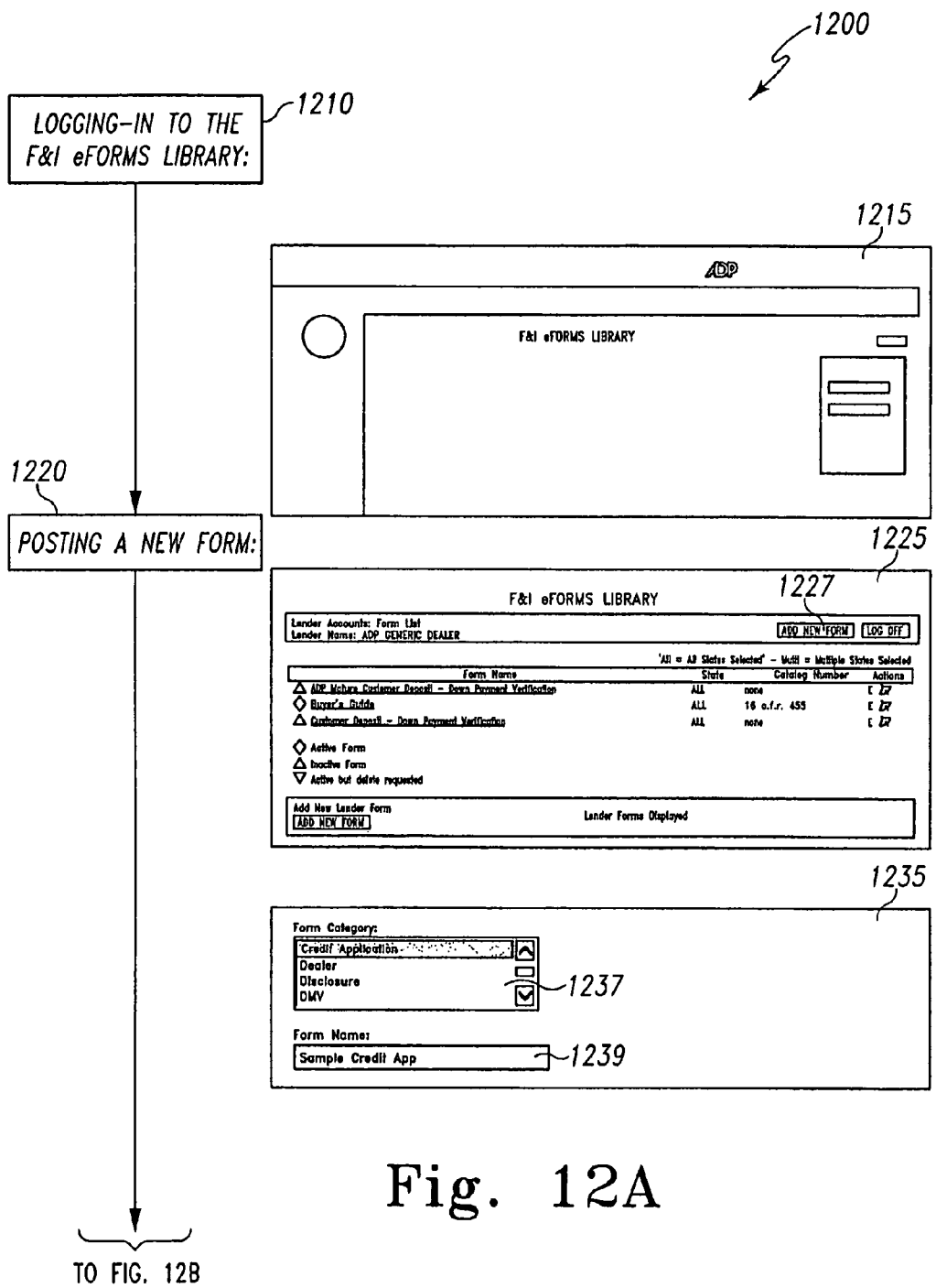
Figure 12B:
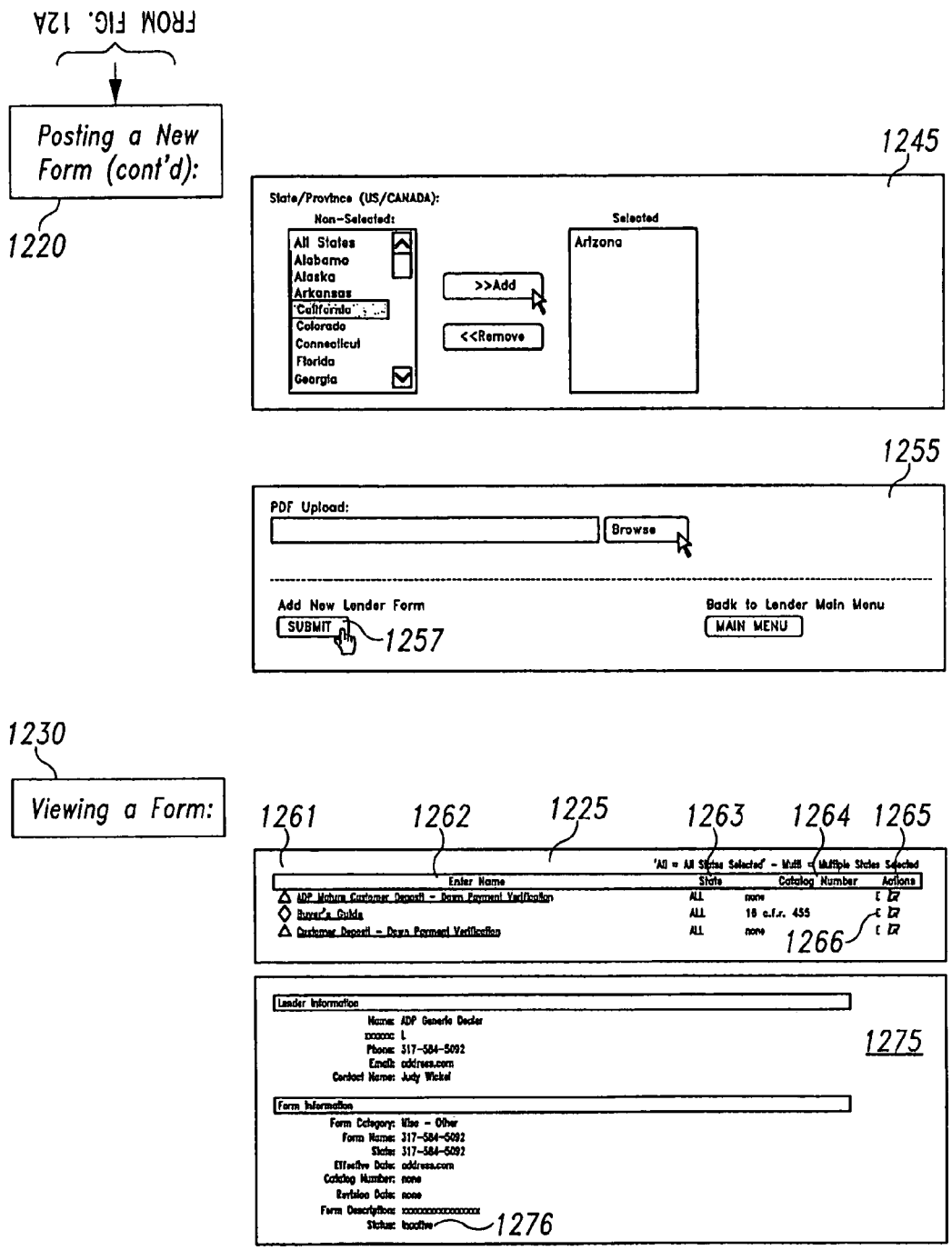
Figure 12C:
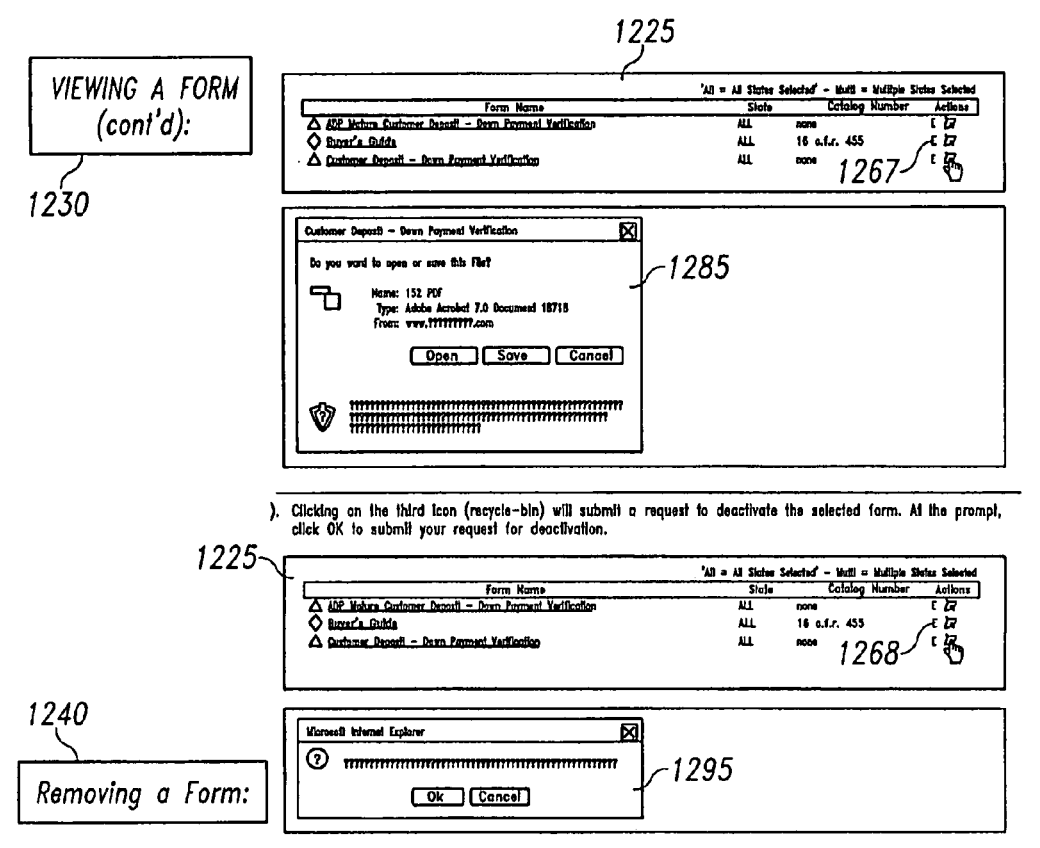

The disclosed system 10 allows a form provider such as a lender, insurer or government agency, to upload new forms, edit old forms, and "delete" old forms (they are flagged as deleted but remain in the database 26 and cannot be accessed by form users) to the file management sub-system 18 of the base function server 20. In one embodiment, the form provider utilizes the form provider's sub-system 30 to accesses the file management sub-system 18 via the internet so that forms can be uploaded in electronic format (e.g. .pdf) and stored in the third party form image database 26, as shown, for example, in FIGS. 3, 4 and 12. In alternative embodiments, paper forms may be submitted to a human form builder having access to the file management sub-system 18 of the base function server 20 for manual entry of the form into the third party form image database 26 and having access to the mapper sub-system 22 for creation of electronic versions of the form i.e. digital form overlays, by human form builders.

Figure 3:
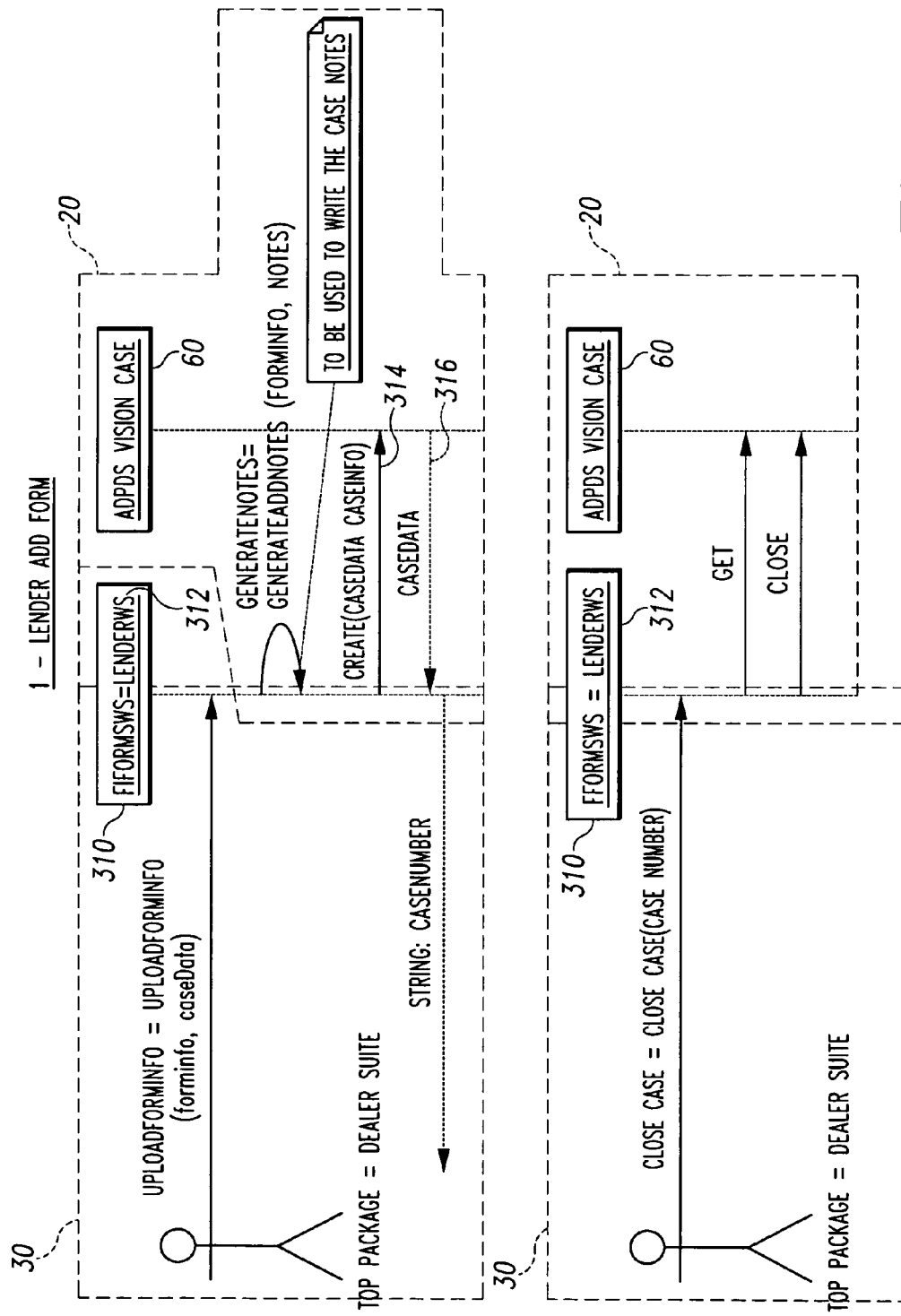
FIG. 3 and FIG. 4 show diagrams of the processes of the system that allow a lender or form provider to add a form to the system.
Figure 4:
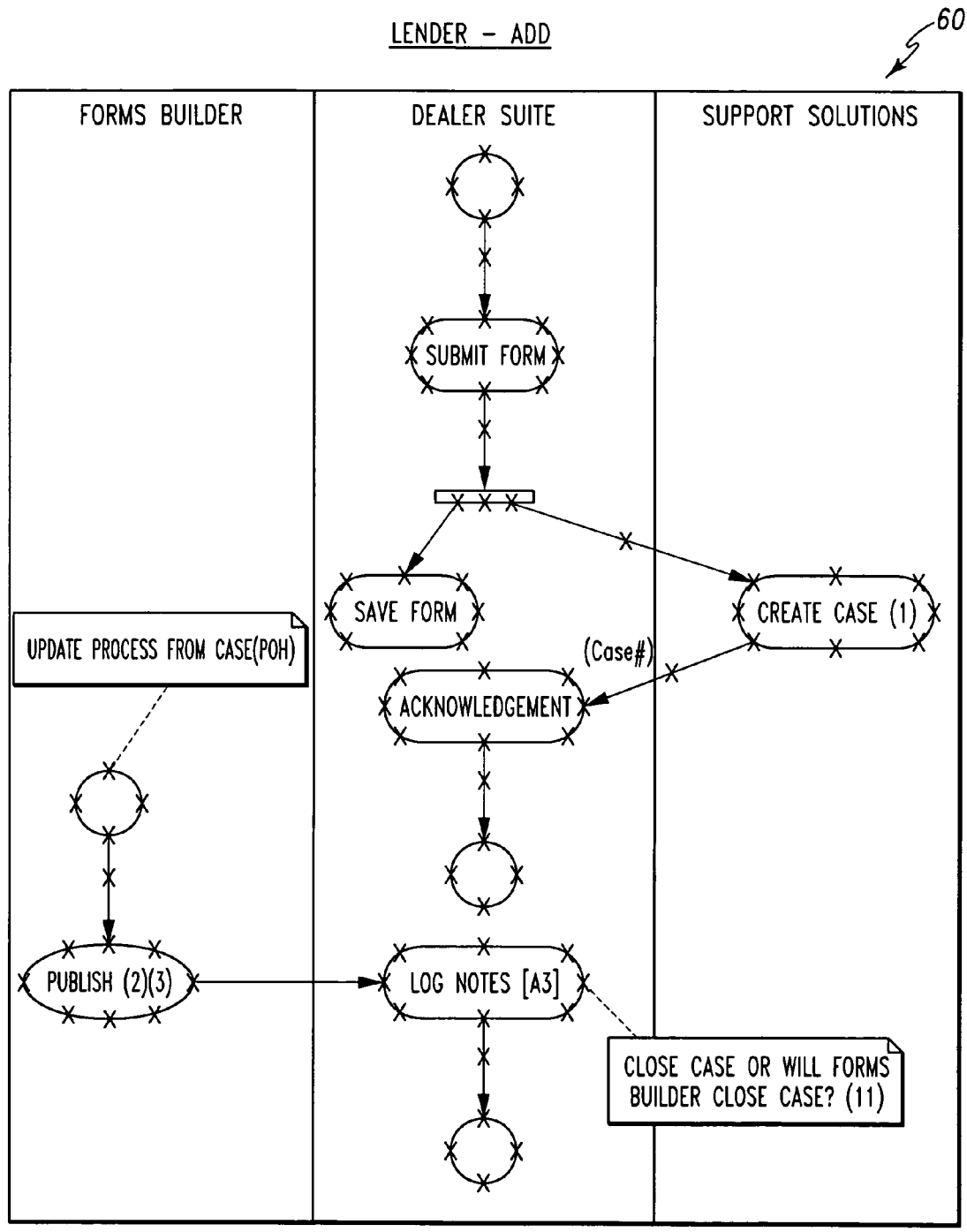
Figure 5:
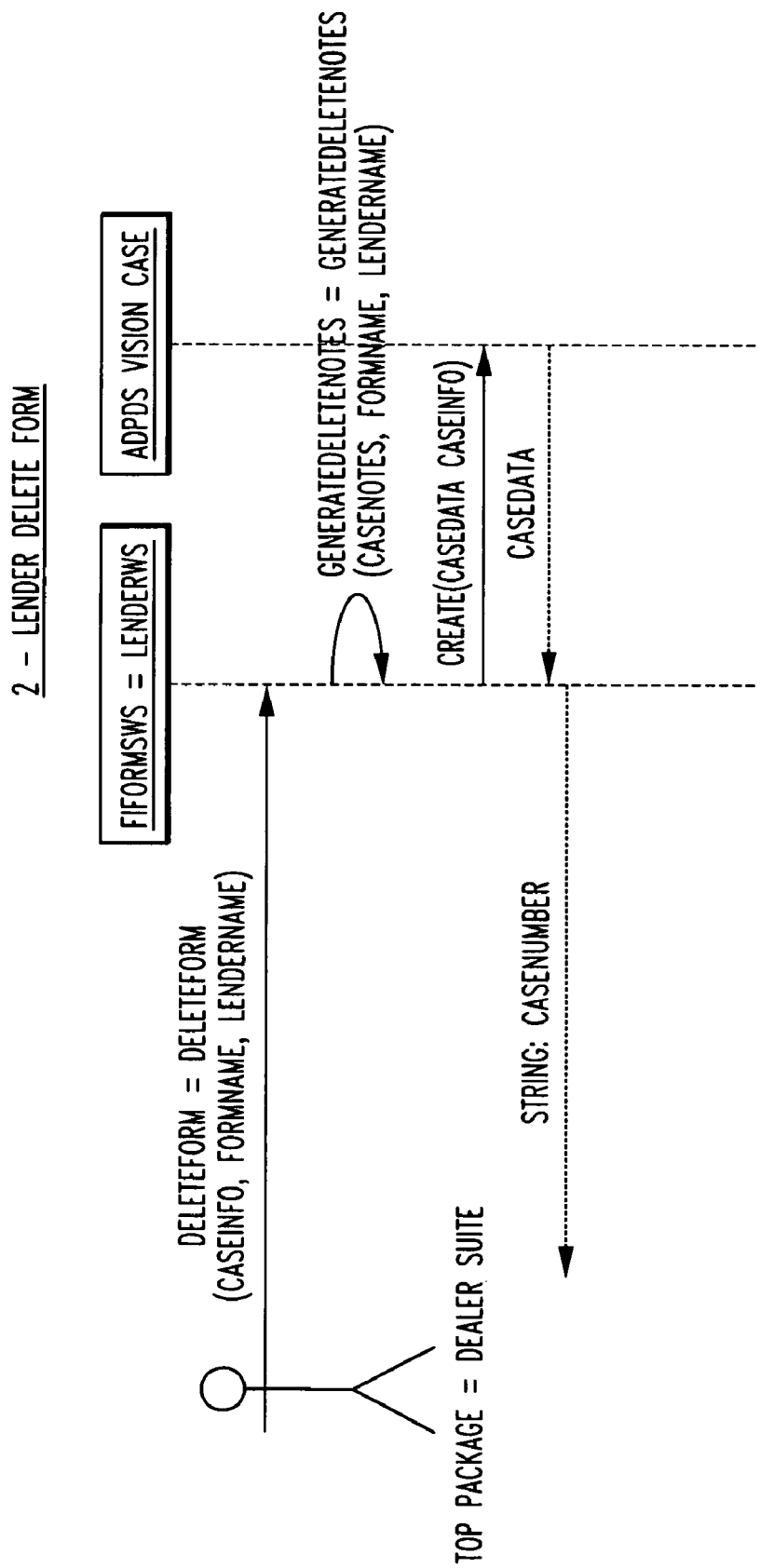
FIG. 5 and FIG. 6 show diagrams of the processes of the system that allow a lender or form provider to delete a form.
Figure 6:
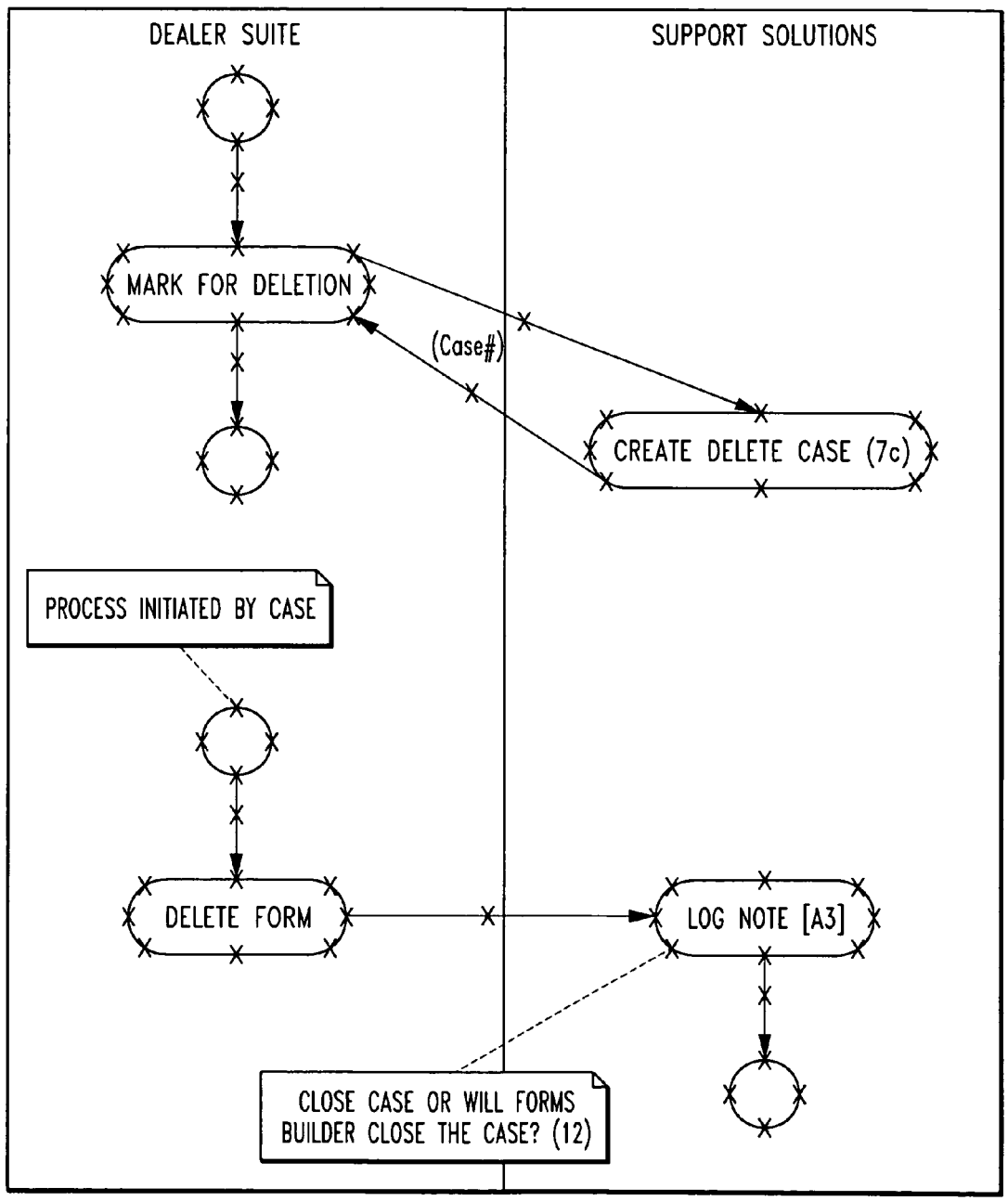
Figure 7:
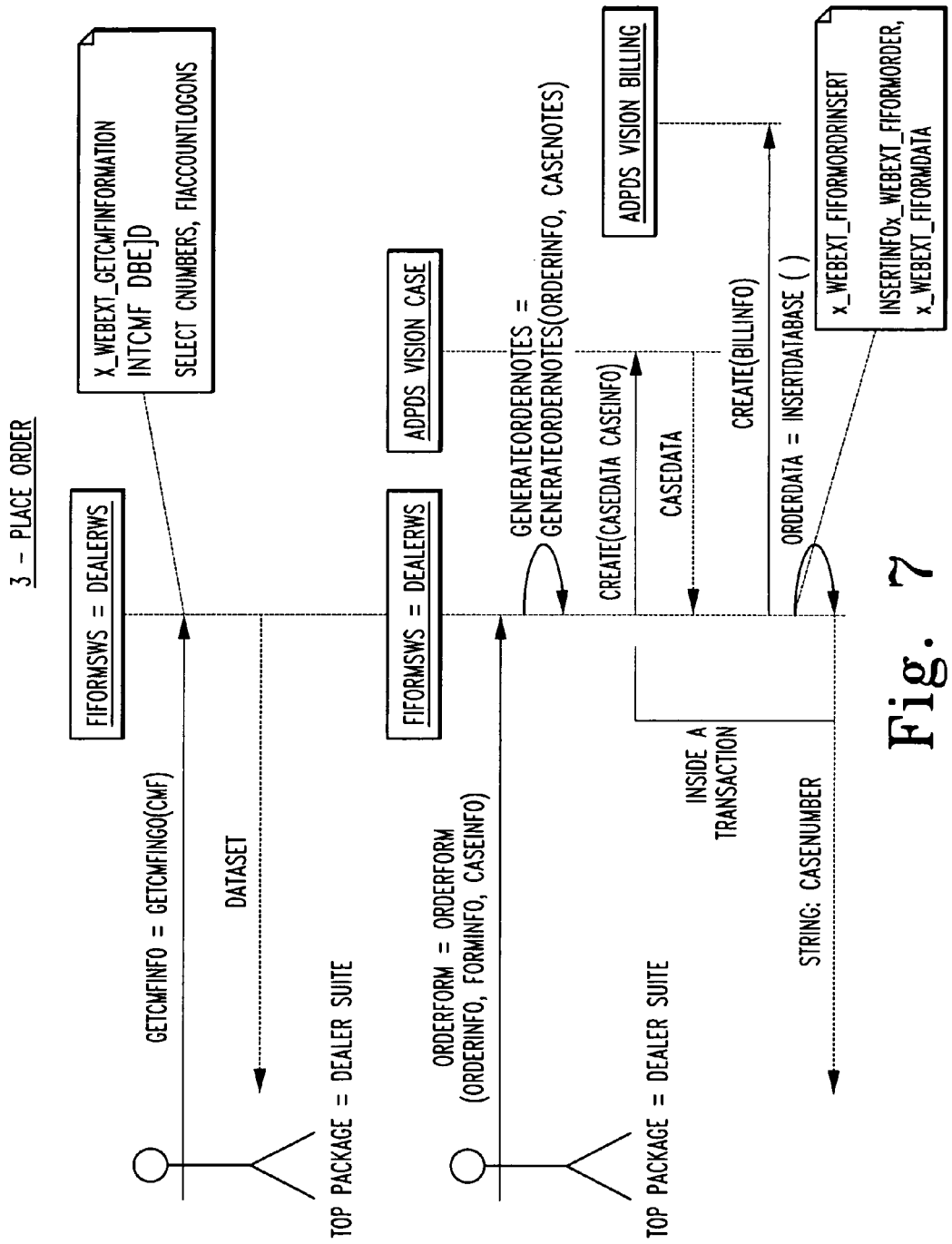
FIG. 7 and FIG. 8 show diagrams of the processes of the system that allow a dealer or form user to order a form.
Figure 8:
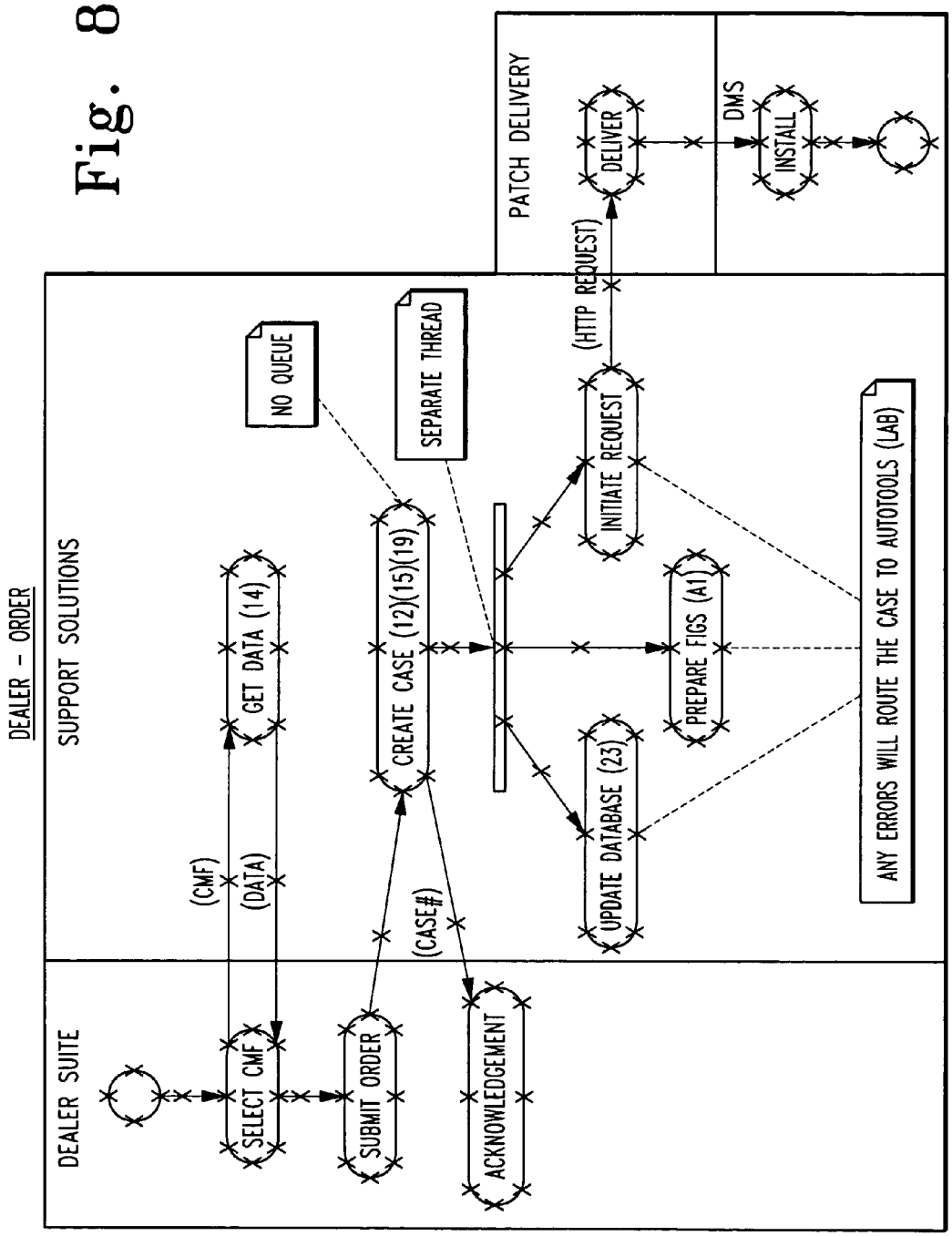

As shown, for example, in FIGS. 3 and 4, in one specific embodiment, when a form supplier such as a lender wishes to upload a form in standard electronic format, the form supplier initiates a web service 310, such as FIFormsWS, which was supplied by the forms distributor operating the base function server 20 to the lender. The web service communicates over the internet with a web service 312, such as LenderWS running on the base function server 20. The lender uploads form information and a standard electronic version of the form. The Lender web service on the base function server send a SOAP call 314 to the vision case server 60 of the file management sub-system 18 which creates a vision case for the form that is uploaded. This vision case includes case data and case info utilized to identify the uploaded form and the location in the third party image database 26 at which the uploaded form is saved (FIG. 4). A SOAP call is generated by the vision case server 60 supplying the case data to the Lender web service 312 which communicates a case number string to the FIForms webservice 310 identifying the case number of the uploaded form so that the lender can access the form at a later time. The lender then sends a CloseCase message through the FIForms web service 310 to the Lender web service 312 which communicates with the vision case server 60 indicating that the case should be closed.

Form users can access the system 10 using a web browser or other web client software running on their forms user sub-system 40 and view a list or forms library of standard forms for which digital form overlays are currently available. The form user can download a digital form overlay or a desired currently active form to the user's sub-system 40 in a generic format that is printable on whatever printer 42 is in the user's sub-system 40. While these downloaded digital form overlays are initially standardized, they are capable of incorporating custom terms unique to the user.

The system 10 and process for generating electronic forms creates a premapped data stream 1800 that presents all of the necessary information for completing a form in a generic format. To accomplish this, the premapped data stream 1800 includes headers which indicate the beginning of the data of certain types (preferably in logical groupings). The premapped data stream 1800 is generated from data stored on the database 52 or other memory location on the forms user sub-system by application software. A standard term resolution tool is utilized to acquire the application software generated data from the database and map that data into the premapped data stream 1800 as described in greater detail in this application.

Figure 11A:
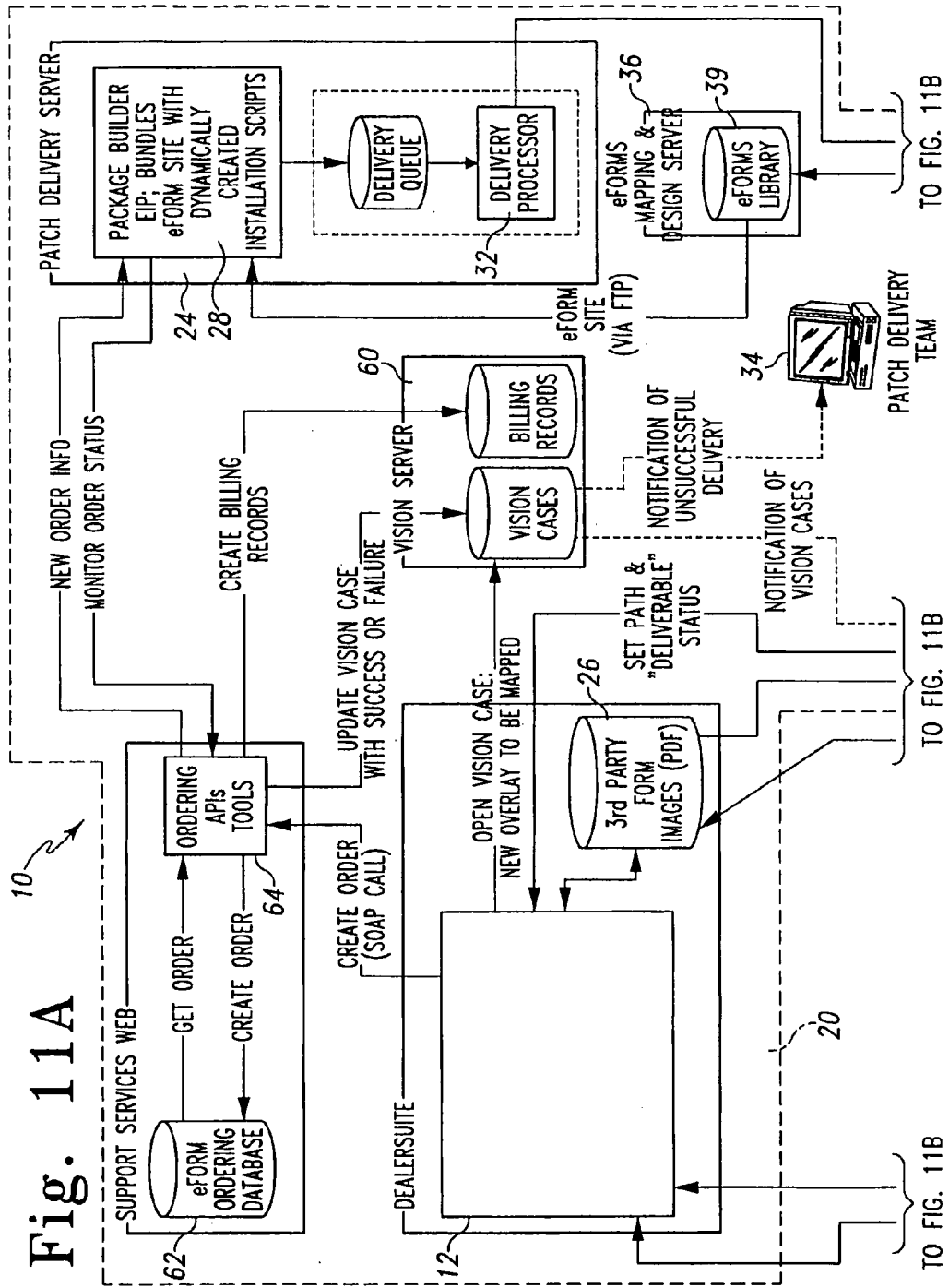
FIG. 11 shows a block diagram of one embodiment of the disclosed system.
Figure 11B:
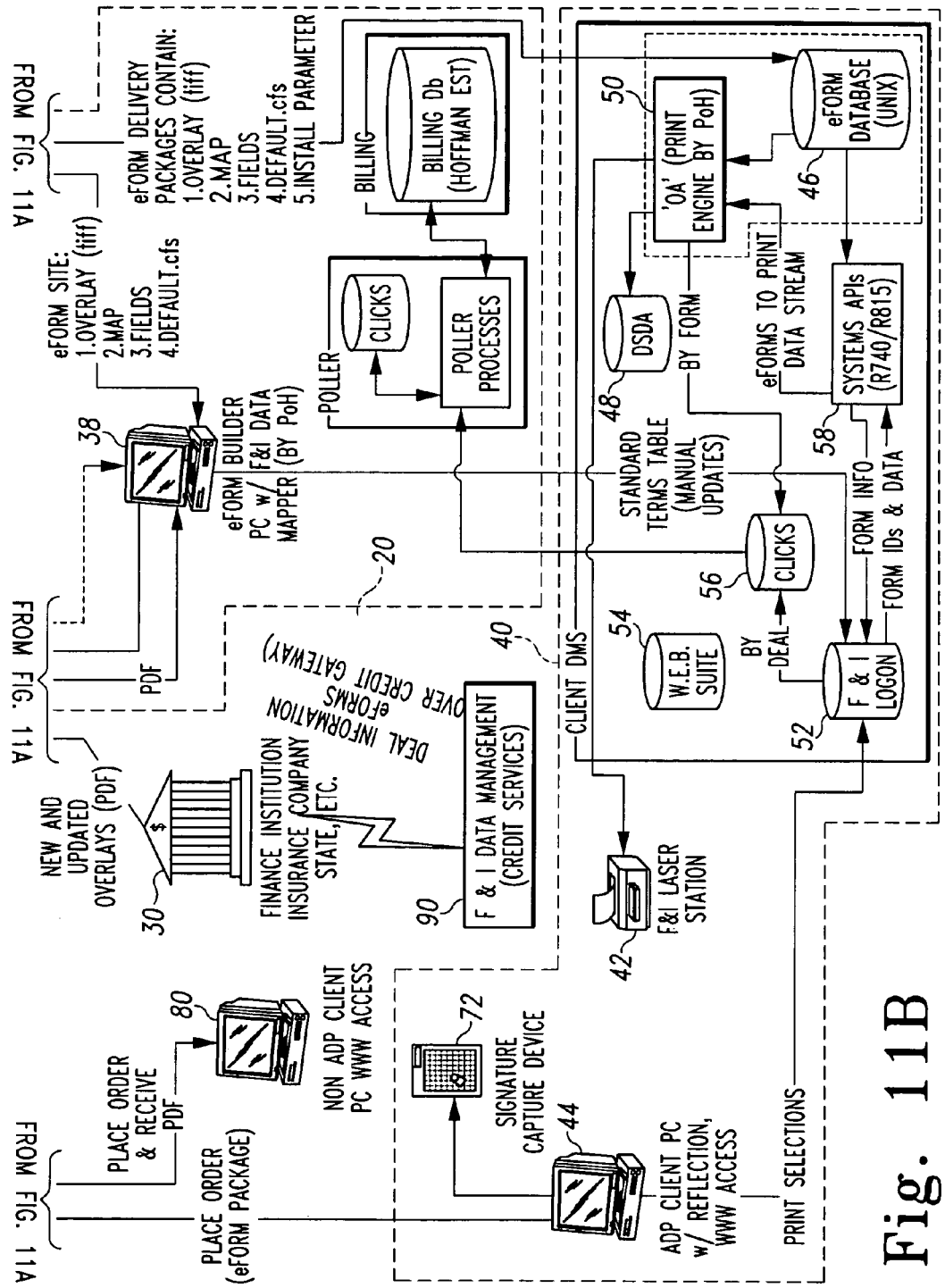

Referring to FIG. 11, in one specific example of the system 10 particularly configured for supplying financial and insurance forms to automobile dealers, the basic functions server 20 includes various networked computers and servers including a web server 12, a forms delivery server (a.k.a. a patch delivery server) 24, a patch delivery team PC 34, a forms builder staging system (a.k.a. a mapping and design server) 36 including an eForms or digital form overlay database 39, a form builder PC 38, a vision server 60, a third party form image database 26. The base function server 20 includes a support services web including an electronic form ordering database 62 and a form ordering application program interface ("API") tool 64. The base function server 20 includes web server 12 operating DealerSuite that provides an interface between the client system and the third party images database 26, the vision server 60 and support services web.

The forms user sub-systems 40 in the illustrated embodiment are operated by dealers who are clients of the forms distributor operating the basic function server 20. Each forms user sub-system 40 runs software supplied by the forms distributor, such as dealer management systems ("DMS") and have internet access for coupling to the base function server 20. Non-clients of the form distributor operating the basic function server 20 with internet access on their non-client computers 80 may also connect to the base function server and download certain of the forms in the file management sub-system 18 in their standard electronic file format. Each user sub-system 40 includes an electronic device 44 having internet access, an electronic forms database 46 wherein downloaded digital form overlays are stored and one or more printers including a laser printer 42. Each user sub-system 40 may also include a Document Storage and Document Archive database 48 acting as an electronic file cabinet for storage and archiving of electronic forms.

Among the programs and files operating on the user sub-system 40 are a standard forms resolution tool SSTT for mapping data stored in a database to a premapped data stream 1800 presenting such data in a consistent manner for all dealers to facilitate properly inserting the appropriate data into digital form overlays to generate a filled printed form and a F&I eForms Management program or print engine 50 and database 46. The print engine 50 provides an efficient method of printing F&I forms necessary to complete new/used finance/lease contracts and provides the ability to generate these eForms on a computer 44 and a printer 42 located at the point of sale of F&I services. The illustrated forms user sub-system 40 also includes a database 52 including logon information and data generated by application software, a w.e.b. suite database 54 and a clicks database 56. The w.e.b. database 54 and clicks database 56 are not necessary for implementation of the disclosed system and method. The forms user sub-system 40 also includes system APIs 58 to facilitate receiving and printing forms.

Figure 15:
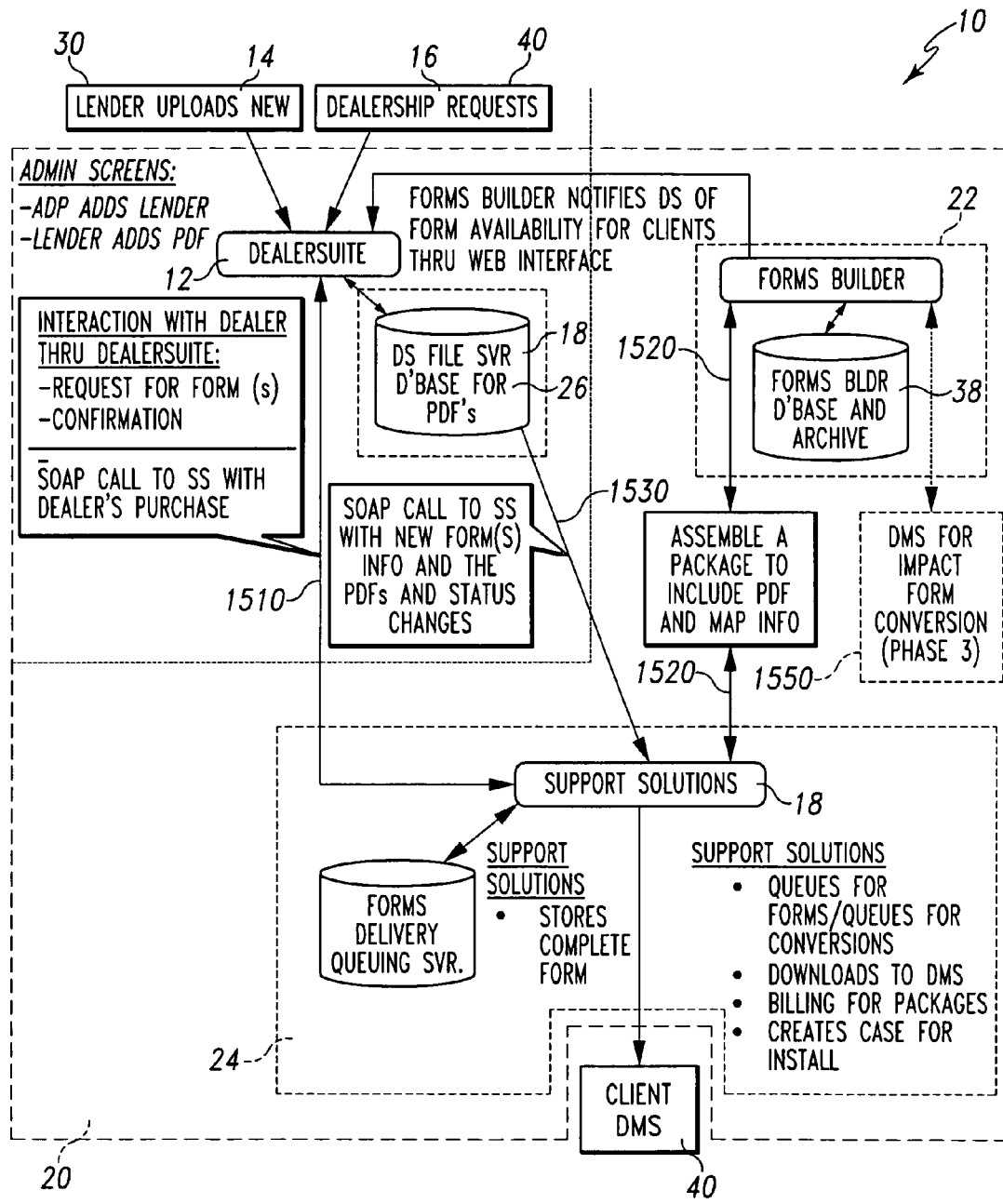
FIG. 15 shows a block diagram of one specific embodiment of the system for electronic generation and delivery of a document.

Referring now to FIG. 15, there is shown a block diagram of one embodiment of a system 10. According to this embodiment, the base function server 20 includes a web server 12 provided by a computer system on which a program such as "DealerSuite™" (abbreviated in the Figures as "DS") is executing. The basic functions server 20 running DealerSuite is configured to receive new uploads of forms 14 from form providers and receive requests for forms 16 from form users. The forms for uploading may be manually or otherwise delivered to an operator or human form builder interfacing with the base functions server 20. However, preferably, the form provider uploads, edits and manages forms 14 via the internet utilizing their form provider sub-system 30. In the illustrated embodiment, requests for forms 16 from form users are received digitally from the forms user sub-systems 40 running web client software such as a browser program. Thus, the system 10 includes a communications network coupling the base functions server 20 with a form provider computer sub-system 30 and the forms user computer sub-systems 40, as explained more fully herein. The base functions server 20 includes the third party form image database 26 of the file management sub-system 18 for storing uploaded electronically formatted forms such a .pdf formatted forms.

Multiple interfaces and data/file formats are utilized for implementation of the disclosed embodiment of system 10 as shown, for example, in FIG. 15. An interface 1510 between the web server 12 and Support Solutions of the file management sub-system 18 is required when a new form is presented to the system, a Lender requests a status change or forms are ordered by a dealer. A web interface 1520 for the mapper sub-system 22, which in one specific embodiment may be implemented using Data Mapper software, is used to log into the file management sub-system 18 for the purpose of loading a form to the mapper sub-system for conversion to a digital form overlay or for updating the status of a form after it has been mapped to a digital form overlay. An interface 1530 between the third party form image database 26 and Support Solutions of the file management sub-system 18 is also provided when a form is uploaded to allow a SOAP call to be placed containing new forms information, the name of the .pdf uploaded and status changes. This interface allows Support Solutions to validate that the form components are available and can be sent to the form user's sub-system or DMS. A confirmation is sent by the form user's sub-system 40 to the file management sub-system 18 as a response. A confirmation page is sent by the file management sub-system 18 to the forms user's sub-system 40 indicating that the form(s) are available and queued to the DMS, together with an indication of the price of the order. In one embodiment, an agree or submit feature is required for the form user to complete the electronic form order. A URL and an identifier is assigned to each order of forms which URL and identifier is used to track the order. An E-mail notification sent by SMTP to the form user placing an order containing that URL and identifier allowing the form user to easily access the status of their order without having to log into the eForms Library site.

As previously mentioned the forms management sub-system 18 includes an electronic forms database 26 on which a library of available forms is stored in a standard electronic format. The electronic forms library on the electronic forms database 26 is accessed online by a form provider such as a lender/vendor/captive to store digital forms and provides the ability to manage and maintain those forms. These requirements assume the lender/partner has provided approved *.pdf formatted forms for the database 26. The templates according to the present invention support the *.pdf format.

According to one disclosed embodiment, the lender uses their forms provider sub-system 30 to upload the *.pdf formatted standard forms to the database 26 which is accessible to the lender and to add information regarding the form. In the illustrated embodiment of providing forms to automobile dealerships, that information may include, without limitation the Vendor/Lender name or other identifier, the form category, the form description, the form name, the applicable state(s) in which the form is to be utilized, the catalog number of the form, the effective date of the form, the most recent revision date of the form, the manufacturer of the form and the form status. Among the statuses of the form are Active, Deleted or Inactive. A form categorized as Active contains all of the components necessary for the transaction the form is intended to evidence. This includes the *.pdf file stored on the database 26, a digital form overlay stored in the database 39 created from the .pdf file by the mapper sub-system 22 and any other relevant information needed to download and print the form on a laser printer. A form is categorized as Deleted as a back-end status used to indicate that this form was deleted by the lender. "Deleted" can also refer to the fact that another form with the same form name and a later revision date has been added to the form library. The Inactive category is reserved for forms that have been added by the lender with the associated *.pdf file, but that have not been mapped by the mapper sub-system 22 and for which there is no digital form overlay stored in the database 39. In one embodiment, the mapper sub-system (identified in FIG. 15 as "Form Builder") 22 is a combination of a process residing on the form builder PC that maps data to form a digital form overlay for printing and a person that maps data to form the digital form overlay for printing using that process. The file management sub-system 18 is preferably configured to prohibit a form provider from adding a form to the library without attaching the associated *.pdf file.

As shown, for example, in FIGS. 3, 4, 5, 6 and 12, the process 1200 of uploading, viewing, editing and removing a form to the base function server 20 includes several steps according to one embodiment of the method of delivering electronic documents. The lender utilizes its form provider sub-system 30 to connect to the web server 12 of base function server 20 to perform a logging in step 1210. The logging-in step involves navigating to the eForms Library page generated by web server 12 by entering the appropriate URL and entering log in data, such as a user name and password on the eForms library log in screen 1215. If the lender does not have a login for the eForms Library, the lender will need to contact support/administration personnel of the provider of the base function system. After logging in, the lender begins the posting a new form step 1220 by clicking the "Add New Form" option selection button 1227 provided on the lender account screen 1225. The base function server 20 causes a form information window 1235 to appear on the screen of the lender's form provider sub-system 30 with a form category field 1237 and a form name field 1239 that need to be filled out by the lender. For each form to be uploaded a territory screen 1245 is displayed for entry of information regarding all of the territories in which the form to be uploaded may be utilized. Finally an upload screen 1255 is presented for entry of the memory location where the electronic version (e.g PDF) of the form to be uploaded is stored on the form provider sub-system 30. The lender may browse the lender's local drive on their form provider sub-system 30 to find the *.pdf file of the form they desire to upload. Once the *.pdf file is located and designated on the screen 1255 which the base function server 20 causes to be generated on the screen of the lender's form provider sub-system 30, the lender hits the "submit" button 1257 and the *.pdf file is transferred electronically to the base function server 20 where it is stored on the third party form image database 26 of the system 20. The information entered in screens 1235 and 1245 is also associated with the uploaded file in the third party form image database 26.

At this time, according to this embodiment, the web server 12 communicates with Support Solutions of the file management sub-system 18. Specifically, a SOAP call that contains the new form information and the new form PDF file is provided to Support Solutions running on the file management server 18. Support Solutions creates a Vision Case for Forms Builder to identify that a new form exists. The base function system 20 generates a screen for display on the form providers sub-system 30 of the lender that provides the lender with the capability to view a form that was just uploaded or return to Main Menu. The screen viewed by the lender also displays an "Another Form" button to allow the lender to continue the process of uploading forms until all the desired forms are uploaded. The lender then logs out of the basic functions server 20.

Once at least one form has been uploaded by a form provider, when the form provider logs onto the form library website a list of forms and information regarding each form that have been uploaded by the form provider is displayed on the screen 1225 in table form. Each row of the table is for a specific form uploaded. The table includes a status column 1261 in which an icon showing the status of the form is displayed, a form name column 1262 in which the name of the form is displayed, a state column 1263 in which the territories in which the form is intended to be used is displayed, a catalog number column 1264 in which the catalog number of the form is displayed and an actions column 1265. The status of this form is automatically set by the system to the default status level of inactive immediately after a form is uploaded. If error occurs during the upload, the lender is provided with the opportunity to retry the upload. If the file is not uploaded, the previous information that was provided by the Lender is not processed. The actions column 1265 an icons are displayed to allow viewing, editing or deleting of a form. Clicking on the view icon 1266 initiates the form viewing step 1230 which causes a form information screen 1275 to be displayed. The form information screen displays information regarding the form and includes a clickable icon 1276 next to the form status information that when clicked causes an image of the form to be displayed. The actual image file uploaded can also be previewed by clicking on the second (preview) icon 1267 in the action column 1265. Clicking on the preview icon 1267 cause a prompt screen 1285 to be opened allowing the form provider to open the image file or to save the image file to there system 30.

In the disclosed embodiment, all forms can be modified/changed by having a new form take its place. According to one embodiment, forms are not actually deleted from the third party form image database 26 on the basic function server 20. Instead, "deleted" forms are flagged as deleted as the replacement form takes its place. A lender can indicate that a form is deleted by logging into the basic function server 20, highlighting the form to be deleted, and selecting the "delete" button 1268 which appears as the third icon in the action column of the table displayed in window 1225. Clicking on the delete button 1268 causes a prompt screen 1295 requesting that the delete operation be confirmed or cancelled. Once a form is deleted, it is no longer available for a forms user such as a dealer to view when searching for a form. Once deleted, a SOAP call is made to Support Solutions with the form information and status that the lender has marked the form as deleted. The Forms Builder then (upon receiving a notification that the form has been deleted) has an option to act on the form (i.e., mark the form inactive, etc.) or not.

Once a standard electronic format version of a form has been successfully stored on the third party image database 26, the system 10 dispatches a Vision Case to the mapper sub-system 22 indicating a new *.pdf is ready for mapping into a digital form overlay file, and uses the file transfer protocol ("ftp") to send the *.pdf to the ftp location of the mapper sub-system 22. As previously stated, in one embodiment, that mapping is made by an individual using a process residing on the system. Once the Forms Builder has chosen to act upon the Vision Case referring to a new form being applied to the electronic forms library 26 on the file management sub-system 18, the Forms Builder 22 retrieves the desired *.pdf formatted version of the form from the third party form image database 26. The Forms Builder then performs the necessary steps for the mapping of the form into a digital form overlay file. In one specific embodiment, the digital form overlay file is in tiff format. When the mapping is complete, the Forms Builder logs onto the file management sub-system 18 and updates the form status to "active" for searching, viewing, and ordering. In response to designation of a form as "active", the file management sub-system 18 then sends a notification to all users who had previously subscribed to the appropriate form provider's forms, that a new form is available from that form provider.

As shown, for example, in FIG. 15, the mapper sub-system 22 of system 10 may still generate the prior art impact form conversions of forms at a forms user's request and deliver those standard forms directly to the form user sub-system in a delivery step 1550.

The illustrated mapper sub-system 22 runs a mapper program 23 that works with forms in a standard format, such as PDF. However, the use of standard forms presented in electronic forms formats for uploading forms is not a requirement for a digital form overlay to be created and stored in the database 39. It is within the scope of the disclosure for a human form builder working from a paper copy of a form and using appropriate software to build a digital form overlay of the form from scratch. In addition, there need not be a direct correlation between the data to the completed on the form and the fields in the database 52 used to store data generated by the application software running on the forms user sub-system 40. Instead, the Data Mapper running on the mapper sub-system 22 provides means for generating digital form overlays of forms provided by a form provider that are stored in an eForm database 39. These digital form overlay files are transferred to forms user sub-systems 40 and stored in a database 46. The digital form overlay file is accessed by the print engine 50 and populated with data from the requesting form user's sub-system at the time of printing. In many instance, a payment from the form user to the form distributor operating the base function server 20 or to the form provider who provided the form is required before the digital form overlay file is downloaded to the forms user sub-system 40.

Figure 13A:
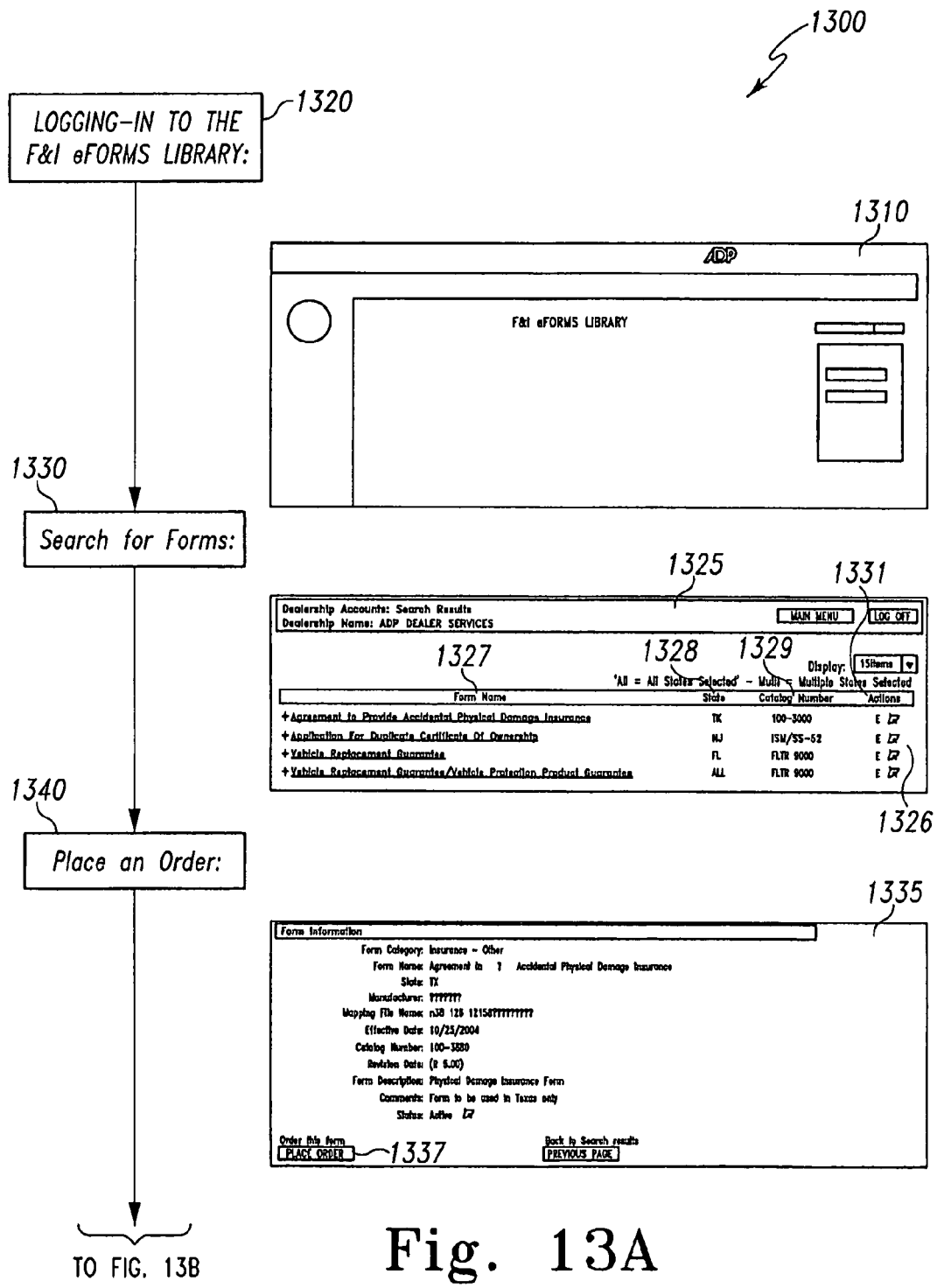
Figure 13B:
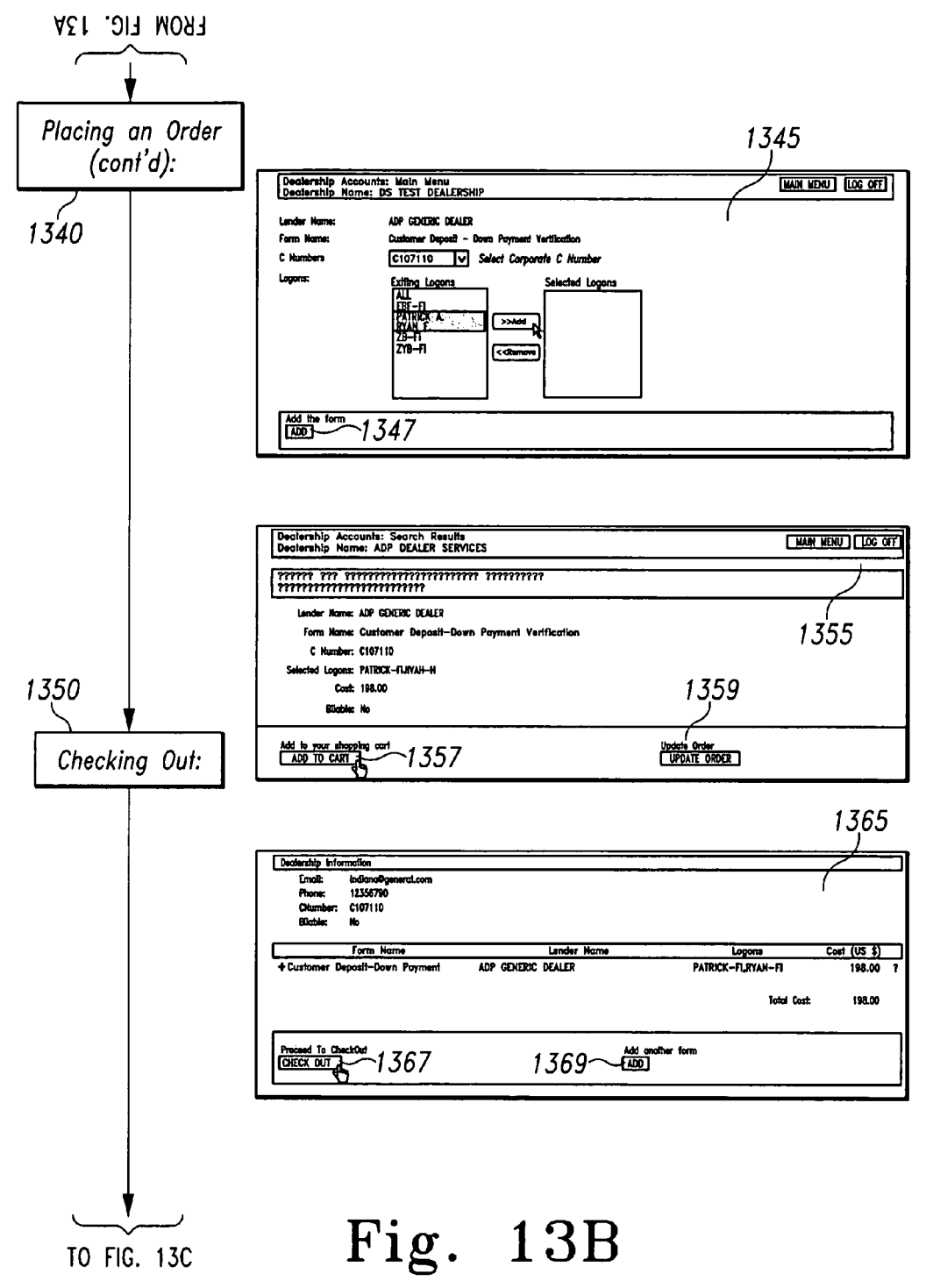
Figure 13C:
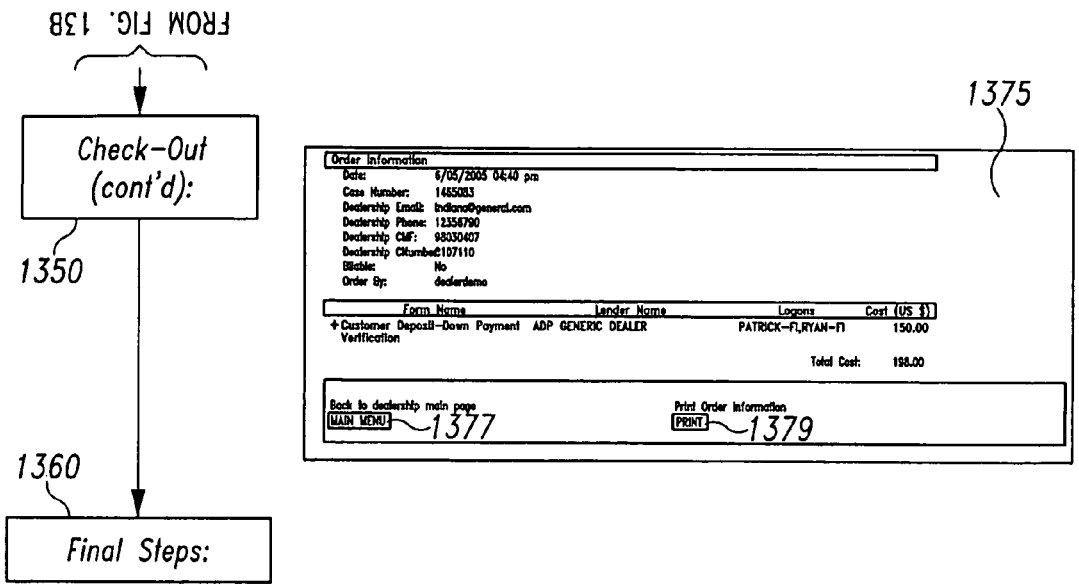
Figure 13D:
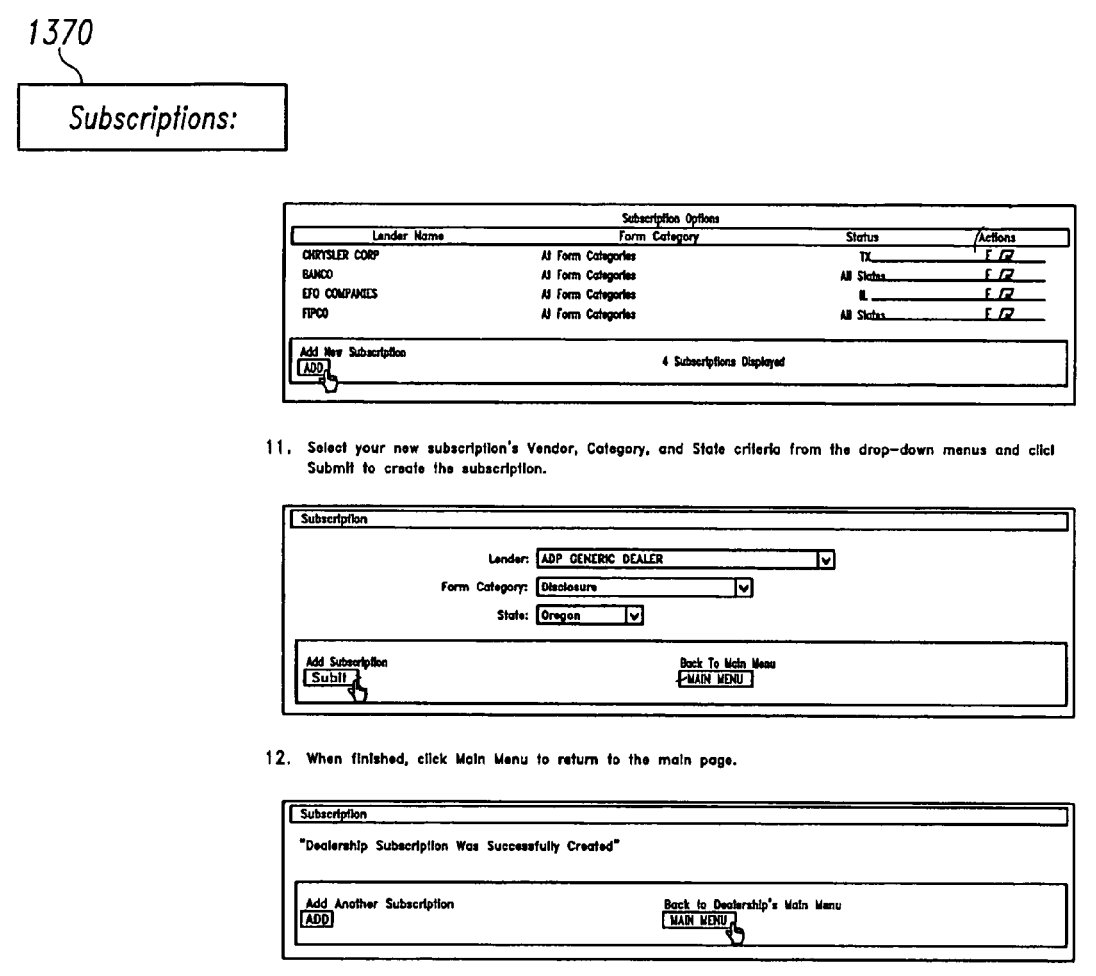

As shown, for example, in FIG. 13, in order to order a form, the form user accesses a web browser or other client web client software operating on the form user's sub-system 40 and enters the appropriate URL or web address to access the electronic forms library page 1310 generated by the web server 12 of the disclosed system 10 to initiate the ordering step 1300. Access to the electronics form library in one embodiment of the invention requires the form user to successfully login to the electronic forms library in step 1320. This log-in may be accomplished by entering a recognized user name and password at a prompt presented on the user screen. After successfully logging into the electronics form library in step 1320, the server application running on the web server 12 generates a screen 1325 which is presented on the display of the user sub-system 40 to allow the forms user to search for the form or forms the forms user desires to view and/or order in step 1330. In the event that log-in is denied, the administrator of the base function server 20 may be contacted so that the system administrator can update the account database 62 by entering a new account within the electronics forms library application.

The illustrated embodiment of the disclosed system 10 provides the ability to search forms in step 1330 and to order forms in step 1340. In one embodiment, the search function utilizes the following search criteria: Form Catalog number; Form Description; State; Form Category; Vendor/Lender; Manufacturer; and Revision Date. The system also provides the ability to select multiple forms for purchase during a single session in step 1340. This may be implemented using an order per selection of form or shopping cart feature.

After a search is completed, the search screen 1325 displays the search results 1326 as shown, for example, in FIG. 13. The displayed search results includes a column 1327 providing the names of the forms found, a column 1328 displaying the states in which the forms found are intended to be used, a column 1329 displaying the catalog numbers of the forms found and an actions column 1331. The actions column 1331 presents the user with the options of viewing a form by clicking on the "E" displayed in the actions column or previewing the form by clicking on the "W" displayed in the actions column of the search results. If the display option is selected, the electronic file stored on the third party form image database 26 is opened in a separate window. If the preview option is selected form and lender details are displayed on a form information screen 1335. The form information screen includes a place order button 1337 which initiates the placing an order step 1340.

Upon indicating that a form is to be ordered, a dealership accounts main menu screen 1345 is presented allowing the form user to enter a customer number and designate all logons that are to be granted access to the form to be downloaded. Once the customer number is entered and the logons to be granted access to the form are designated, the add button 1347 is clicked on the dealership account screen 1345 to add the form to the form user's order. After a form has been added, a dealership accounts order form screen 1355 is displayed which provides the option of adding the form to the order shopping cart by clicking an Add to Cart button 1357 or updating the order by clicking the update order button 1359 if details regarding the order are to be changed. If the add to Cart button 1357 is clicked, a dealership information screen 1365 is displayed showing dealer information and details regarding the forms that have been ordered. This screen 1365 also displays a check out button 1367 and an Add button 1369 If the add button 1369 is clicked, steps 1330 and 1340 can then be repeated to add additional forms to the order. If the check out button 1367 is clicked the checkout step 1350 begins.

Upon clicking the check out button 1367 in screen 1365, an order information screen 1375 is displayed. The information screen 1375 displays the details of the order and includes a back to main menu button 1377 to facilitate logging out of the system and a print button 1339 for printing the order information. After completing the check out step 1350, the base function server 20 causes an e-mail providing a link to the order status to be generated as part of the final steps 1360. Once the order has been fulfilled and the digital form overlay files for the forms requested in the order are downloaded to the eForms database 46 on the forms user sub-system, an order status page 1385 is e-mailed to the form user providing information regarding the order and indicating that the order has been successfully installed on the forms user sub-system 40

The ordering process 1300 also allows a forms user to perform a subscription step 1370 whereby a forms user can subscribe to a set of forms meeting specified criteria uploaded by a specific form provider and receive e-mail notifications whenever that form provider edits an old form or uploads a new form meeting the specified criteria.

The disclosed forms delivery system 10 and method downloads the digital form overlays stored in the database 39 to the eForms database 46 to the forms user sub-system 40 utilizing the forms delivery sub-system 28 which interfaces with Support Solutions running on the file management sub-system 18. The system provides the data to facilitate the delivery of the forms package.

According to one embodiment of the disclosed system 10 and method, there are a number of phases involved in printing an electronic form on the user's system to generate a hard copy filled form. The phases must be executed in a particular order to get the correct results. The diagram of FIG. 2 shows one embodiment of the various stages of printing an electronic form, and the relationship of the stages with the various application programming interfaces ("APIs") that are provided to the forms user by the forms provider of the disclosed system 10.

The forms user is able to enter data for inclusion in the form or forms to ultimately be printed by entering that data into the user's sub-system 40. This data is typically entered using application software running on the dealer PC 44 which stores such data in a database 52 or other memory location. In the example of the use of the disclosed system 10 and method for electronic document generation and delivery specific to providing the necessary forms for completion of an automobile transaction, several types of data can be entered to facilitate proper completion of blanks in the ordered financing and insurance forms. The types of data that can be entered by an automobile dealer into the dealers system 40 for inclusion of that data in the final printed form includes, but is not limited to: Custom Vehicle fields; Auxiliary fields (A1-50); Miscellaneous Prompts (FI-WIP #199-#208); Insurance fields (Credit Life/AH, MBI, GAP); Taxes (Misc. FI-WIP and/or FI-LEASE fields); Retail Fee/Options; Lease Fee/Options; Lease Mileage Fields; and, Lease Insurance Fields. Those skilled in the art will recognize that when forms are electronically delivered to facilitate the operation of other types of businesses, the types of data that can be entered by the forms user for inclusion in the hardcopy forms of electronically delivered forms will be selected in an appropriate manner. Thus, the disclosure of the types of data that can be entered, should not be construed as exhaustive.

In the disclosed embodiment of the system and method for electronic document generation and delivery, data entered by the form user into a database 52 or other memory location is incorporated into the appropriate location or blank in the electronically delivered digital form overlay and printed at the dealer's location to generate a completed hardcopy of the form. FIG. 2 shows one embodiment of the process used to integrate the data entered by a forms user in the appropriate location on the form and to print the form. The example shown in FIG. 2 is specific to the automobile environment with an automobile dealer (the forms user) utilizing digital form overlays downloaded from ADP, Inc. of Roseland, N.J., (the forms provider). ADP is the operator of the base function server 20 in this illustrated embodiment and maintains a database 26 of forms to which lenders and other financial and insurance institutions (the forms suppliers) upload standardized forms in electronic format and a database 39 including digital form overlays that have been mapped from the uploaded forms. Generally, to accomplish this integration of dealer entered data into a digital form overlay of a requested form that has been delivered to the forms user sub-system 40 utilizing a dealer management system (DMS) several steps are required. The example of FIG. 2 assumes that the form builder using the mapping sub-system running Data Mapper software 23 has already mapped the standard electronic version of the form in the third party form image database 26 into a digital form overlay that was stored in the eForm database 39 and delivered by the form delivery sub-system 28 to the database 46 on the forms user sub-system 40.

Figure 2:
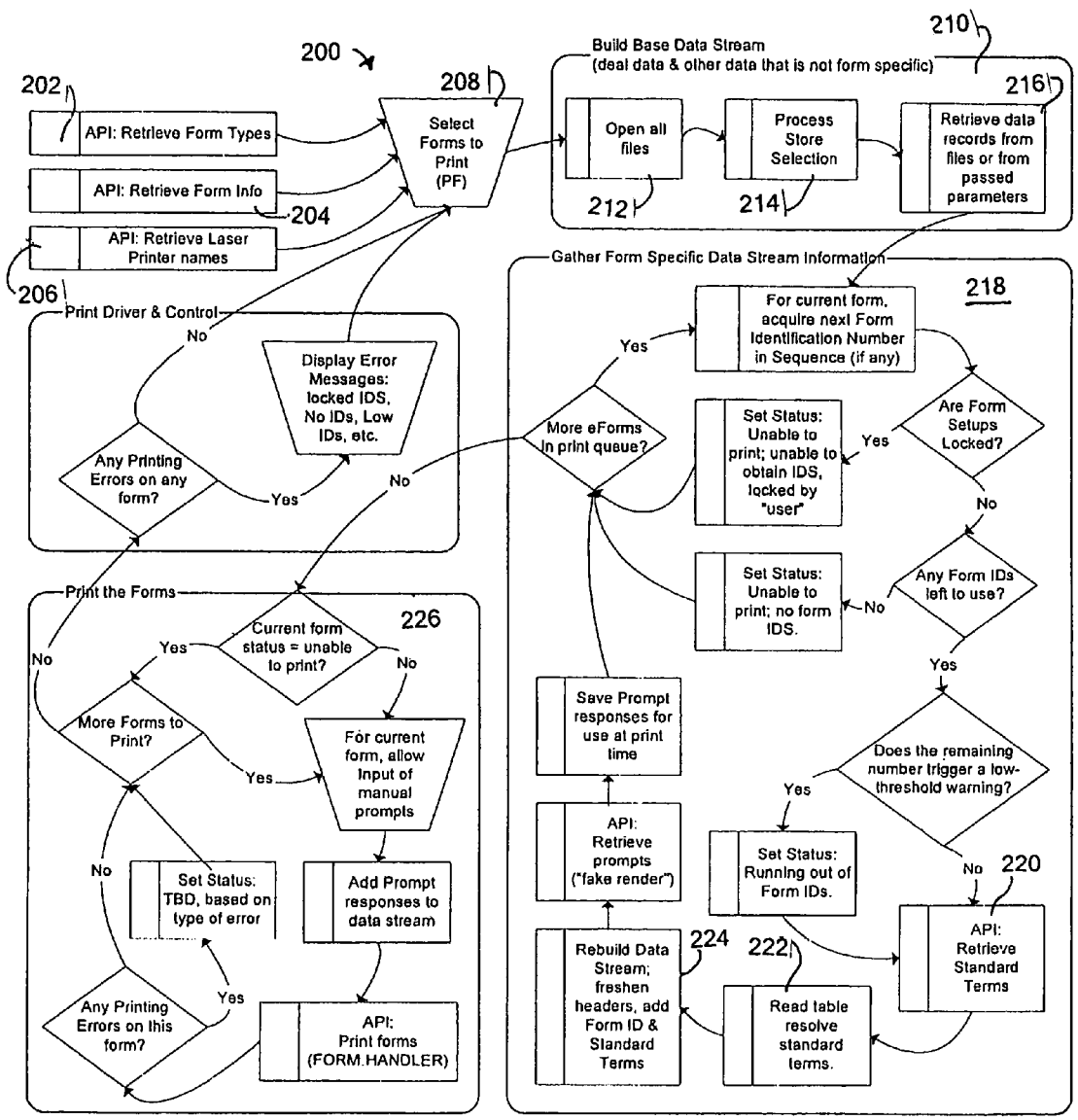
FIG. 2 shows a block diagram of one embodiment of the various stages of printing an electronically delivered form ("eForm"), and the relationship of these stages with the various application programming interfaces ("APIs") that are provided by the base function server of the disclosed system.

As shown, for example, in FIG. 2, the process 200 of printing an eForm includes several steps. In step 202, an API retrieves the Form Types to be printed. In the illustrated embodiment, it is assumed that the form type is an eForm which is a form to be printed in which data stored on the forms user system is integrated in designated locations on a digital form overlay. In step 204, an API retrieves information about the forms to be printed. In step 206, an API retrieves laser printer names. In step 208, the digital form overlay files of the forms to be printed are selected. In step 210, the premapped data stream 1800 is generated from deal data and other data that is not form specific. This involves opening all of the files in step 212, processing the store parameters in step 214 and retrieving data records from files or from passed parameters in step 214. In step 218, form specific data is gathered from the premapped data stream. This step involves examining the digital form overlay for the data field identifiers that were mapped into all of the locations on the form at which it was indicated that data was to be inserted and extracting the corresponding data from the premapped data stream 1800 utilizing an API for retrieving standard terms in step 220. A table is read in step 222 to resolve standard terms and the data stream is rebuilt, headers are freshened, form IDs and the appropriate standard terms extracted from the premapped data stream 1800 are added to the digital form overlay in step 224. The form specific datastream information gathering step 218 is repeated for all of the forms to be printed. Then each form to be printed that is able to be printed is printed in a print the form step 226 The illustrated print process flow also includes step not identified by reference numerals for controlling the number of times a form is printed, warning that the limit on the number of times a form can be printed is being approached, generating error messages in the event a form cannot be printed and allowing information to be input manually into the form to be printed.

Additionally, the patch delivery sub-system creates several files and directories if they do not already exist. The patch delivery sub-system generates a directory entitled, in one embodiment, /adp/3party/Ramit/FiForms. The /adp/3party/Ramit/FiForms, or a differently named directory serving the same purpose, is a directory for holding subdirectories and files for each order. These sub-directories hold the digital form overlays, installation script and the resulting status file for the installation process.

According to one disclosed embodiment, the mapping of data to form an image for printing is accomplished as follows:

The Forms Builder (in this case an operator utilizing the form builder PC 38) navigates to the eForms Library page and logs in. If the Forms Builder does not have a log in for eForms Library, he/she needs to contact support/administration of the company operating the system. The Form Builder has the ability to search for a form entering search criteria in the screen generated by the forms library web server 12 on the form builder PC 38. During a search for a form, the results page displays all forms that meet the entered criteria. Upon selection of a form appearing to be the desired form from a list generated during the search, the Forms Builder has the ability to view the form's profile, update the status of the form, view the *.pdf file, and/or download the form utilizing the form builder PC 38. The Forms Builder has the ability to mark the status of the form as active (available for viewing and ordering) on the basis that the *.pdf file exists. The forms builder marks the form as active one a digital form image overlay is created and the active status information is stored in the third party form image database 26 so that status information can be accurately reflected by the eForm library pages.

A Master Forms Builder, according to one embodiment of the current disclosure, is a person able to act on behalf of a lender. According to the one embodiment, the Master Forms Builder may perform the following steps. The Master Forms Builder navigates to the eForms Library page and logs in. This step, and most of the following steps described as being performed by the Master Form Builder, may be performed utilizing the form builder PC 38.

If the Master Forms Builder does not have a log in for eForms Library, he/she needs to contact support/administration of the company operating the system.

The Master Forms Builder has the ability to search for a form based on entered criteria. During a search for a form, a results page displays all forms that meet the entered criteria. Upon selection of the form from a search, the Master Forms Builder has the ability to view the form's profile, update the status of the form, view the *.pdf file, and/or download the form to the form builder PC 38 for mapping the form as a digital form overlay. The Master Forms Builder has the ability to mark the status of the form as active (available for viewing and ordering) on the basis that the *.pdf file exists and a digital form overlay has been created and stored on the eForm database 39. The Master Forms Builder also has the ability to perform all the functions of the Lender in case they need to act on behalf of the Lender.

A dealer or form user is a reseller of the services offered by the lender or form provider. According to one embodiment of the disclosed system, the dealer uses the system 10 as described below. First, a dealer needs to have access to the base functions server 20 through the dealer's forms user sub-system 40, such as by an internet connection and by being provided with a customer number, user name, and password for accessing the necessary components of the base function server. The dealer navigates to the eForms Library page and logs in. If the dealer does not have a log in for eForms Library, it needs to contact support/administration of the company operating the system.

Upon login, the base function server 20 causes a screen to be displayed n the dealer's forms user sub-system 40 depicting the eForms Library main page. When the eForms main page is displayed, the dealer is able choose the criteria for the form the dealer wants. Other functions, such as maintenance of the dealer's email subscriptions may also be provided to the dealer. The form or list of forms available to the dealer is displayed in the eForms Library. The Dealer is presented with only the forms that are in the active status. Any search or view of form information requested by the dealer can only be for those forms with a status of active.

The base function server 20 causes the eForms Library main page to display various clickable items. For instance, a dealer may click on the name of a form listed on the main page to view a profile of that form. Alternatively, the dealer may click on a displayed form's *.pdf file icon on the main page to view and print the selected form. The main page also presents an icon which when clicked upon downloads the *.pdf file to the dealer's forms user sub-system. For document control, management and security purposes the dealer may be presented with a Disclaimer, License and Liability Disclaimer that they need to agree with, prior to the download. This Disclaimer is presented only once for a group of forms selected.

The eForms Library main page also displays an "Order this form" icon which may be clicked upon to initiate the form ordering process. Once the Order This Form icon is clicked upon, a SOAP call to Support Solutions with Dealer and order information is sent and received. The results of this SOAP call is displayed to the Dealer so that the dealer can select the correct information for installation of the form. This information is used by the system for every form that the Dealer wants to order. The system also receives the cost structure information from this SOAP interaction so the system can calculate the cost of the entire order and present the cost to the Dealer for acceptance when the entire order is ready for check out. Once the dealer clicks "I accept", the system sends the total price to Support Solutions for the order and Support Solutions sets up billing for the order.

The dealer has the ability to perform another search and decide to order another form, accept the cost of the entire order, maintain email subscription, and Log Out.

Once an order is placed, the base function server 20 causes the dealer to be presented with a Confirmation page that the form(s) are available and queued to the dealer's database management system ("DMS") along with a URL, and a particular status ID or dealership ID for reviewing the status of the order. The base function server 20 also sends the dealer an e-mail after the dealer finalizes an order, with that URL and the particular status ID or dealership ID for reviewing the status of the order provided in the e-mail. When the Dealer clicks on the URL, a SOAP call is made to get the status of the order and present that information back to the dealer. In one embodiment, the dealer will not have to log onto to any website to get that status. Instead, the URL parameters are encoded.

The disclosed system 10 and method fundamentally changes the way overlays are handled from the prior art method. Form overlays contain the "artwork" on the form, i.e. the boxes, lines, graphics, and in many cases the static legal text of the document. The overlay is printed on the document and the variable data printed over the top of the overlay to generate a printed filled form. The prior art systems and methods of generating filled forms burned the form overlays onto physical cartridges of laser printers, which were then shipped to clients, and physically installed in slots in each laser printer or utilized paper forms that were loaded into impact printers. The disclosed system 10 and method added the ability to store form overlays in a digital format on the base function server 20 and to download these digital form overlays to the form user sub-systems 40 for storage in a database 46. This disclosed system 10 and method facilitates the use of laser printers 42 to print filled forms since laser printer manufacturers have announced that in the near future, printers with slots for cartridges would no longer be produced.

The form user sub-systems 40 have application software 45 (in one specific example ADP EFD software) running on the client pc 44. This application software 45, as shown, for example, in FIG. 11, stores form information, identification and data for deals in a database such as the F&I Logon database 52. The F&I Logon Database 52 also stores logon information regarding the form user that is provided to the DealerSuite web server 12 to facilitate form ordering by the form user. While the application software may, and the ADP EFD software does, provide advanced print spooler management, actual laser printer output is generated by a print engine 50 running on the form user systems 40. In one example this print engine 50 is software known as an "oa" print engine available from Profitability of Hawaii, Inc. The application software 45 allows the entry of and utilizes data regarding specific transactions which data is typically stored in the database 52. However the databases 52 of various form users may store the transaction information in different locations (fields) and may identify the fields with different titles. The "oa" print engine 50 performs several functions. The "oa" print engine 50 combines application data stored in database 52 or elsewhere in memory with a digital form overlay stored in database 46 to create a filled printed form document output to the laser printer 42 for printing and to the data storage and data archiving database 48 for storage and archiving. Data is combined with the digital form overlay based on previously stored form definition information. The "oa" print engine 50 provides a single interface for loading form definitions on the form user sub-system 40. The "oa" print engine 50 also enforces a common structure for storage of the various components of form definitions, including overlays, data mapping, field definitions, and general form properties. The "oa" print engine 50 creates "versions" of form definitions, so that historical documents can be reprinted accurately, even if a new version of the form definition has been created. The print engine 50 also provides an interface to data storage and archiving database management software (the "DSDA" product) 48, for automated archiving of forms that have been printed.

In one specific embodiment, the "oa" print engine 50 maps application data onto a printed page using two distinct styles of data mapping which will be referred to as standard mapping (a prior art method) and premapped mapping (the newer mapping technique utilized in the disclosed system 10 and method). There are no official names for these two styles, so occasionally premapped mapping will be referred to herein as "F&I" printing. The "standard" style is the original style of mapping that has been around since 1991 for utilization with printing information on preprinted forms utilizing an impact printer or onto form overlays burnt onto cartridges and inserted into slots on laser printers. Many application programs provided by ADP, including webSuite Parts, Service, and Accounting, use the standard mapping for printing. The "Premapped" style of mapping supports ADP's webSuite F&I printing.

Between the application software 45 running on the client PC 44, for example, and storing data on the database 52, for example, and the "oa" print engine 50 lies an interface layer 58. This interface layer 58 includes the FORM.HANDLER API and other APIs. The FORM.HANDLER API is hard coded to accept input from application software. For application software using "Standard" data streams, the FORM.HANDLER API supplies some additional features that are implemented at the time of printing. For applications using "Premapped" data streams, the FORM.HANDLER API is essentially a pass through.

The mapping software 23 is a program that loads on a Windows PC. The mapping software 23 is used to build a definition of a form that will tell "oa" the location where each piece of data will be placed on the form and the type of data that is to be printed at that location when the form is printed. This form definition built using the mapping software 23 is referred to herein as the digital form overlay. One type of mapping software 23 that may be utilized in the disclosed system and method is Data Mapper™ software available from Profitability of Hawaii, Inc. Data Mapper™ software generates digital form overlays that are stored in .tiff format. However, it is within the scope of the disclosure for other mapping software to be utilized and for the digital form overlays to be stored in other image formats.

It is within the scope of the disclosure for the mapper software 23 to be utilized to create "sites," which may contain many forms. When utilized in this manner, the form distributor operating the base function server 20 would retain a library of the entire set of forms on a forms user sub-system 40 and deliver the digital form overlays all together as a unit. However, since customizations to forms occur frequently it is difficult for any form distributor to keep an up-to-date library of all of the subscribing forms users' sites. Therefore, it is within the scope of the disclosure for tools to be utilized to allow maintenance of a client's forms one at a time. For instance, the print engine 50 on the disclosed forms user sub-systems 40 permits sites containing a single form to be added to an existing site on a forms user sub-system 40, rather than replacing the entire site. Also, it is within the scope of the disclosure for tools to be utilized with the disclosed system 10 and method that will pull back all or part of a forms user's site to and the form distributor operating the base function server 20 for editing.

In one specific embodiment, the mapping software 23 can create overlay forms for use with both the standard data streams and premapped data streams. Though both the standard and premapped data streams may be utilized with the print engine 50 to generate filled forms, the overall implementation of each method is very different. A "data stream" is simply a text file that contains data to be printed on a form. When a form is being mapped to generate an overlay for utilization with a standard data stream, a sample standard data stream is used to display data on the form. At print time, a data stream is produced dynamically by the application software 45 and passed to the print engine 50 for processing.

Though Standard and Premapped forms use the mapping software 23 to generate form overlays and rely on data streams to fill locations on the overlay with appropriate data, there are significant differences in how data is mapped, due to an inherent difference in the way the data streams are defined. In short, the contents of the data stream can be defined individually for each form (standard) as was done in the prior art, or a single pre-defined generic data stream can be created that applies to all forms that will be built and printed (premapped) utilizing the disclosed system 10 and method.

When mapping form overlays for utilization with a standard data stream, a view of the sample data stream is presented in a "data" window on the mapper software 23. In the data window, each field in the data stream that will be used on the current form for which an overlay is being created must be outlined and named before it can be dragged onto the form. The properties for each field are edited using a window. The structure of the standard data stream must remain relatively static. Since fields in the data are defined based on column, row, and width, any change to the position of existing data in a standard data stream requires the reprogramming of all forms that use a standard data stream containing that data. Data can be added to the standard data stream as long as no existing data is displaced, but any displacement of existing data may require all standard forms to be remapped. Even if a group of standard form overlays uses the same data stream, the location of fields within the standard data stream must be re-defined for each form. If the standard data stream is different for each form, or if standard data streams are small, this may be a reasonable task. However, if standard data streams are large, with a large number of fields to be defined, or if there are a large number of standard form overlays that use the same standard data stream, defining fields for each form quickly becomes a huge and prohibitive task.

The disclosed system 10 and method utilize premapped form overlays and premapped data streams to address the above identified drawbacks of standard form overlays utilizing standard data streams. The application software 45 utilized by the form user often utilizes large amounts of data that are stored in a very large number of data fields in a database 52. A very large percentage of this data will need to be printed on one or more forms utilized by the form user. In one specific embodiment the F&I application software, distributed by ADP, Inc., utilizes data that is stored in a very large number of data fields and which is incorporated into one or more forms. The F&I application software envisions that a very large number of different forms will be utilized to aid automobile dealerships in carrying out their transactions. One estimate puts the total number of different forms that might be utilized nationwide by automobile dealerships at well over 25,000. Therefore, rather than trying to manage 25,000 unique standard data streams, each containing the necessary data for a single form overlay, it is simpler and more cost effective to utilize a single, comprehensive premapped data stream 1800 that can be used for any form printed utilizing a premapped digital form overlay and data from application software 45.

To reduce the amount of programming required for mapping each digital form overlay, the premapped data stream 1800 defines the fields of data in the application software 45 once globally, rather than once for each form. This not only has significant advantages in the amount of time required to map forms for electronic delivery as digital form overlays, but it also allows common field definitions and name definitions to be utilized by everyone who maps forms, making it easier to train forms mapping personnel.

"Standard Terms" is the name applied to the technology developed to allow various systems, both internal and external, to access customized fields in a legacy database as if they were rigidly defined. Standard Terms are utilized to generate a premapped data stream 1800 from data stored in a database 52 or other memory location on a forms user sub-system 40 and to identify the type of data to be inserted at a designated insert location on a digital form overlay mapped from an electronic form image file stored on the third party image form database 26 of the base function server 20.

Figure 16:
FIG. 16 shows a partial sample of a cross reference table utilized to identify the location in memory in which a forms user stores data that is to be inserted into digital form overlays at locations identified by defined fields.

As shown for example, in FIG. 16, a cross reference table 1610 assigns names to a "virtual database" components. While shown as a portion of the translator 70 in FIG. 1, the cross reference table may be stored in memory on the computer 44 or some other memory location within the forms user sub-system 40. It is within the scope of the disclosure, for the cross-reference table 1610 to be maintained by the form distributor and stored in memory on the base function server 20 when the form distributor has access to the forms user sub-system 40

Continuing the example utilized in the background section, assume a software vendor wishes to add "Odometer Reading" data to a database because many or all of the users of the software utilize "Odometer Reading" data in generating documents and store that data at some non-standardized location under a non-standardized field name, e.g. within customizable field of a database maintained by the software user. Among the customizable fields which may be selected by each software user to store odometer reading data are Miscellaneous Field 1, Miscellaneous Field 2, Miscellaneous Field 3, Miscellaneous Field 4, Miscellaneous Field 5, Auxiliary Field 1, Auxiliary Field 2, Auxiliary Field 3, Auxiliary Field 4 and Auxiliary Field 5, for example. Since the software user already has the odometer reading data stored at an actual location on their database 52 or in memory on the forms user sub-system 40, a cross reference table 1610 may be set up that identifies a virtual field name with an actual location at which data corresponding to the virtual field name is stored in the software users physical database 52. To populate the Virtual Field Name column 1612 of the table 1610, the software vendor adopts a Standard Term name for data of a particular type. For ease of implementation, this Standard Term name may be the data field name already utilized by form builders to map legacy forms or a newly adopted Standard Term to identify data of a type newly added to certain forms supplied by a forms provider. In the illustrated embodiment, the Virtual Field Name column 1612 of the cross reference table is populated with all of the Standard terms currently being utilized by the forms builders to map digital form overlays of forms provided by forms providers. A different Standard Term is entered in each row of the table 1610.

In order to populate the Actual Location column 1614 of the cross reference table, the software vendor, or someone acting on their behalf, accesses the database 52 or other memory locations on the forms user sub-system 40 at which data that might be used to complete a form is stored. The location of data on the forms user sub-system 40 corresponding to the type of data to which each Standard Term utilized to define a virtual field name in the cross reference table 1610 is identified. This memory location is then inserted in the cross reference table 1610 in the Actual Location column 1614 in the same row as the Standard Term name in the Virtual Field Name column 1612 to which the data corresponds. If the data on the form user sub-system is stored in a database including field names, the field names at which data is stored in the database 52 on the forms user sub-system 40 may be utilized as the identifiers populating the Actual Location column 1614 of the cross reference table 1610. Alternatively, if data is stored on the forms user sub-system 40 in memory locations that are not in a structured database, a pointer to the memory location at which data is stored or the address in memory at which data is stored may be utilized to populate the Actual Location column 1614. The cross reference table 1610 thus provides a mechanism by which data on the forms user sub-system 40 corresponding to a Standard Term can be located. Utilizing the cross reference table 1610, a premapped data stream 1800 including all of the data stored on the forms user sub-system 40 that corresponds to a Standard Term can be generated with data corresponding to the data identified by a Standard Term populating a field of the data stream identified by a header corresponding to the Standard Term. Those skilled in the art will recognize that while the names populating the Virtual Field Name column 1612 of the cross reference table 1610 will be the same for each cross reference table generated for each forms user (e.g. a Standard Term), the identifiers in the actual Location column 1614 will differ from form user to form user. Thus, a separate form user specific cross reference table 1610 will be generated for each form user by querying the database 52 or other memory location at which data is stored on each forms user sub-system 40.

For instance, assume that a forms user is an automobile dealer who offers a two year 20,000 mile warranty on used cars that they sold to a customer performed the maintenance work upon and accepted as a trade-in toward the purchase of a new vehicle by that same customer but does not offer warranties on other used cars. When the dealer places a used car on their lot, they typically place a window sticker, often referred to as a Buyers Guide, on the car similar to that shown in the forms window pane 1710 in FIG. 17 for example. When a dealer acquires a used car, they collect certain information regarding the car such as the make, model, model year, manufacturer, VIN, the mileage appearing on the odometer, the name of the person from whom the car was acquired, the color of the car, the engine displacement, a list of optional equipment, an identification of any lienholder(s), the balance due on the car loan for which a lien is held and other information. When the vehicle is disposed of, additional information is acquired regarding the disposition of the vehicle. Some or all of this information is used to fill out various forms related to the acquisition and subsequent disposition of the vehicle and thus is stored in memory on the automobile dealer's computer system 40.

Assume one specific forms user utilizes a legacy version of software provided by the forms distributor operating the base function server 20 which legacy software stores data in a database formatted utilizing the Standard Terms in use at the time the software was created by the forms distributor and auxiliary fields and miscellaneous fields. At the time the software was provided to the forms user, no forms utilized Odometer Reading data, provided warranties on more than eight systems or provided locations for entry of information regarding the buyer's e-mail address. Assume further that a form provider has since modified some of its forms to use Odometer Reading data, provide warranties on ten systems and provided locations for entry of information regarding the buyer's e-mail address. The form distributor adopted Standard Terms to identify that type of data and in the current version of application software provided to forms users causes that data to be stored in locations in a database identified by the Standard Terms adopted. In one illustrated embodiment, the forms distributor adopted the Standard Term "Odometer Reading" to reference Odometer Reading data, the Standard Term "BuyerEmail1Address" to identify data regarding the Buyer's first e-mail address and the Standard Term "BuyerEmail1Desc" for data describing the buyer's first e-mail address. In keeping with the forms distributor's prior usage of Standard Terms related to the systems covered and duration of warranties on covered systems, the form distributor adopted the Standard Term "SystemsCovered9", "Duration9", "SytemsCovered10" and "Duration10" to identify data related to the ninth System covered and warranty period and tenth system covered and warranty period, respectively.

One specific forms user utilizing the legacy software elected to store Odometer Reading data in Miscellaneous Field 3, the ninth system covered by warranty in Miscellaneous Field 1, the length of warranty provided on the ninth system covered in Auxiliary Field 1, the tenth system covered by warranty in Miscellaneous Field 2, the length of warranty provided on the tenth system covered in Auxiliary Field 2, the buyer's e-mail address in Auxiliary Field 3 and a description of the buyer's e-mail in Auxiliary Field 4 on the legacy database. The forms distributor operating the base function server 20, or someone acting on their behalf, creates a table on the forms user sub-system including all of the Standard Terms used by the form distributor in the Virtual Field Name column 1612 and the location at which the forms user stored the corresponding data in the Actual Location Column 1614. FIG. 16 shows a portion of the cross-reference table generated utilizing the above example. The ellipses indicate that all of the Standard Terms utilized by the forms distributor are included in the Virtual Field Column 1612 and that the remaining entries in the Actual Location Column 1614, in the above example, are the same as the entry in the same row of the Virtual Field Column 1612.

Now, when forms or interfaces to add-on or remote software products are programmed, references to the "Odometer Reading" fields are intercepted by a translation routine 70 which translates the "Odometer Reading" reference into an Actual Location and acquires the data at this Actual Location to generate the premapped data stream. This translation routine 70, in one embodiment, is a function running on the forms user sub-system 40. Access to the translation routine may be limited to form distributor personnel. In the example above, the "Actual Location" is "Miscellaneous Field 3".

From this point forward, the software vendor or forms distributor programs all forms, subroutines, and interfaces to refer to the cross reference tables. If, at some point in the future, the software vendor or forms distributor decides to add a real database field for "Odometer Reading", at the dealer or user's discretion, the cross reference table can be easily modified to point to the new field. When this change is made, all forms, interfaces, and subroutines which are already using the translation layer, automatically begin to use the new database field without additional programming. Through the utilization of Standard Terms, the cross reference table the translation function and the print engine 50, forms and other system components need not be re-processed or modified in any way. Systems components (including forms) are programmed with the virtual field name, and remain that way. Each time the system components needs to access the virtual field, the virtual field name is translated to an actual, physical database location in real time.

In one specific embodiment, the translator routine 70 is a Setup Standard Terms Table function ("SSTT function"). This is a function that is part of the application software on a forms user sub-system 40. Only form distributor personnel are allowed to use this function. Form distributor personnel connect to each forms user sub-system and set up the translation table for each forms user.

Figure 17:
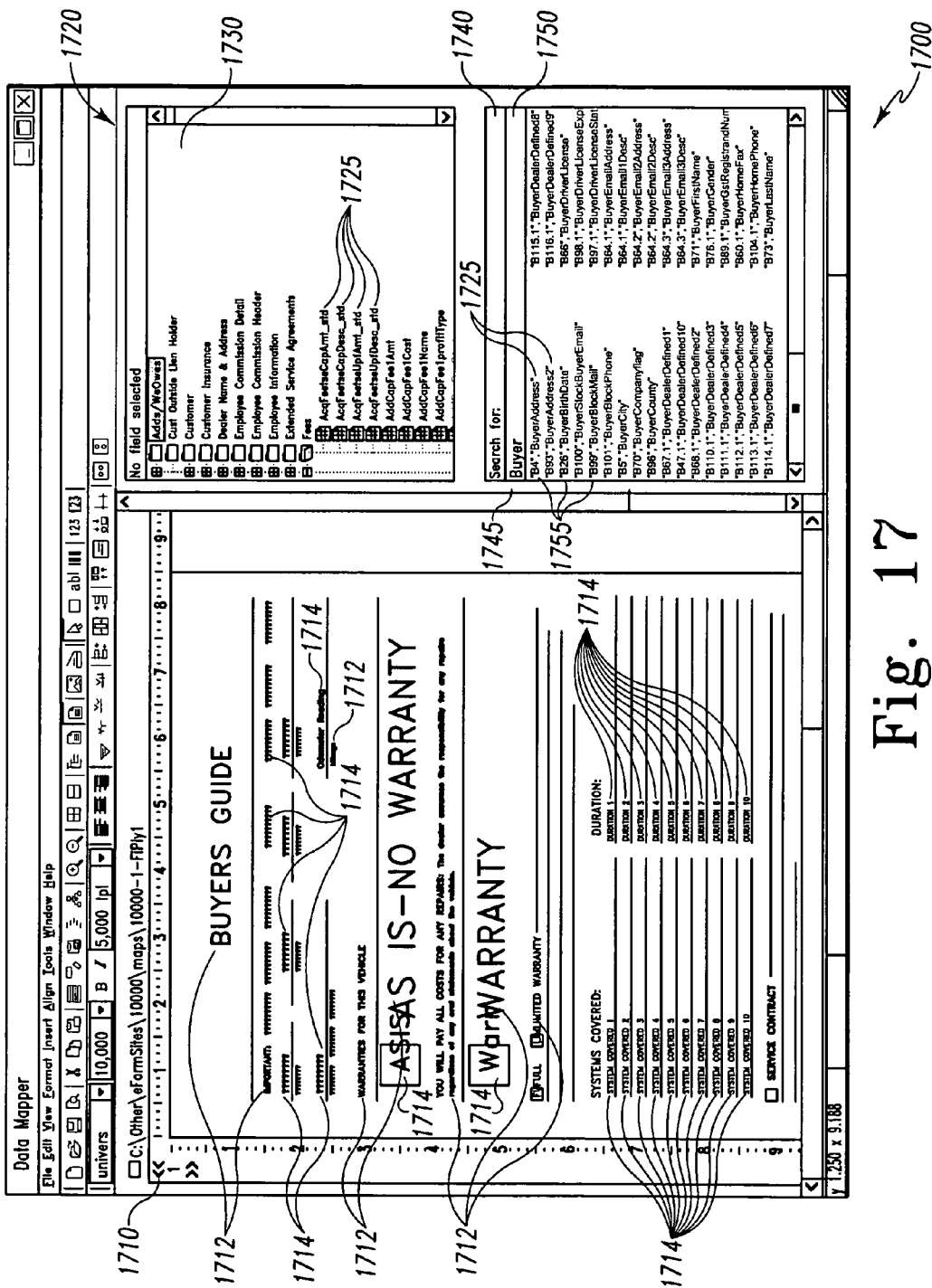
FIG. 17 shows a screen shot generated by mapper software running on a mapper sub-system showing a graphical depiction of a digital form overlay including generic graphical and textual information and locations in which data is to be inserted to generate a completed form containing data field names that are to be inserted in those locations by dragging field names from either a pane and a pane displaying field names in a directory format or a search pane.

Additionally, the Data Mapping software 23 running on the mapping sub-system 22 used by Forms Builders, fully supports the mapping of forms using Standard Terms in place of actual field references, as shown, for example, in FIG. 17. Using this tool 23, in combination with the other components of Standard Terms, Forms Builders can create forms that are useable by all forms users, regardless of the setups they use for customizable fields in the database 52 on their sub-systems 40. This allows forms to be mapped once, instead of thousands of times, resulting in a significant cost savings to the form distributor. Furthermore, the ability for previously mapped forms to be delivered to clients with no customization allows the forms distributor to respond, when requested forms have already been mapped into digital form overlays, much more quickly than in the past.

At print time, a "data stream" is created, containing customer and client data. This data stream is combined with a digital form overlay to create a filled form document, either on paper or in electronic form. As the data stream is built, Standard Terms that are used on the form are included, along with the current database field to which each Standard Term resolves. The "oa" print engine 50 makes use of the Standard Term resolutions included in the data stream, so that the correct data is pulled from the data stream for each referenced data field.

Since data fields in the premapped data steam are pre-defined, a different view of the data stream is able to be implemented with the mapper software 23. The mapper software 23 no longer needs to show the contents of the data stream as was done when mapping form overlays utilizing standard data streams. Instead the mapper software 23 can show the actual defined fields that contain data in the premapped data stream 1800 that will be inserted in locations on the digital form overlay. As shown, for example, in FIG. 17, the mapper software 23 running on the mapping sub-system 22 displays a screen 1700 to the form builder operating the mapper sub-system 22 which includes an overlay window 1710 displaying an image of the form overlay and a list window 1720 including a Fields list pane 1730 containing list of icons associated with and identified by defined field names 1725 accessible through a file menu and a search pane 1740 that facilitates searching for defined field names by entering a search term 1745 in a search field 1750 in the pane 1740. In the illustrated embodiment, the icons of the defined field names 1725 in the list pane 1730 are grouped logically; customer data grouped together (illustratively in a separate "folder"), fee fields are grouped together, and so on. The search pane 1740 also gives the forms mapping person the ability to search for a pre-defined fields by name, or by a secondary reference 1755. In the illustrated embodiment of the screen 1700 displayed on the mapper sub-system 22, a secondary reference 1755 for each defined field 1725 in the list displayed in the search pane 1740 is provided which corresponds to references used for data types with Impact forms building. Also, in the illustrated embodiment, the defined field names 1725 are the same as Standard Terms which are explained in greater detail herein. Thus, personnel experienced with Impact forms building may find the transition to premapped digital form overlay building easier since they will not necessarily need to learn all of the new field references up front.

Having the fields in the data stream pre-defined makes it possible to "drag and drop" icons for the defined field names 1725 corresponding to the fields in the premapped data stream 1800 onto the form overlay depicted in window 1710 much more quickly. As shown, for example, in FIG. 17 the icons for the defined fields 1725 and the actual form image that will be generated by the digital form overlay are presented side by side. A person building forms can simply drag an icon for a defined field 1725 or reference from pane 1730 or pane 1740 onto the image of the form overlay displayed in window 1710 and drop the icon 1725 in place to simultaneously define a location at which data is to be printed on the form overlay and the type of data that is to be printed at that location. The Buyers Guide form overlay displayed in window 1710 has already had locations 1714 designated at which data is to be printed. In these locations 1714 the name of the defined field in the data stream from which data is to be acquired and printed at the location 1714 is displayed on the image of the overlay.

To implement printing utilizing as premapped data stream, additional statements are added to the file C:\IMIGIT\DataMapper\settings\oa\apps.ini. A section must be added to this file so that both "oa" print engine 50 and the Data Mapper software 23 will recognize that a new application exists. In one specific example, a section designated [LM] for laser management is added to this file. One embodiment of the [LM] section appears below.

[LM]

```
FieldsFile=FORMTYPE
Install_Path=LM
Fields_Path=fields\LM
DSD_File=.\app\LM\LM.dsd
Mapper_INI=.\app\LM\mapper_DSD.ini
StandardTerms_File=.\app\LM\LM.std
Cartridge_Source_Path=cartridges
```

The apps.ini file is installed on both the mapper sub-system 22 of the base function server 20 and on the form user sub-system 40. A copy must be on each PC 38 where data mapping will take place for the new application. A copy must also be in place in /adp/3party/dadss/piee/settings/oa on each form user sub-system 40 on which printing of forms using digital form overlays and premapped data streams will take place.

Upon modifying the app.ini file as described above, a folder and a set of setup files are created for the new application. In the LM example, the folder C:\IMIGIT\DataMapper\settings\oa\app\LM is created on the base function server 20. The "mapper_DSD.ini" file is then copied from the application software 45. This file contains numerous settings to turn on and off various features of the Data Mapper, in accordance with the needs of the application. The DSD for the new application software 45 is defined in four sections, as described below.

Unlike the "apps.ini" file, the mapper_DSD.ini file, the DSD file, the STD file, and the TXT files are not loaded on the form user sub-system 40, rather, they are only loaded on the forms builder PC 38 running mapper software 23 of the mapper sub-system 22 to support forms building. These files are not used during the printing process. To speed up the process of creating the DSD and to reduce errors, tables containing information about the desired data elements may be utilized and the DSD may be built using the information in these tables. This makes it simple to modify the DSD on future releases. The tables are modified, and the mapping process is re-run to generate an updated digital form overlay.

Figure 18:
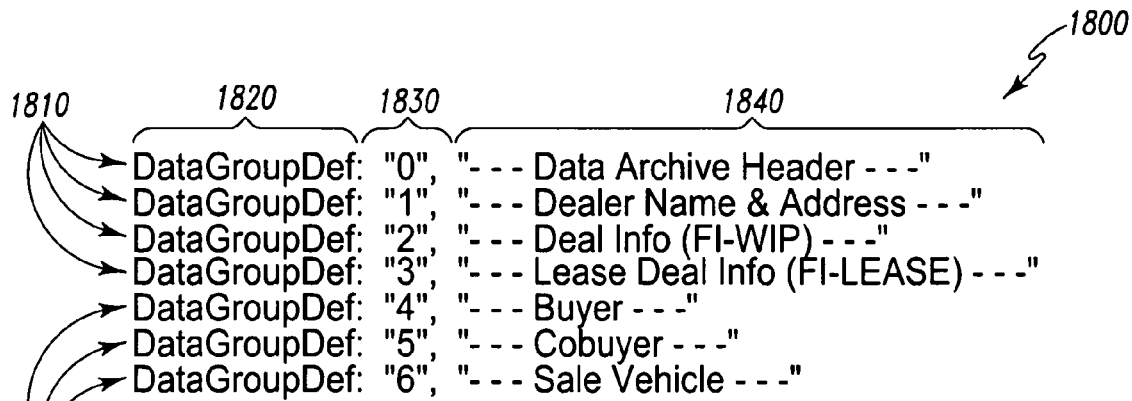
FIG. 18 depicts a partial premapped data stream.

FIG. 18 depicts a partial premapped data stream 1800. The premapped data stream 1800 that is populated with data stored on the form user sub-system includes multiple lines 1810. Each line 1810 defines a physical group of data in the premapped data stream 1800. While the partial premapped data stream 1800 shown in FIG. 18 includes seven lines 1810, an actual premapped data stream 1800 will include a line 1810 for each defined field utilized by form mappers. In one embodiment, there will be a line for each Standard Term.

Each definition line 1800 consists of three fields: a data group definition field 1820 including the text "DataGroupDef:", a data group identification field 1830 contain a unique data group ID in quotes followed by a comma and a data group header field 1840 including a unique data group header in quotes.

The data groupings serve an important purpose. Data elements within each group are defined by the line of text on which they appear within a data group. This means that if the first data group grows by ten lines of text, none of the following data groups need to be redefined. If a data element is defined on a line number greater than the number of lines contained within a group, the contents of the data element are assumed to be null. For instance, if BuyerDogBreed is defined on line 197 of the "Buyer" data section, but the buyer data section only contains 57 lines of text, the search for BuyerDogBreed stops when it reaches the "SaleVehicle" data group header, and BuyerDogBreed is assume to be null. This behavior allows blank lines at the end of each data group to be removed, thereby compressing the premapped data stream 1800 somewhat, and making the premapped data stream 1800 easier to read in an editor.

Figure 19:
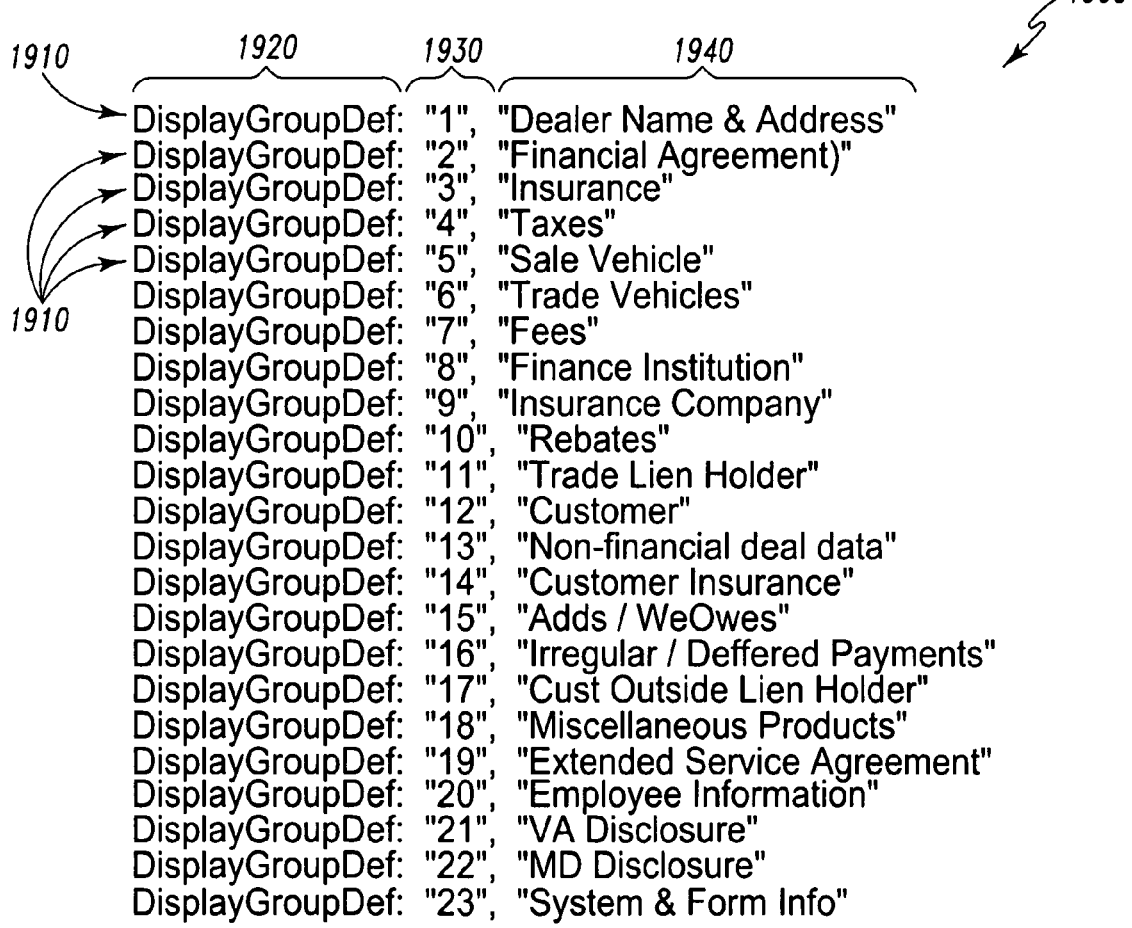
FIG. 19 depicts a partial Display Groups definition of a premapped data stream; and, FIG. 20 depicts a partial definition of data elements (Fields) section included in a premapped data stream.

The premapped data stream 1800 also includes "Display Group" definitions 1900. A partial Display Groups definition 1900 is shown, for example, in FIG. 19 Each line 1910 defines a logical group of data fields in the premapped data stream 1810. Each definition line 1910 consists of three fields, the display group definition field 1920 containing the text "DisplayGroupDef:", a display group identification field 1930 containing a unique display group ID in quotes followed by a comma and a display group name field 1940 containing a unique display group name in quotes.

Every data element defined in the premapped data stream 1800 will be assigned to one of these display groups. Display groups appear as the expandable file folders appearing in the defined field pane 1730 of the screen 1700 generated by the mapper software 23 and displayed on the form builder PC 38 of the mapper sub-system 22. Expanding a display group shows a sorted list of icons for the defined fields 1725 for all of the data elements assigned to the display group, as shown for example, in FIG. 17. It should be noted that the display in the defined field pane 1730 in FIG. 17 does not correspond directly to the partial Display Groups definition 1900 illustrated in FIG. 19.

Figure 20:
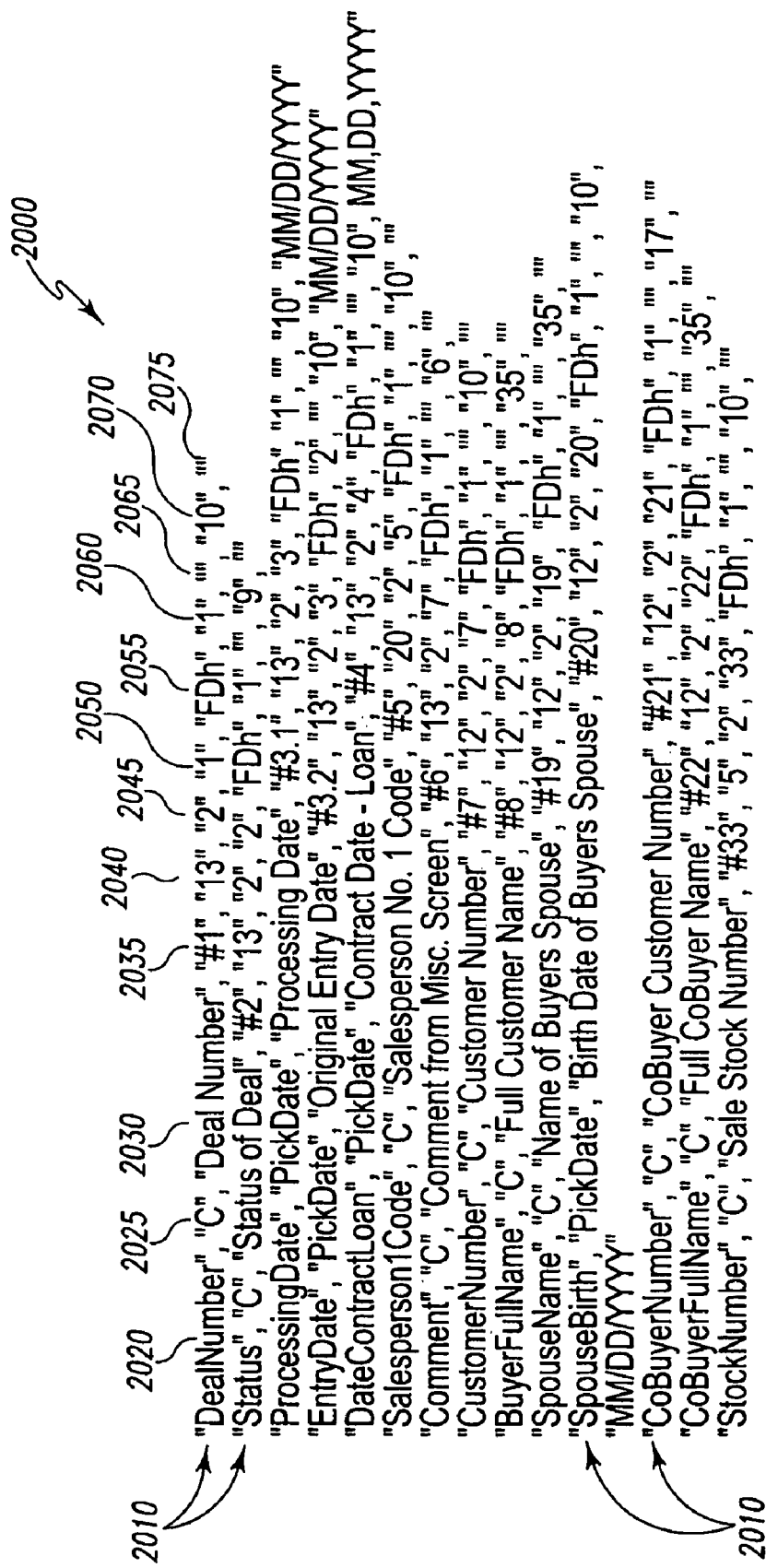

FIG. 20 shows a partial definition of data elements (Fields) section 2000 included in the premapped data stream 1800. Each line 2010 of the definition of data elements (Fields) section 2000 defines a single data element or field in the premapped data stream 1800. In the illustrated embodiment each line 2010 of the definition of data elements (Fields) section 2000 contains up to twelve possible fields for defining each data element. Because of the varying length of text entered into the various field of the definition of data elements (field) section 2000, the specific fields are only identified with reference numerals with regard to the first line 2010 These fields of the definition of data elements (Fields) section 2000 include a data field name field 2020, a data field type field 2025, a data field description field 2030, a short field name field 2035, a name of display group to which this element belongs field 2040, a data group field 2045, a line # in the data group field 2050, a delimiter field 2055, a field number field 2060, a # of elements in this group field 2065, a default field length field 2070 and a Default display mask field 2075.

The data field name field 2020 includes text identifying a Unique data field name/ID enclosed in quotation marks. In one illustrated embodiment the text in the data field name field 2020 needs to start with an Alphabetic character and can contain only alphanumeric characters or the underscore character. In one specific embodiment, the text in quotes in the data field name field 2020 is a Standard Term.

The data field type field 2025 includes a data field type in quotes. The data field type is a high level type, such as Numeric, Character, Date, or Time and is abbreviated using the first character of each type. In addition, two Reality/Pick data types are supported, PickMDn and PickDate. Numeric values in Reality/Pick are stored without the decimal point. Reality relies on dictionary items to put the decimal point back in when a program needs to process or display the data. Each dictionary item indicates a number of decimal places 0-n, which indicates how many digits on the right of the string are behind the decimal point. For example, a number stored as 525, using a dictionary definition of MD2 represents the number 5.25. A number stored as 525, using a dictionary definition of MD5 represents he number 0.00525. The PickMDn will be used in the same way, so that the "oa" print engine 50 will know how many decimal places to assume. Numbers with an MD or MD0 conversion code are integers stored without decimal places; these will be represented with a data type of "N", since no custom Pick conversion is necessary. Pick dates are represented internally using an integer. Each positive integer represents a day, with 1 representing Dec. 31, 1967, 2 representing Jan. 1, 1968, and so forth. Based on the "PickDate" type in the data dictionary, Pick dates will be converted to a generic date format, which can then be formatted for output as desired using the extensive existing date formatting functions in the mapper software 23.

The data field description field 2030 is optional. The data description field 2030 can obtain a text providing a written description explaining contents of the defined field which may be accessed by a help menu.

The short field name field 2035 is optional. includes "#" and a numeric value that may be utilized to generate the secondary reference 1755 displayed in the search results list of the search pane 1740.

The name of display group to which this element belongs field 2040

The data group field 2045. The "data group" is not the same as display group. Each group of data in the data stream is prefaced by a header row; the data group is a reference to the section in the data stream that begins with a particular header row.

The line # in the data group field 2050 indicates the line number on which the data appears. Line 1 is the first line after the header line for the data group defined for this data element.

The delimiter field 2055 is optional. The delimiter field 2055 may contain any ASCII character 0-254, using hex notation. For pick applications using multivalues, the most common will be ASCII 253, represented by "FDh". Other common delimiter characters are * (ASCII 042), and space (ASCII 032). Other delimiter characters occur more rarely.

The field number field 2060 contains text only if the delimiter field 2055 contains text.

The # of elements in this group field 2065 contains a numeric value (1, 2, . . . n) or "infinite" only if the delimiter field 2055 contains a value. # of elements in this group field 2065 applies to lines which may contain multiple instances of similar data, delimited by some character. For instance, line 53 of the FI-WIP data group contains up to two trade vehicle stock numbers, delimited by ASCII character 253 (Pick value mark). The value in this case would be 2.

The default field length field 2070 contains information regarding the commonly used length, not maximum length pf data elements of this type. As a user interface enhancement, a "maximum field length" display mode can be added that will display a box around each field on the form display window 1710 showing the image of the form for which a digital form overlay is being created. The box will be extended to the maximum possible length of the field. This will avoid problems with fields overlapping/jutting off the end of the form when the form is printed at the dealer site. To implement this feature, the mapper software 23 must be provided with a maximum length that data to be inserted into a field can assume. That "length" in this context is defined only to support the GUI enhancement described above. The length parameter is not used for parsing rules; data elements which occupy a separate line by themselves will terminate when the newline character (ASCII 010) is reached. Data elements which are delimited terminate when the newline character (ASCII 010) or the delimiter character (defined for that data element) is reached.

The default display mask field 2075 is provided in a standard format. If blank, then there is no special default mask. If supplied, then when the mapper drops and drags an icon 1725 representing a defined field on the form image in window 1710, the field is automatically formatted according to the display mask. This should reduce the amount of time required to create forms, reduce formatting errors, and reduce training requirements. The Default Display Format is a string of formatting characters. The formatting characters can be a combination of any of "−"—negative sign, "#"—print one digit, "X"—prints one character, "."—decimal point for "N" type, "Z"—Leading zero, "$"—Floating dollar sign, "HH"—2 digit hour, "MM"—2 digit minute, "SS"—2 digit seconds, "am"—either "am" or "pm", "DD"—2 digit day of month, "DDD"—3 letter day of week, "JJJ"—3 digit number of days since start of year (1=Jan 1st), "MM"—2 digit month (01-12), "MMM"—3 letter month string (Jan, Feb, Mar, Apr, May, Jun, Jul, Aug, Sep, Oct, Nov, Dec), "YY"—2 digit year (current century assumed), "YYYY"—4 digit year The disclosed system 10 and method allows image files of the filled forms generated by the print engine for printing to be archived on the data storage and data archiving database DSDA 48 on the forms user sub-system 40. Forms users who have a DSDA 48 on their forms user sub-system 40 would appreciate the ability to archive everything they print so that they can implement a paperless filing system. To facilitate archiving a form that needs to be signed, a field can be placed above the signature location on the digital form overlay that will not be filled with data at the time of original printing but which may be filled by data generated by a signature capture device 72 configured to capture an electronic image file of a signature when the form is signed. This signature image file can then be added to the archived version of the form.

Figure 10A:
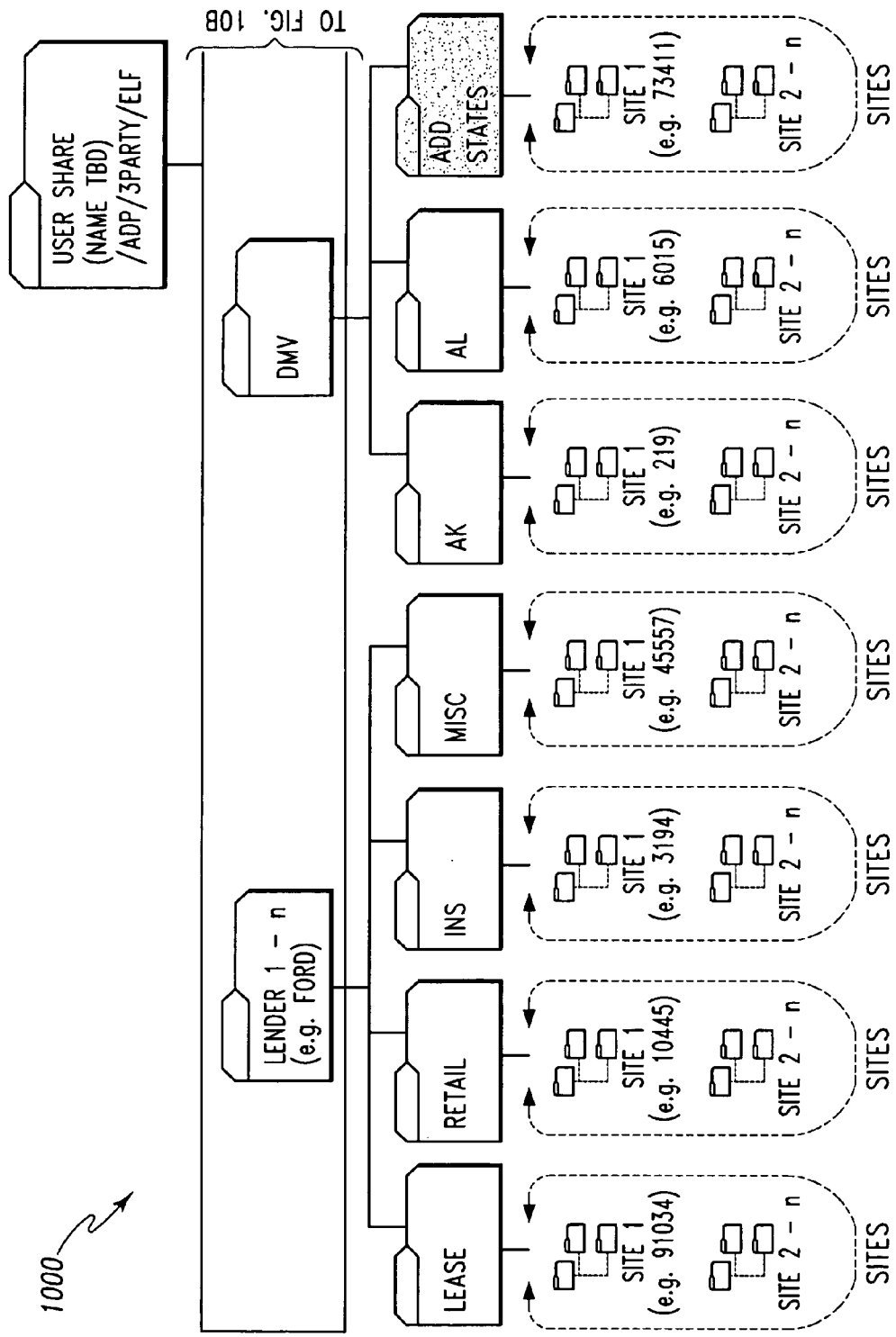
FIG. 10 shows a block diagram of one embodiment of the library structure for the forms according to one embodiment of the disclosed system.
Figure 10B:
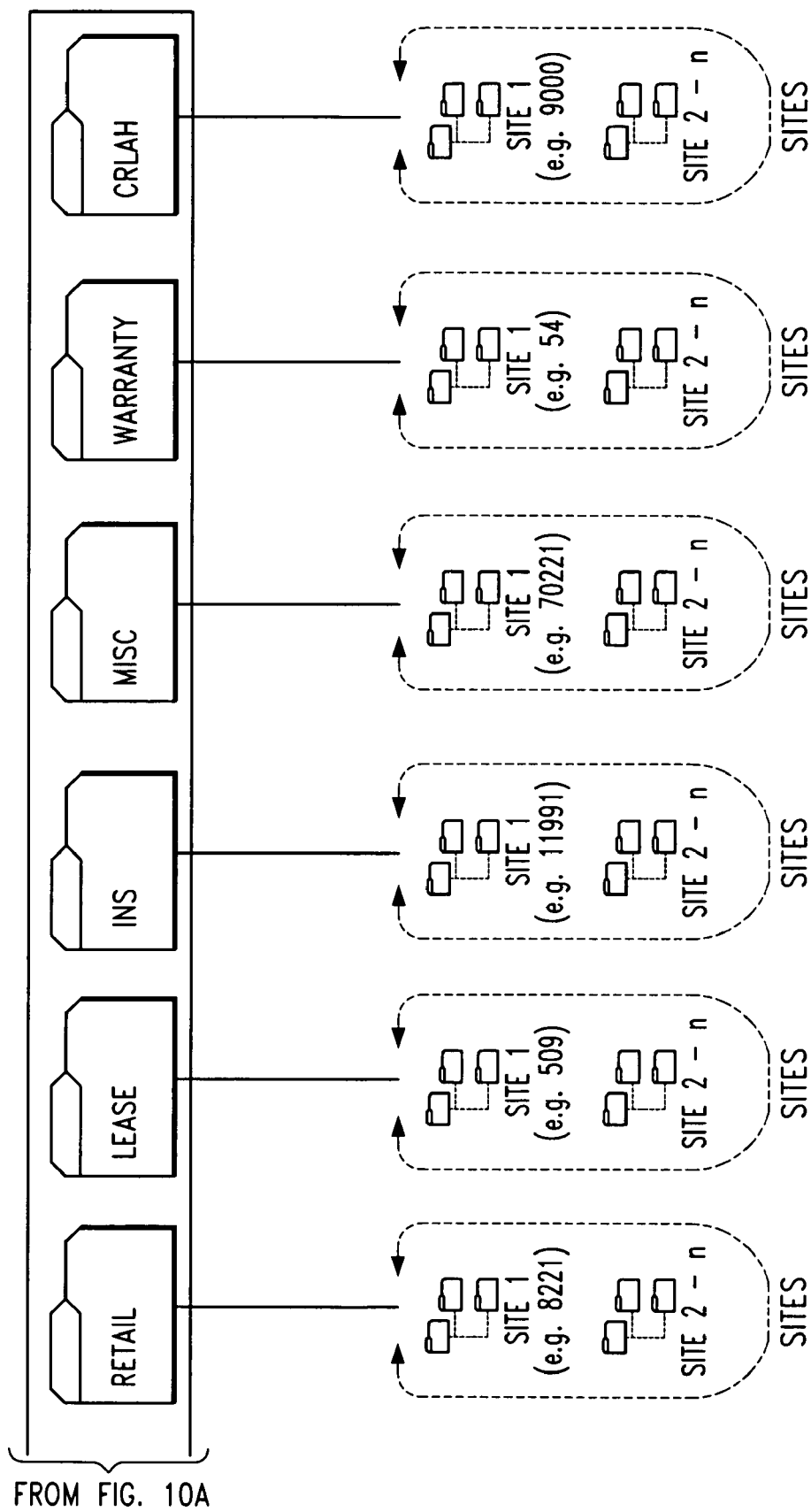

The eForms database 46 on the form user sub-system 40 stores downloaded digital form overlays in the directory /adp/3party/dadss/piee/coldform/AP/current, where AP is the two letter code representing the application software 45 running on the forms user sub-system through which data is generated and stored in the database 52 for incorporation into filled forms. In one specific embodiment, the directory structure on the eForms database 46 is identical to the eForm library directory structure 1000 created on the base function server 20 when a form site is created. One embodiment of the eForms library directory structure 1000 is shown, for example, in FIG. 10.

The disclosed embodiment of system 10 includes several systems APIs for Managing Forms and Queues. Several of these APIs are referred to in FIG. 2. A Get eForm Names API retrieves a list of available forms from the eForms database The syntax of the Get eForm Names API is:

```
CALL UT.GET.FORM.NAMES(APP, LOGONS,
FORMS, DESCS, Extra1, Extra2, ERRORS)
```

The APP argument contains an Application ID. This will be lower case "fi" for F&I applications which utilize digital form overlays and premapped data streams to print completed forms. This controls the directory and site from which the current list of forms is pulled. The LOGONS argument contains a list of logon names for which to retrieve form names. For F&I applications the generic designator 'FI' is used. The FORMS attribute contains a Multivalued list of forms associated with the logons provided. Form IDs have the structure type*number*logon. FORMS is populated with all form IDs associated with the logons in the LOGONS parameter. The DESCS argument provides a description associated with each form type. Multivalued correlative to the FORMS parameter. Each attribute may be subvalued with a list of plies for the corresponding form. The Extras1 and Extras2 arguments are undefined for future use. The ERRORS argument returns an error (to be defined by Systems) if the eForms database does not exist. Other errors may be defined as necessary.

A Get Laser Queue Names API is a utility called whenever an application needs a list of laser-type formqueues for user selection. It retrieves a list from PRINTER-CONFIG and adds the description as listed in PRINTER-CONFIG. The Get Laser Queue Names API has the syntax:
    CALL UT.GET.LASER.PRINTERS(PRINTER.LIST)
The PRINTER.LIST argument passes back Attr. 1 a Multivalued list of laser-type formqueues, Attr.2 a correlative multi-valued list of descriptions of above formqueues.

A Get Prompts API retrieves a list of prompts contained in forms. The Get Prompts API has the syntax:

```
CALL UT.GET.CUSTOM.PROMPTS(APP, FORMS, PLIES, DATA,
PROMPT.IDS, PROMPT.STRINGS, PROMPT.VALIDATIONS,
PROMPT.LENGTHS, ERRORS)
```

The APP argument is "FI" for F&I. The Forms argument is a list of form IDs for which to retrieve prompts. The PLIES argument contains a list of plies for each form for which to retrieve prompts. Attribute correlative to FORMS, each attribute may contain a multivalued list of ply names. This is an optional parameter for each form. If PLIES is null for a given form, all prompts for all plies associated with the form type are returned. The DATA argument contains the premapped data stream for the current deal for which forms are being printed. In the illustrated embodiment, the DATA argument includes Standard Term resolutions. The PROMPT.IDS argument is a list of prompt IDs found on each form. Attribute correlative to FORMS, multivalue correlative to PLIES, each multivalue contains a subvalued list of prompts for the associated form type. The order in which prompt IDs are returned is controlled by "oa", print engine 50 and should not be changed. The order is specifically related to presentation order on the form, so that prompts may be presented to the user in the same logical and physical sequence in which they appear on the paper. The PROMPT.STRINGS argument contains the text associated with each prompt found on each form and ply. Attribute correlative to the PROMPT.FORMS parameter, multivalue correlative to PLIES, subvalued correlative to PROMPT.IDS. The PROMPT.VALIDATIONS argument contains the validation string associated with each prompt found on each form and ply. Attribute correlative to the PROMPT.FORMS parameter, multivalue correlative to PLIES, subvalued correlative to PROMPT.IDS. The PROMPT.LENGTHS parameter contains the maximum input length associated with each prompt found on each form and ply. Attribute correlative to the PROMPT.FORMS parameter, multivalue correlative to PLIES, subvalued correlative to PROMPT.IDS.

The Print Forms API was created specifically for F&I and is used with any application using premapped data streams. The Forms Handler API accepts a list of forms to print from the application, and calls the eForms print engine('oa') 50 for each one. Forms handlerAPI also provides the interface to DSDA, so the application can do "one stop shopping" and do all of the necessary printing and archiving in a single call. The FORM.HANDLER API may be different for each application; the documentation shown here should be considered F&I specific. One example of the syntax pf the Print Forms API is:

```
CALL FORM.HANDLER(FORMS.DATA, HOLD.DATA,
HOLD.IDX, HOLD.BKUP.IDX, LASER.WRK, PRINTER.CONFIG,
OVR.TBL.ITEM, THIS.PORT.ITEM, FORM.QUEUE,
PRINTER.TYPE, FORM.TYPE, PRINTER.NUMBER,
ACCOUNT, "", "", OPTION)
```

The FORMS.DATA argument is a file variable for FORMS.DATA file used for standard billing information. The HOLD.DATA argument is for batch processing and is opened within form.handler. The HOLD.IDX argument is for batch processing and is opened within form.handler. The HOLD.BKUP.IDX argument is for batch processing and is opened within form.handler. The LASER.WRK argument contains the F&I data stream, containing all deal related information. The PRINTER.CONFIG argument is null for F&I use. The OVR.TBL.ITEM argument normally contains the record contents from OVERLAY-TABLE item and is null for F&I. The THIS.PORT.TERM argument contains click file name, starting with "clf/". The FORM.QUEUE argument contains override print parameters. Each attribute is multivalued correlative to FORM.TYPE. If values correlative to a particular form type are null, the value from the form setups is used by default. If overrides are made at the ply level, the form is listed in FORM.TYPE once for each ply that will be printed, and correlative values in this parameter are present. The Printer Type argument is laser for F&I. The FORM.TYPE argument is combined with PRINTER.NBR and ACCOUNT and creates list of forms to print. This argument is multivalued. If an entire form is to be printed using default setups, the form need only be listed once. If there are overrides for a particular form, each ply of that form is listed separately in the FORM.QUEUE parameter. To keep the values correlative, the same form type would be added to this parameter once for each ply. The PRINTER.NBR argument is combined with FORM.TYPE and ACCOUNT to create a list of forms to print. The ACCOUNT argument is combined with FORM.TYPE and PRINTER.NBR to create a list of forms to print. The CTL.NBR and DATA.KEYS arguments are null for F&I use. The OPTION argument is "FI" for F&I use.

The Get Standard Terms API retrieves a list of "Standard Terms" used on a form or group of forms. The syntax for the Get Standard Terms API is:
    CALL UT.GET.STANDARD.TERMS(APP, FORMS, PLIES, TERM.IDS, ERRORS)
The APP argument is "FI" for F&I. The FORMS argument contains a list of form IDs for which to retrieve Standard Terms. The PLIES argument contains a list of plies for each form for which to retrieve Standard Terms. This is an optional parameter for each form. If PLIES is null for a given form, all Standard Terms for all plies associated with the form type are returned. The TERM.IDS argument returns a list of Standard Terms found on each form.

The Cleanup Form Setups API deletes obsolete references. Certain application controlled functions may store form IDs in tables as part of various setup functions. When a form is deleted from a DMS an application provided routine is called to allow the application to cleanup obsolete form references. This should is done with a generic API, so that each application needing such a routine would have the same parameters available. The application type associated with each form would be used to determine which application cleanup routine to be called. At load time, the application will need to update SYS-TABLES SLF.APP.DELETE with "FI", so that SLF will know that an F&I specific deletion routine is present. The syntax pf the Cleanup Forms API is:

CALL app.DELETE.FORM.REFERENCES(FORM.ID, ERRORS)

The FORM.ID argument contains the form ID to delete. The ERRORS argument returns error messages as needed.

The Get eForms Information API is a new Systems routine which retrieves extended form information from the eForms database. Get eForms Information API has the following syntax:

CALL UT.GET.FORM.INFO(APP, FORMS, DESCS, PLIES, COPIES, QUEUES, TRAYS, PAPER.SIZES, REVISION.DATES, Extra2, ERRORS)

The APP argument contains the Application ID and will be lower case "fi" for F&I. This controls the directory and site from which the current list of forms is pulled. The FORMS argument contains a list of forms for which information will be retrieved. Form IDs have the structure type*number*logon, and are separated by attribute marks. The DESCS argument returns a description associated with each form type. The PLIES argument returns a list of Plies defined for each form. The COPIES argument returns a list of copies for each ply. The QUEUES argument returns a list of form queues for each ply. The TRAYS argument returns a paper source (tray) defined for each ply. The PAPER.SIZES argument returns a paper size defined for each ply. The REVISION.DATES argument contains the revision date of each form type. The Extra2 argument is currently undefined and is provided for future use. The ERRORS argument returns an error message if the eForms database does not exist.

Figure 9:
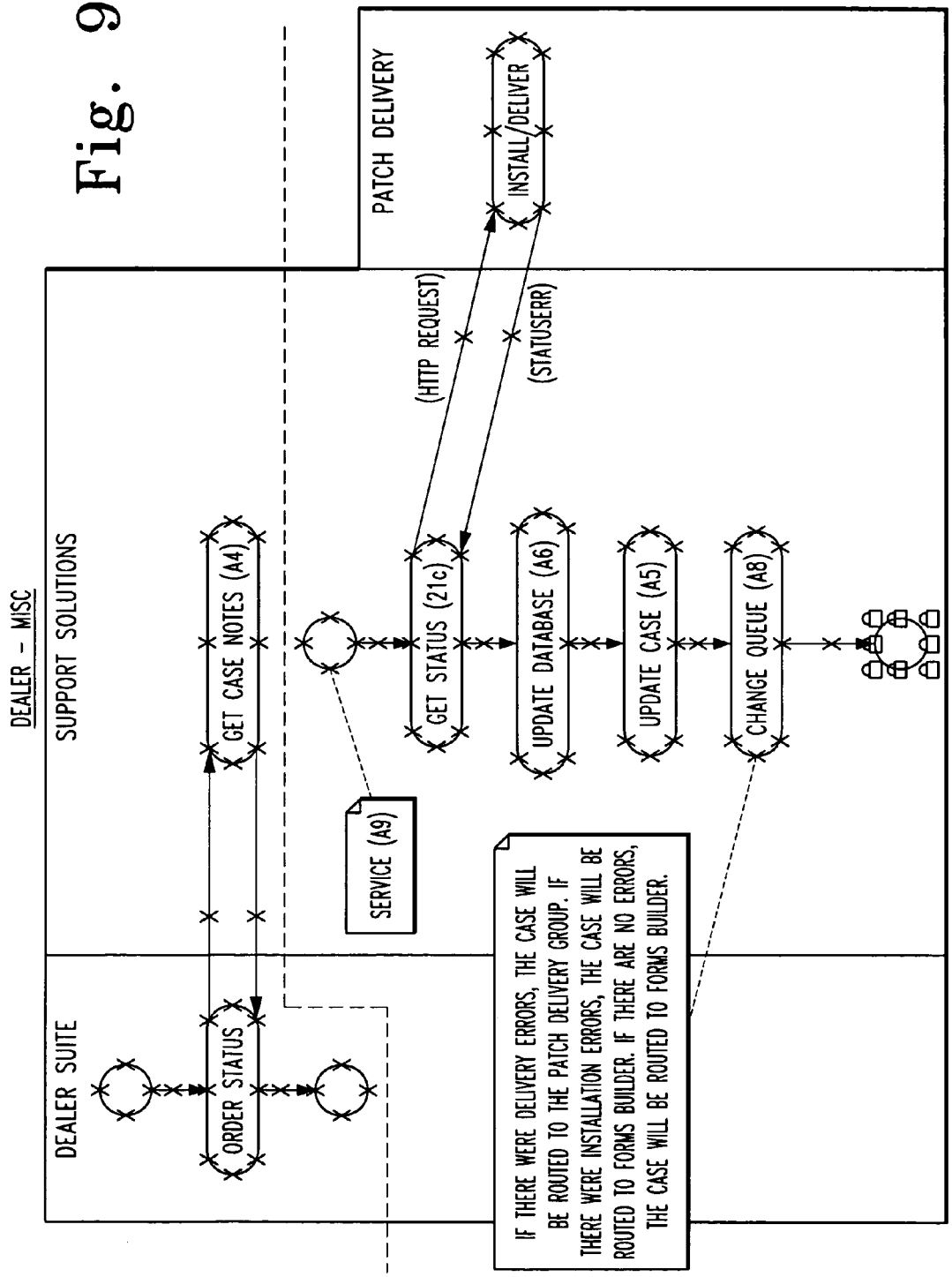
FIG. 9 shows a process diagram of other functions available to the dealer or form user according to one embodiment of the disclosed system.

Other functions made available to the dealer are illustrated in FIG. 9.

According to one embodiment of the disclosed system 10, the system 10 works with forms provided in a standard format, such as PDF. However, such standard format is not required. The system 10 is also able to produce forms for printing at forms users' sub-systems 40 without requiring all such users to have an identical application 45 or to define all fields of data stored on their systems 40 in the same manner. The disclosed system 10 comprises a basic function server 20 configured to facilitate uploading forms in electronic format from a forms provider, and for updating, deletion, and display of such forms. The system 10 is also configured to allow a forms user to order the electronic forms it desires, and, according to one embodiment, actually requires payment by the forms user for forms provided. The system 10 generates and manages digital form overlays created by a forms builder (translator) from the uploaded electronic forms for the purpose of being able to integrate into the form overlay one or more data values collected from the forms user and stored on the forms user sub-system 40. Further, the system 10 downloads and stores digital form overlays to a database 46 on the form user sub-system 40. The system 10 collects data values stored on the forms user sub-system 40 and generates a premapped data stream 1800 including such data. The data is extracted from the premapped data stream 1800 and integrated "on" the digital form overlay by a print engine at the time of printing the completed filled form on a printer 42 on the forms user sub-system 40. From the forms user's perspective, the system 10 seamlessly delivers a completed form to the forms user at the forms user's sub-system 40.

It will be appreciated by those of skill in the art that the disclosed system 10 provides a system 10 and method for delivery of electronic forms to users. While the forms can essentially be captured in a standard electronic format, such as PDF, the user is not required to have a special program for writing data to the form. Instead, by provision of a mapper sub-system 22 running mapping software 23 on a processor, and a delivery sub-system 28, referred to herein as the Patch Delivery and/or Patch Distribution, the digital form overlay generated by the mapping process is delivered to the form user upon request of the user. Data stored on the user sub-system of the type that may be inserted into a completed form is collected and concatenate into a premapped data stream 1800 including headers identifying data fields in the same manner in which such data fields are identified on the digital form overlay by the mapper sub-system 22. In this manner, forms are provided to the user which can have data generated by the user appropriately inserted therein to generate a properly filled out form printed on the user's printer using the user's unique data setup or application. For example, for users executing the same application, if custom data fields are needed to complete a form but each user's configuration of such custom data fields differs, the same completed form can be produced for each of the users.

It will also be appreciated that the system and method of the present invention allow the owner of a form to control, without significant effort, the form and its revisions. In the embodiment discussed herein, that management is accomplished using forms in PDF format. Other formats may be used, however, and are contemplated to be within the scope of the invention.

It will also be appreciated by those of skill in the art that the system and method of the present invention allows a dealer (user) to request a form needed to serve a customer on-demand. From the dealer's perspective, the system seamlessly delivers to the dealer's system the necessary form(s), and allows the integration of the necessary data regarding the customer, the dealer, and the transaction at the dealer's system.

The present invention can be further modified within the scope and spirit of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system including a processor for generating and providing at least one electronic form to a user, the system comprising:

a file management sub-system for receipt and management of at least:
- a first standard form including a first location thereon in which data of a first type is to be inserted to generate a first filled form and a second location thereon in which data of a second type is to be inserted to generate the first filled form; and,
- a second standard form including a third location thereon in which data of a third type is to be inserted to generate a second filled form and a fourth location thereon in which data of a fourth type is to be inserted to generate the second filled form;

a first user sub-system for selection of a desired form from the at least a first standard form and the second standard form, the first user sub-system comprising at least a first memory location at which data of the first type is stored, a second memory location at which data of the second type is stored, a third memory location at which data of the third type is stored and a fourth memory location at which data of the fourth type is stored and a first printer;

a first print engine communicatively coupled to the first printer;

a second user sub-system for selection of a desired form from the at least a first standard form and the second standard form, the second user sub-system comprising at least a fifth memory location at which data of the first type is stored, a sixth memory location at which data of the second type is stored, a seventh memory location at which data of the third type is stored and an eighth memory location at which data of the fourth type is stored and a second printer;

a second print engine communicatively coupled to the second printer;

a mapper sub-system running mapper software for mapping of:
- the first standard form into a first digital form file identifying graphical and/or textual elements of the first standard form, a first pre-defined data input field for receipt of data of the first type to be placed on the first standard form, and a location on the first standard form for the first pre-defined data input field, a second pre-defined data input field for receipt of data of the second type to be placed on the first standard form and a location on the first standard form for the second pre-defined data input field; and,
- the second standard form into a second digital form file identifying graphical and/or textual elements of the second standard form, a third pre-defined data input field for receipt of data of the third type to be placed on the second standard form and a location on the second standard form for the second pre-defined data input field;

a delivery sub-system operably connected to the file management sub-system, the mapper sub-system, the first user sub-system and the second user sub-system, the delivery sub-system being configured to:
- retrieve from the first user sub-system an indication of a desired form selected from the first and second standard forms and a first delivery address for electronic delivery of a digital form file mapped from the desired form, the delivery sub-system including a mechanism for creation of a script reflective of the desired form including the digital form file mapped from the desired form, and a mechanism for execution of the script to electronically deliver the digital form-file mapped from the desired form to the first user sub-system at the first delivery address; and,
- retrieve from the second user sub-system an indication of a desired form selected from the first and second standard forms and a second delivery address for electronic delivery of a digital form file mapped from the desired form, the delivery sub-system including a mechanism for creation of a script reflective of the desired form including the digital form file mapped from the desired form, and a mechanism for execution of the script to electronically deliver the digital form file mapped from the desired form to the second user sub-system at the second delivery address; and, wherein the first print engine is configured to:
- when an indication is received from the first user sub-system that the first standard form is the desired form, merge the data stored at the first and second memory locations with the electronically delivered first digital form file to generate a first output file to the first printer which is configured to print a filled form including the data stored at the first memory location in the first pre-defined data input field at the location on the first standard form for the first pre-defined data input field and the data stored at the second memory location in the second pre-defined data input field at the location on the first standard form for the second predefined data input field; and,
- when an indication is received from the first user sub-system that the second standard form is the desired form, to merge the data stored at the third and fourth memory locations with the electronically delivered second digital form file to generate a second output file to the first printer which is configured to print a filled form including the data stored at the third memory location in the third pre-defined data input field at the location on the second standard form for the third pre-defined data input field and the data stored at the fourth memory location in the fourth pre-defined data input field at the location on the second standard form for the fourth pre-defined data input field; and, wherein the second print engine is configured to:
- when an indication is received from the second user sub-system that the first standard form is the desired form, to merge the data stored at the fifth and sixth memory locations with the electronically delivered first digital form file to generate a third output file to the second printer which is configured to print a filled form including the data stored at the fifth memory location in the first pre-defined data input field at the location on the first standard form for the first pre-defined data input field and the data stored at the sixth memory location in the second pre-defined data input field at the location on the first standard form for the second pre-defined data input field; and,
- when an indication is received from the second user sub-system that the second standard form is the desired form, to merge the data stored at the seventh and eighth memory locations with the electronically delivered second digital form file to generate a second output file to the second printer which is configured to print a filled form including the data stored at the seventh memory location in the third pre-defined data input field at the location on the second standard form for the third pre-defined data input field and the data stored at the eighth memory location in the fourth pre-defined data input field at the location on the second standard form for the fourth pre-defined data input field.

2. The system of claim 1, further comprising:

a first electronic cross reference table stored on the first user sub-system, the first cross reference table correlating the first pre-defined data input field with first memory location, correlating the second pre-defined data input field with the second memory location, correlating the third pre-defined data input field with third memory location and correlating the fourth pre-defined data input field with the fourth memory location and wherein the first print engine utilizes the first cross reference table to generate the first and second output files to the first printer; and, a second electronic cross reference table stored on the second user sub-system, the second cross reference table correlating the first pre-defined data input field with fifth memory location, correlating the second pre-defined data input field with the sixth memory location, correlating the third pro-defined data input field with seventh memory location and correlating the fourth pre-defined data input field with the eighth memory location and wherein the second print engine utilizes the second cross reference table to generate the third and fourth output files to the second printer.

3. The system of claim 1, further comprising:

a first premapped data stream builder configured to generate a first premapped data stream incorporating the data stored at the first, second, third and fourth memory locations and associating the data stored at the first memory location with the first pre-defined data input field, the data stored at the second memory location with the second pro-defined input data field, the data stored at the third memory location with the third pre-defined input data field, and the data stored at the fourth memory location with the fourth pre-defined data input field and wherein the first premapped data stream is utilized by the first print engine to generate the first and second output files to the first printer; and a second premapped data stream builder configured to generate a second premapped data stream incorporating the data stored at the fifth, sixth, seventh and eighth memory locations and associating the data stored at the fifth memory location with the first predefined data input field, the data stored at the sixth memory location with the second pre-defined data input field, the data stored at the seventh memory location with the third pre-defined data input field and the data stored at the eighth memory location with the fourth pre-defined data input field and wherein the second premapped data stream is utilized by the second print engine to generate the third and fourth output files to the second printer.

4. The system of claim 3, further comprising:

a first electronic cross reference table correlating the first pre-defined data input field with first memory location, correlating the second pre-defined data input field with the second memory location, correlating the third pre-defined data input field with third memory location and correlating the fourth pre-defined data input field with the fourth memory location and wherein the first premapped data stream builder utilizes the first electronic cross reference table to facilitate generation of the first premapped data stream; and, a second electronic cross reference table correlating the first pre-defined data input field with fifth memory location, correlating the second pre-defined data input field with the sixth memory location, correlating the third pre-defined data input field with seventh memory location and correlating the fourth pre-defined data input field with the eight memory location and wherein the second premapped data stream builder utilizes the second electronic cross reference table to facilitate generation of the second premapped data stream.

5. The system of claim 3, further comprising a first form supplier sub-system on which an electronic image file of the first standard form is stored in a standard format and wherein the first form supplier sub-system is coupled by a network to the file management sub-system to facilitate uploading the electronic image file of the first standard form via the network to the file management sub-system.

6. The system of claim 5, further comprising a second form supplier sub-system on which an electronic image file of the second standard form is stored in a standard format and wherein the second form supplier sub-system is coupled by a network to the file management sub-system to facilitate uploading the electronic image file of the second standard form via the network to the file management sub-system.

7. The system of claim 6, wherein the file management sub-system includes a forms image database and is configured to store uploaded electronic image files of the first and second standard forms in the forms image database.

8. The system of claim 7, wherein the mapper sub-system accesses the forms image database to acquire the electronic image file of the first and second standard forms and is configured to utilize the acquired electronic image files during mapping of the first and second digital form files.

9. The system of claim 8, wherein the mapper sub-system includes an electronic forms database and is configured to store the first and second digital form files in the electronic forms database.

10. The system of claim 5, wherein the electronic image file of the first standard form is in a first file format and the first digital form file is in a second file format differing from the first file format.

11. The system of claim 10, wherein the first file format is portable document format ("PDF").

12. The system of claim 10, wherein the second file format is tagged image file format ("TIFF").

13. The system of claim 10, wherein the second digital form file is in the second file format.

14. The system of claim 10, wherein the second file format is TIFF.

15. The system of claim 14, wherein the second digital form file is in the second file format.

16. The system of claim 3, wherein the first and second printers are laser printers.

17. A system including a processor for generating and providing at least one electronic form to a user, the system comprising:

a file management sub-system for receipt and management of at least one standard form including a location at which data of a first type is to be inserted thereon;

a user sub-system for selection of a desired form from the at least one standard form, the user sub-system comprising a memory location at which a data of the first type is stored, a print engine and a printer;

a mapper sub-system running mapper software for mapping of each of the at least one standard forms into a digital form file identifying graphical and/or textual elements of the standard form, at least one data input field for receipt of data of the first type and a location on the standard form for the at least one data input field;

a delivery sub-system operably connected to the file management sub-system, the mapper sub-system and the user sub-system, the delivery sub-system being capable of retrieving from the user sub-system an indication of a desired form selected from the at least one standard form and a delivery address for electronic delivery of a digital form file mapped from the desired form, the delivery sub-system including a mechanism for creation of a script reflective of the desired form including the digital form file mapped from the desired form, and a mechanism for execution of the script to electronically deliver the digital form file mapped from the desired form to the user sub-system at the delivery address; and wherein the print engine on the user sub-system is configured to merge the data stored at the memory location with the electronically delivered digital form file to generate an output file to the printer which is configured to print a filled form including the data stored at the memory location in the data input field at the location on the standard form for the at least one data input field.

18. The system of claim 17, further comprising a server operated by a forms distributor, the server comprising the mapper sub-system, the delivery sub-system and file management sub-system.

19. The system of claim 18, further comprising a form supplier sub-system on which an electronic image file of the at least one standard form is stored in a standard format and wherein the form supplier sub-system is coupled by a network to the server to facilitate uploading the electronic image file of the at least one standard form via the network to the server.

20. The system of claim 19, wherein the file management sub-system includes a forms image database and the server is configured to store an electronic image file of the at least one standard form uploaded via the network in the forms image database.

21. The system of claim 20, wherein the mapper sub-system accesses the forms image database to acquire the electronic image file of the at least one standard form and is configured to utilize the acquired electronic image of the at least one standard form during mapping of each of the at least one standard forms into the digital form file.

22. The system of claim 21, wherein the electronic image file of the at least one standard form is in a first file format and the digital form file generated by the mapper of the at least one standard form is in a second file format differing from the first file format.

23. The system of claim 22, wherein the first file format is a PDF format.

24. The system of claim 22, wherein the second file format is a TIFF format.

25. The system of claim 18, wherein the server further comprises a web server.

26. The system of claim 17, wherein the printer comprises a laser printer.

27. The device of claim 17, wherein the at least one standard form includes a first location thereon in which data of a first type is to be inserted to generate a filled form and a second location thereon in which data of a second type is to be inserted to generate a filled form, wherein the mapper sub-system maps a digital form file identifying graphical and/or textual elements of the standard form, a first data input field for receipt of data of the first type to be placed on the standard form, a location on the standard form corresponding to the first location for the first data input field, a second data input field for receipt of data of the second type to be placed on the standard form and a location on the standard form corresponding to the second location for the second data input field; wherein the a user sub-system comprises a first memory location at which data of the first type for insertion into the at least one form is stored and a second memory location at which data of the second type for insertion into the at least one form is stored and wherein the print engine on the user sub-system is configured to merge the data stored at the first and second memory locations with the electronically delivered digital form file to generate an output file to the printer which is configured to print a filled form including the data stored at the first memory location in the first data input field at the location on the standard form for the first data input field and the data stored in the second memory location in the second data input field at the location on the standard form for the second data input field.

28. The system of claim 27, further comprising an electronic cross reference table stored on the user sub-system, the cross reference table correlating the first data input field with first memory location and correlating the second data input field with the second memory location and wherein the print engine utilizes the cross reference table to generate the output file to the printer.

29. The system of claim 27, further comprising a premapped data stream builder configured to generate a data stream incorporating the data stored at the first and second memory locations and associating the data stored at the first memory location with the first data input field and the data stored at the second memory location with the second input data field and wherein the premapped data stream is utilized by the print engine to generate the output file to the printer.

30. The system of claim 29, further comprising an electronic cross reference table stored on the user sub-system, the cross reference table correlating the first data input field with first memory location and correlating the second data input field with the second memory location and wherein the premapped data stream builder utilizes the electronic cross reference table to facilitate generation of the premapped data stream.

31. A system including a processor for generating and providing at least one electronic form to a user, the system comprising:

a file management sub-system for receipt and management of at least;
a first standard form including a first location thereon in which data of a first type is to be inserted to generate a first filled form and a second location thereon in which data of a second type is to be inserted to generate the first filled form; and,
a second standard form including a third location thereon in which data of a third type is to be inserted to generate a second filled form and a fourth location thereon in which data of a fourth type is to be inserted to generate the second filled form;
a first user sub-system for selection of a desired form from the first standard form and the second standard form, the user sub-system comprising at least a first memory location at which data of the first type is stored, a second memory location at which data of the second type is stored, a third memory location at which data of the third type is stored, a fourth memory location at which data of the fourth type is stored and a first printer;
a first print engine;
a mapper sub-system running mapper software for mapping of:
the first standard form into a first digital form file identifying graphical and/or textual elements of the first standard form, a first pre-defined data input field for receipt of data of the first type to be placed on the first standard form, a location on the first standard form for the first pre-defined data input field, a second pre-defined data input field for receipt of data of the second type to be placed on the first standard form and a location on the first standard form for the second pre-defined data input field the second standard form into a second digital form file identifying graphical and/or textual elements of the second standard form, a third pre-defined data input field for receipt of data of the third type to be placed on the second standard form, a location on the second standard form for the third pre-defined data input field, a fourth pre-defined data input field for receipt of data of the fourth type to be placed on the second standard form and a location on the second standard form for the fourth pre-defined data input field;

a delivery sub-system operably connected to the file management sub-system, the mapper sub-system and the first user sub-system, the delivery sub-system being capable of retrieving from the first user sub-system an indication of a desired form selected from the first and second standard forms and a delivery address for electronic delivery of a digital form file mapped from the desired form, the delivery sub-system including a mechanism for creation of a script reflective of the desired form including the digital form file mapped from the desired form and a mechanism for execution of the script to electronically deliver the digital form file mapped from the desired form to the first user sub-system at the first delivery address; and wherein the print engine is configured:
when it is indicated that the first standard form is the desired form, to merge the data stored at the first and second memory locations with the electronically delivered first digital form file to generate a first output file to the printer which is configured to print a filled form including the data stored at the first memory location in the first pre-defined data input field at the location on the first standard form for the first pre-defined data input field and the data stored at the second memory location in the second pre-defined data input field at the location on the first standard form for the second pre-defined data input field; and
when it is indicated that the second standard form is the desired form, to merge the data stored at the third and fourth memory locations with the electronically delivered second digital form file to generate a second output file to the printer which is configured to print a filled form including the data stored at the third memory location in the third pre-defined data input field at the location on the second standard form for the third pre-defined data input field and the data stored at the fourth memory location in the fourth pre-defined data input field at the location on the second standard form for the fourth pre-defined data input field.

32. The system of claim 31, wherein the user sub-system includes a data archive and the print engine outputs to the data archive an archive file representing a filled form that will be printed from each output file generated and sent to the printer.

33. The system of claim 32, further comprising a first signature capture device for capturing a signature and generating a signature image file, wherein the mapper inserts a signature image field in a location on the first digital form file at a signature location on the first standard form where a filled and signed first standard form would include a signature, the print engine includes a non-printable signature icon on the archive file that will not be printed by the printer and wherein upon capturing a signature on the filled form printed from the first output file a captured signature image file is transferred to the data archive and the captured signature image file is inserted into the archive file replacing the non-printable signature icon to generate a file stored in the archive representative of the filled and signed first standard form.

34. The system of claim 31, further comprising a first premapped data stream builder configured to generate a premapped data stream incorporating the data stored at the first, second, third and fourth memory locations and associating the data stored at the first memory location with, the first pre-defined data input field, the data stored at the second memory location with the second pre-defined input data field, the data stored at the third memory location with the third pre-defined data input field and the data stored at the fourth memory location with the fourth pre-defined input data field and wherein the first print engine is configured to extract the data stored at the first and second memory locations from the first premapped data stream to generate the first output file and to extract the data stored at the third and fourth memory locations from the first premapped data stream to generate the second output file.

35. The system of claim 34, further comprising
a second user sub-system operably connected to the delivery sub-system and the file management sub-system for selection of a desired form from the at least a first standard form and the second standard form, the second user sub-system comprising at least a fifth memory location at which data of the first type is stored, a sixth memory location at which data of the second type is stored, a seventh memory location at which data of the third type is stored, an eighth memory location at which data of the fourth type is stored and a second printer;
a second print engine;
wherein the delivery sub-system is capable of retrieving from the second user sub-system an indication of a desired form selected from the first and second standard forms and a second delivery address for electronic delivery of a digital form file mapped from the desired form, the delivery sub-system including a mechanism for execution of the script to electronically deliver the digital form file mapped from the desired form to the second user sub-system at the second delivery address;
a second premapped data stream builder configured to generate a second premapped data stream incorporating the data stored at the fifth, sixth, seventh and eighth memory locations and associating the data stored at the fifth memory location with the first pre-defined data input field, the data stored at the sixth memory location with the second pre-defined data input field, the data stored at the seventh memory location with the third pre-defined data input field and the data stored at the eighth memory location with the fourth pre-defined data input field; and,
wherein the second print engine is configured:
when it is indicated that the first standard form is the desired form to be delivered to the second delivery address, to extract the data stored at the fifth and sixth memory locations from the second premapped data stream and to merge the data stored at the fifth and sixth memory locations with the electronically delivered first digital form file to generate a third output file to the second printer which is configured to print a filled form including the data stored at the fifth memory location in the first pre-defined data input field at the location on the first standard form for the first pre-defined data input field and the data stored at the sixth memory location in the second pre-defined data input field at the location on the first standard form for the second pre-defined data input field; and when it is indicated that the second standard form is the desired form to be delivered to the second delivery address, to extract the data stored at the seventh and eighth memory locations from the second premapped data stream and to merge the data stored at the third and fourth memory locations with the electronically delivered second digital form file to generate a fourth output file to the second printer which is configured to print a filled farm including the data stared at the seventh memory location in the third pre-defined data input field at the location on the second standard form for the third pre-defined data input field and the data stored at the eighth memory location in the fourth pre-defined data input field at the location on the second standard form for the fourth pre-defined data input field.

36. The system of claim 35, wherein the mapper subsystem includes an electronic form database where the first and second digital form files are stored.

37. A method for generating and providing at least one electronic form including at least a first electronic form of a first standard form from which a first filled standard form can be printed including a first location wherein data of a first type is printed and a second electronic form of a second standard form from which a second filled standard form can be printed including a second location wherein data of a second type is printed to a plurality of users including a first user that stores data of the first type at a first memory location and data of the second type at a second memory location and a second user that stores data of the first type at a third memory location and data of the second type at a fourth memory location, wherein the first and third memory locations are different and the second and fourth memory locations are different, the method comprising the steps of:

collecting the first standard form in electronic format;

collecting the second standard form in electronic format;

mapping the first standard form into a first digital form overlay file identifying graphical and/or textual elements of the first standard form, a first pre-defined data input field of the type to be placed on the first standard form in the location at which data of the first type is to be printed and a location on the first standard form for the first pre-defined data input field;

mapping the second standard form into a second digital form overlay file identifying graphical and/or textual elements of the second standard form, a second pre-defined data input field of the type to be placed on the second standard form in the location at which data of the second type is to be printed and a location on the second standard form for the second pre-defined data input field;

accepting a request from the first user for electronic delivery of a first desired form selected from the first and second electronic forms;

accepting a request from the second user for electronic delivery of a second desired form selected from the first and second electronic forms;

generating a first premapped data stream correlating the first pre-defined data input field with the data stored at the first memory location and the second pre-defined data input field with the data stored at the second memory location;

generating a second premapped data stream correlating the first pre-defined data input field with the data stored at the third memory location and the second pre-defined data input field with the data stored at the fourth memory location;

electronically delivering the digital form overlay file mapped from the first desired form to the first user;

electronically delivering the digital form overlay file mapped from the second desired form to the second user;

extracting data to create first extracted data from the first premapped data stream wherein the first extracted data is the data stored in the first memory location when the first desired form is the first electronic form and the first extracted data is the data stored at the second memory location when the first desired form is the second electronic form merging the first extracted data with the digital form overlay file mapped from the first desired form to create a first print file;

sending the first print file to a printer accessible to the first user to produce a hardcopy of a filled standard form;

extracting data to create second extracted data from the second premapped data stream wherein the second extracted data is the data stored in the third memory location when the second desired form is the first electronic form and the second extracted data is the data stored at the fourth memory location when the second desired form is the second electronic form merging the second extracted data with the digital form overlay file mapped from the second desired form to create a second print file; and, sending the second print file to a printer accessible to the second user to produce a hardcopy of a filled standard form.

38. The method of claim 37, further comprising the steps of retrieving a first electronic address from the first user to be utilized to electronically deliver the digital form overlay file mapped from the first desired form to the first user and retrieving a second electronic address from the second user to be utilized to electronically deliver the digital form overlay file mapped from the second desired form to the second user.

39. The method of claim 38, further comprising uploading via a network the first and second standard forms in electronic format.

40. The method of claim 39, further comprising storing the digital form overlay files in a searchable database prior to an electronic delivery step.

* * * * *